(12) United States Patent
Hernandez, III

(10) Patent No.: US 6,658,646 B1
(45) Date of Patent: Dec. 2, 2003

(54) MULTIPLE INTERFACE SCRIPTING LANGUAGE

(75) Inventor: Gaspar Hernandez, III, Andover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/407,890

(22) Filed: Sep. 29, 1999

(51) Int. Cl.[7] ................................................ G06F 9/44
(52) U.S. Cl. ........................ 717/115; 717/114; 717/116; 717/117; 717/141; 717/142; 717/143
(58) Field of Search .......................... 717/141, 114–117, 717/142–143

(56) References Cited

U.S. PATENT DOCUMENTS 6,311,320 B1 * 10/2001 Jibbe .............................. 717/1

OTHER PUBLICATIONS

Jannink et al., "Efficient and Flexible Location Management Techniques for Wireless Communication Systems", ACM, Oct. 1997.*

Francez et al., "Script: A communication Abstraction Mechanism", ACM, pp.: 213–227.*

Louis Iacona, "Take Command", Linux Journal, vol. 1999, Issue: 62es, pp. 1–6, Jun. 1999.*

Brewer et al., "A Network Architecture for Heterogeneous Moblile Computing", IEEE, Pages: 8–24, Oct. 1998.*

Aho et al., "Compilers, Principles, Techniques, and Tools", Addison–Wesley Publishing Company, pp: 25–48, 1988.*

Hodes et al., "Composable ad–hoc mobile services for universal interaction", ACM, pp.: 1–12, Sep. 1997.*

* cited by examiner

Primary Examiner—Gregory Morse
Assistant Examiner—Ted T. Vo

(57) ABSTRACT

For a large system having an associated monitoring system with one or more user interfaces that each requires a large amount of direct user interaction, a scripting language especially well suited to write a script (that generates liaison interface between the user and the existing user interfaces) is provided. The liaison interface requires much less direct user interaction by taking the place of the user in the extensive direct interaction required by the existing user interfaces. Such a scripting language that includes an integration construct data structure that permits commands of discrete interfaces to be integrated in a single script that is to be executed by a machine. Also provided are scripts according to the scripting language, that include at least two of the integration construct data structures.

26 Claims, 4 Drawing Sheets

MULTIPLE INTERFACE SCRIPTING LANGUAGE

FIELD OF THE INVENTION

The invention is directed toward a scripting language especially well adapted for writing scripts that (when run on a machine) generate, e.g., a liaison interface between a user and an existing user interface, and more particularly to such a scripting language that includes an integration construct data structure that permits commands from discrete user interfaces to be integrated in a single script (that when executed by a machine isolate the user from direct interaction with the discrete interfaces).

BACKGROUND OF THE INVENTION

A script is a sequence of commands that are to be interpreted, i.e., executed by a program running on a processor, as contrasted with a program that is compiled into the machine code of a processor and then directly executed by that processor. A script can be generated using a text editor or a Graphical User Interface (GUI) adapted to the scripting language.

Large systems often include monitoring systems that permit one or more users to monitor the performance of the system in general, and to specifically monitor the state of one or more parameters of the large system. In some instances, the manner in which the monitoring system delivers information to the user can be a burden.

An example of the large system discussed above is a wireless communication network that provides wireless communications service to a wireless unit that is situated within a geographic region. A Mobile Switching Center (MSC) is responsible for, among other things, establishing and maintaining calls between wireless units and calls between a wireless unit and a wireline unit. As such, the MSC interconnects the wireless units within its geographic region with a public switched telephone network (PSTN). The geographic area serviced by the MSC is divided into spatially distinct areas called "cells." In a schematic block diagram, each cell could be schematically represented by one hexagon in a honeycomb pattern. But, in practice, each cell has an irregular shape that depends on the topography of the terrain surrounding the cell. Typically, each cell contains a base station, which comprises the radios and antennas that the base station uses to communicate with the wireless units in that cell. The base stations also comprise the transmission equipment that the base station uses to communicate with the MSC in the geographic area via communication links. One cell site may sometimes provide coverage for several sectors. Here, cells and sectors are referred to interchangeably.

In a wireless cellular communications system, a base station and a wireless unit communicate voice and/or data over a forward link and a reverse link, wherein the forward link carries communication signals over at least one forward channel from the base station to the wireless unit and the reverse link carries communication signals on at least one reverse channel from the wireless unit to the base station. There are many different schemes for determining how wireless units and base stations communicate in a cellular communications system. For example, wireless communications links between the wireless units and the base stations can be defined according to different radio protocols, including time-division multiple access (TDMA), Frequency Division Multiple Access (FDMA), Code Division Multiple Access (CDMA) and others.

Within the geographic region, the MSC switches a call between base stations in real time as the wireless unit moves between cells, referred to as a handoff. Currently, in FDMA, TDMA, CDMA and GSM, cell site planning to determine the geographic coverage for a cell is a manually intensive task that needs constant adjustment. In planning a cell, the topology of the geographic area and a suitable antenna site is selected based on availability and zoning rules. Such a selection is typically not optimal but adequate. Drive tests and manually collecting signaling data are then performed mostly on the perimeter of the coverage area. Transmit and receive antennas and power are then adjusted in a manually iterative manner to improve the call quality. Sometimes, frequencies are swapped with neighbor cells and/or transmit power is readjusted to improve the coverage. Over time, the cell site engineers review customer complaints and cell site dropped call reports and again try to manually optimize the RF performance.

Lucent Technologies Inc. has developed a monitoring system that a user can use to change parameters of the wireless communication system as well as to extract data about it. This monitoring system can generate the TIpdunix (TI) interface, the Status Display Page (SDP) interface and/or the AUTOPLEX Recent Change & Verification Database (APXRCV) interface. These interfaces can be used individually. But typically, information extracted from one of the interfaces is used to make a decision to use a second one of the interfaces in one way or another. To use an interface, a user must start a discrete process. In a windows-based environment, each interface session has its own window.

These discrete or non-integrated interfaces to the monitoring systems pose problems for the user. Each interface has its own set of commands as well as formats for returning information to the user. These command sets and display formats are extensive. This burdens the user's memory. Moreover, the SDP interface returns information in a manner that requires the user to interpret a combination of the foreground and background colors, as well as whether the associated text is blinking or not, in a particular region of the screen in order to determine the state of a component of a large system.

Based upon the information extracted from a first interface, the user must make a decision about whether it is appropriate to use a second interface and if so, the user must appropriately form the command to be submitted. Often, the first interface is used merely to verify that the large system is operating correctly. The user must inspect the data returned by the first interface to confirm that it is consistent with normal operation of the large system. If there is some discrepancy, it must be recognized by the user. Then, the user must determine the problem that is indicated by the discrepancy. Then, the user must take appropriate action, typically via one of the other interfaces.

While the user has the responsibility of confirming via one of the interfaces that the operation of the large system is normal, the user is essentially a prisoner to that interface. The user must continually confirm that the operation of the large system is normal by repeatedly extracting data from the large system. If the user fails to recognize a discrepancy in the data that is returned, then the user will have failed to recognize that there is a problem for which action must be taken.

In another instance, the user might use one of the interfaces to change a parameter in the large system. To confirm that the parameter change has taken effect, the user typically has to use a second interface. But there is typically a delay between the requested change of parameter and the time at which it takes effect in the large system.

To confirm that the change has taken effect, the user must repeatedly extract information from the large system via the second interface. Again, the user becomes a prisoner of the second interface until the user recognizes something in the data returned by the second interface that indicates the desired change has taken place.

Again, the TI, SDP and APXRCV interfaces each require a great deal of direct user interaction. An example of this is depicted in the unified modeling diagram of FIG. 1. FIG. 1 depicts interactions between a user 101 and a monitoring system 304 (to be discussed in more detail below concerning FIG. 3), to be discussed in more detail below. Communication from the user originate from a line 102, while communications from the monitoring system 304 originate from a line 104. The monitoring system 304 can generate the TI, SDP and/or APXRCV interfaces discussed above.

In the unified modeling diagram of FIG. 1, a user desires the result of executing an inventory command via the TI interface. To do so, the user might have to manipulate a field in the APX database in order to enable the use of an inventory command of the TI interface. First, the user must initiate an interface session with the APXRCV interface.

Then, the user must make a backup copy of the APXRCV database for the cell in consideration. Making the backup copy represents the first action requested by the user and it is requested via the APXRCV interface, i.e., the first interface. This is a prudent step to prevent unwanted changes to the database. Then, the user must request data from a particular field within the database. This represents the first data request by the user. Again, it is requested via the first interface. This also requires the user to remember the relevant command and its arguments. Then, the user must wait to find out if the data request is successful or if it failed.

If the first data request is successful, then the user must evaluate the data returned from the field in the database and determine whether it is necessary to modify that data so that the later TI command will be enabled. If the content of the field in the database must be altered, then the user must remember the relevant command and its arguments as well as construct and submit the command. In other words, the user must request a second action, again, via the APXRCV interface. Once the particular field in the database stores the desired value, the user must initiate a TI session. Then, the user must determine whether the TI session has been successfully established. If not, then the user must restore the APXRCV database to its original values. Otherwise, the user must remember the desired TI command and its arguments. In other words, the user must request a third action, but this time it is requested via a second interface (the TI interface). Then the user should terminate the TI session. Then the user should restore the previous values of the APXRCV database, i.e., request a fourth action, again, via the first interface.

SUMMARY OF THE INVENTION

A motivation, among others, for the invention is a recognition that the amount of direct user interaction with the monitoring systems can be greatly reduced by providing a liaison interface between the user and the existing interfaces by way of running a script on a machine, e.g., as a retrofit liaison interface. This solves the excessive direct user interaction problems suffered by the known interfaces while avoiding the great costs associated with revising the interfaces per se. The liaison interface automatically interacts with the existing interfaces, i.e., the liaison interface interacts with the existing interfaces without the direct involvement of the human user.

The invention, in part, provides a scripting language for writing scripts that when run on a machine generate such a liaison interface.

The invention, in part, provides such a scripting language that includes an integration construct data structure that permits commands of discrete interfaces to be integrated in a single script that is to be executed by a machine.

The invention, in part, also provides a computer-readable medium embodied script that includes at least two of the integration construct data structures.

The invention, at least in part, is embodied by providing a computer-readable medium having embodied thereon a script to be processed by a machine connected to a system, the system having at least a first interface for interacting with a user, the computer-readable-medium-embodied script causing the machine to generate a second interface for interacting differently with the user than the first interface, each of the interfaces having at least a set of commands. Such a computer-readable-medium-embodied script comprises: a sequence of executable statements including at least two integration constructs. Each of the integration constructs includes: a first field to identify one of the first interface and the second interface; and a second field to identify at least a command from the corresponding set for the interface identified in the first field.

The invention is also embodied, at least in part, by providing an integration construct data structure readable by a machine, the machine operating upon commands from at least two domains, the integration construct associating a command with a domain where the command is valid. Such an integration construct comprises: a first data object to identify at least a command; and a second data object, linked to the first data object, to identify one of at least a first domain and a second domain as the domain in which the command of the first data object is valid.

The invention is also embodied, at least in part, by providing a method of parsing an executable statement, the executable statement being readable by a machine, the machine operating upon commands from at least two domains. Such a method comprises: examining the executable statement to identify one of at least a first domain and a second domain as the domain in which a command embedded in the executable statement is valid; and examining said executable statement to identify at least said command.

Objectives, features and advantages of the invention will be more fully apparent from the following detailed description of the preferred embodiments, the appended claims and the accompanying drawings.

BRIEF DESCRIPTION OF THE DRAWINGS

The accompanying drawings are intended to depict example embodiments of the invention and should not be interpreted to limit the scope thereof.

DETAILED DESCRIPTION OF THE PREFERRED EMBODIMENTS

Figure 3:
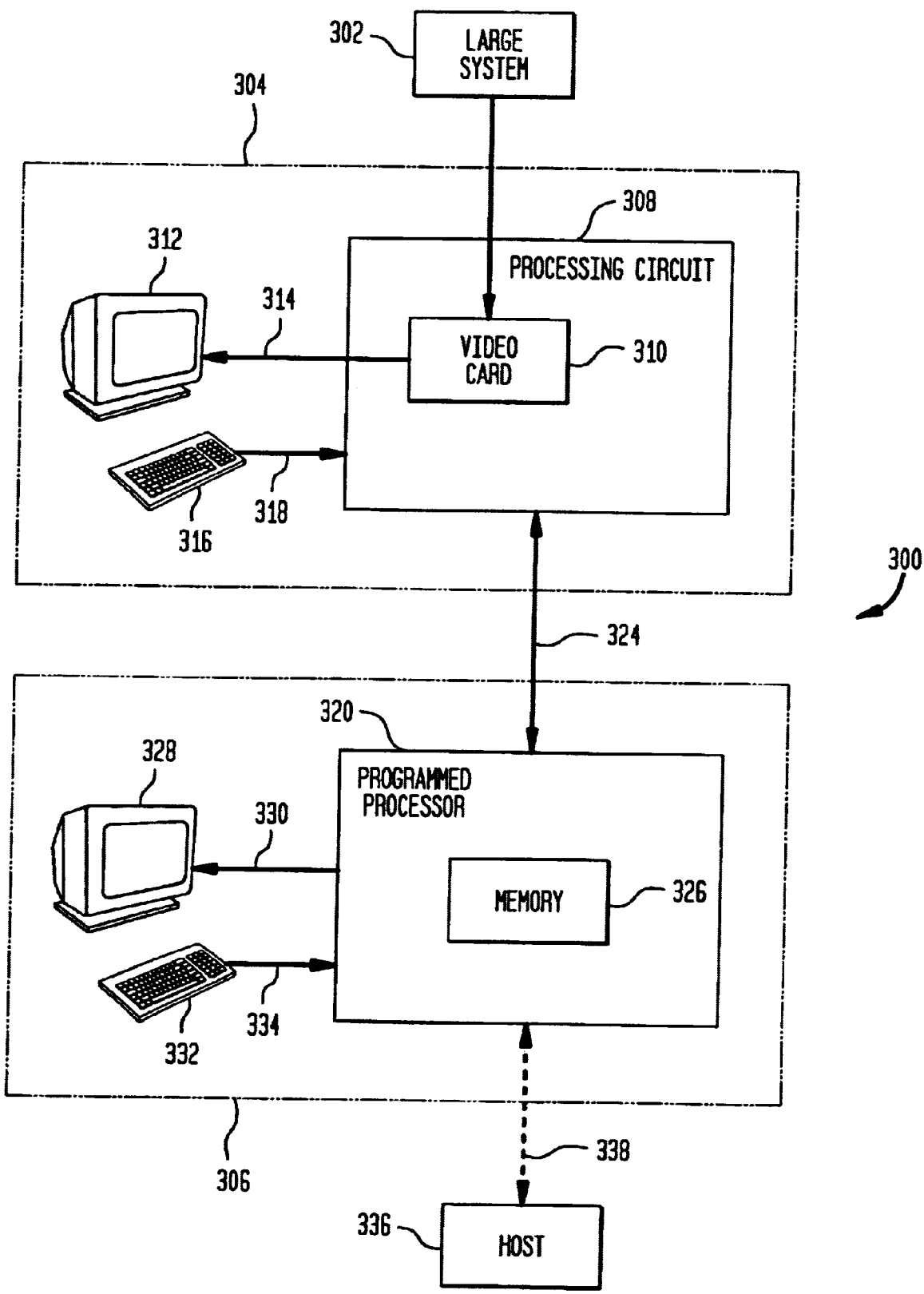
FIG. 3 depicts the system in which the device according to the invention forms a part.

FIG. 3 depicts an overall system 300 of which the liaison interface 306 (that is preferably generated using the scripting language according to the invention) forms a part. The other parts of the overall system 300 are the large system 302 and the monitoring system 304, examples of each of which were discussed above in the Background Section. Again, an example of the large system 302 is a wireless telephony system and an example of the interfaces generated by the monitoring system 304 are the TIpdunix (TI) interface, the Status Display Page (SDP) interface and/or the AUTOPLEX Recent Change & Verification DataBase (APXRCV) interface, all of which are marketed by Lucent Technologies Inc.

A monitoring system 304 includes processing circuitry 308, a part of which is a video display driver circuit card 310. The video card 310 drives a video display device (VDD) 312. In the case of generating the SDP interface, the VDD 312 is driven with non-text, typically hexadecimal code, display-generation data supplied over a connection 314. An input device in the form of a keyboard 316 is connected to the processing circuitry 308 via a signal line 318.

The liaison interface 306 (that is preferably generated using the scripting language according to the invention) includes a processor 320, an output device in the form of a video display device (VDD) 328 connected via a signal line 330, and an input device preferably in the form of a keyboard 332 connected via a signal line 334. The processor 320 has a memory 326 for storing a program or script that causes the processor 320 to generate the liaison interface 306 according to the invention. The processor 320 can communicate with, e.g., an input/output (I/O) port of the processing circuitry 308 via a bidirectional link 324.

The scripting language according to the invention has been disclosed in terms of a specific embodiment of the Wireless Automation Manager Interface Language (WAMIL). But many variations of the WAMIL language, having different combinations of commands, IF-construct elements and (optionally) WHILE-construct elements, as well as other languages, could embody the scripting language according to the invention.

An embodiment of the interpreter for the scripting language according to the invention, for example, has been written in two languages, the Tool Command Language (TCL) and C. Of the portion of the code directed toward dealing with the SDP interface, about 10% is written in C to take advantage of the hexadecimal and bits translation capability of C.

The computer-readable memory 326 can include RAM, ROM, a fixed hard disk drive, and/or a removable storage medium for a non-fixed disk drive such as a floppy disk or a CDROM. The program which causes the processor 320 to generate the liaison interface 306 according to the invention can be downloaded to the processor 320 from the remote host 336 over the optional connection 338. As the program is downloaded through the optional connection 338, the computer-readable medium in which the program is embodied takes the form of a propagated signal.

Generation of the liaison interface (using scripts written in the scripting language according to the invention) involves many sorting and comparison operations as well as accesses to look-up tables (LUTs). As such, the processor 320 should be of sufficient processing power to assure reasonably quick results. Examples of adequate processors are those from the Pentium family of processors marketed by Intel Inc.

Figure 2:
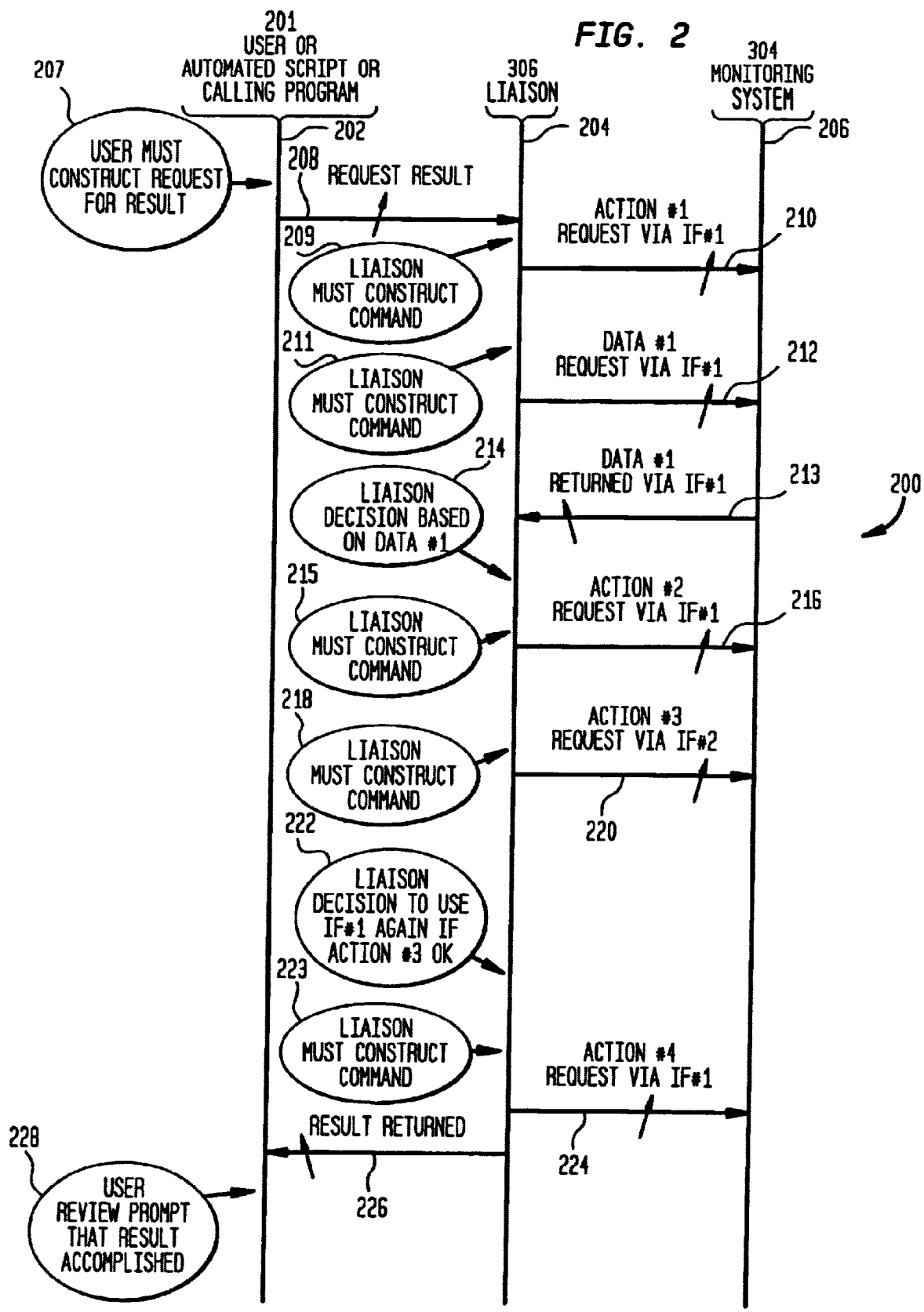
FIG. 2 is a unified modeling diagram for interactions between a liaison interface according to the invention and Background Art interfaces to a Background Art monitoring system, as well as interactions between the liaison interface and a user.

FIG. 2 is a unified modeling diagram depicting an example of interactions by a liaison interface 306 generated by a script preferably written in the scripting language according to the invention. In FIG. 2, communications from the liaison interface 306 originate from a line 204. The liaison 306 interacts with a user 201, be it a human user, a calling script user or calling program user. Communications from the user 201 originate from a line 202. The liaison interface 306 also interacts with the monitoring system 304. Communications from the monitoring system 304 emanate from a line 206. As will be discussed below, interposing the liaison interface 306 between the user and the monitoring system 304 greatly reduces the amount of direct interaction that the user must have with any interface.

Figure 1:
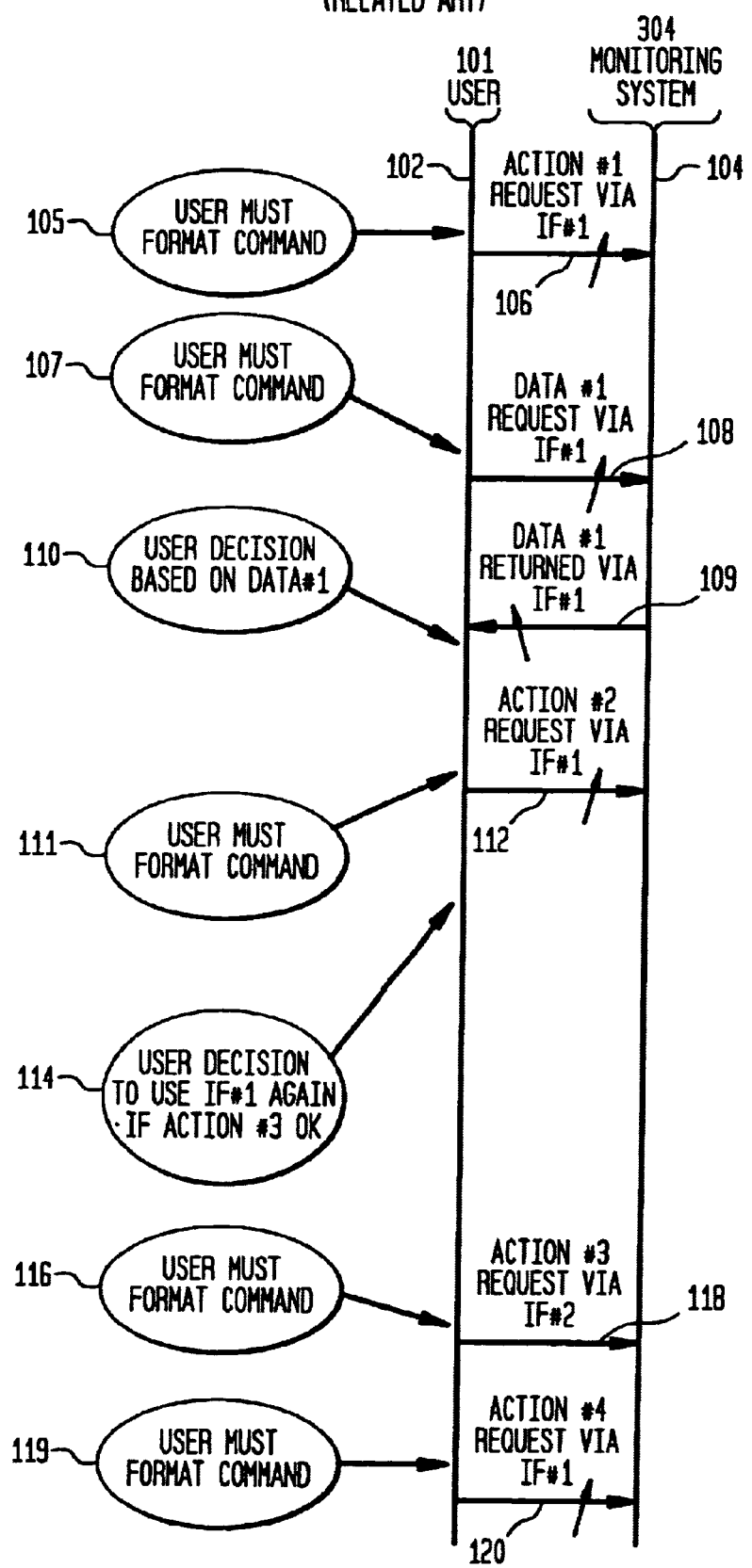
FIG. 1 is a unified modeling diagram for interactions between a human user and Background Art interfaces to a Background Art monitoring system.

FIG. 2 depicts interactions necessary to achieve the same result as in the example of FIG. 1. Again, the user 201 desires the result of executing an inventory command via the TI interface without having to be concerned with checking if certain parameters are in their required states. But in FIG. 2, only two interactions, namely 208 and 226, require direct interaction by the user. The other fourteen actions or interactions involve only the liaison 306 or the liaison 306 and the monitoring system 304, respectively. At Item 207, the user must construct a request for a result and submit it to the liaison interface 306 at element 208. The phrase "request a result" is intended to indicate that the user runs a script to produce the desired result by operation of the liaison interface 306.

The desired result can simply be a notification that the script has run successfully. Alternatively, the indication that the script has run successfully can be communicated in the form of a display of a desired parameter of the system. At Item 228, the user must review this prompt to confirm that the result was accomplished or to make use of the result.

Figure 4A:
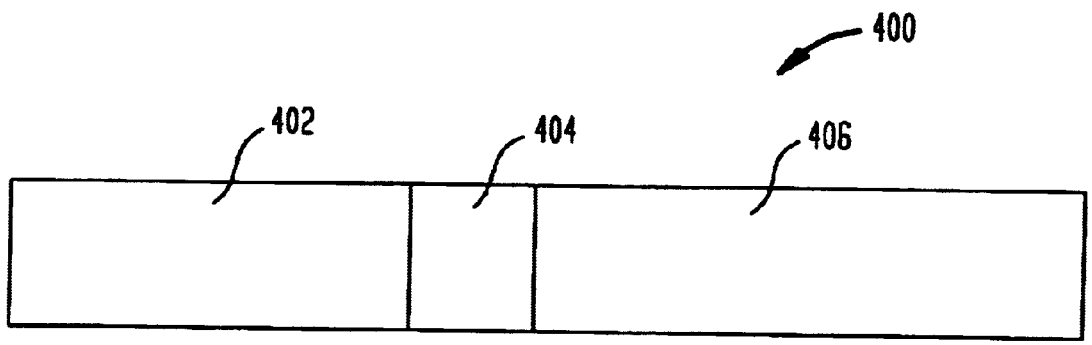
FIGS. 4A and 4B are schematic depictions of an integration construct data structure of the scripting language according to the invention.
Figure 4B:
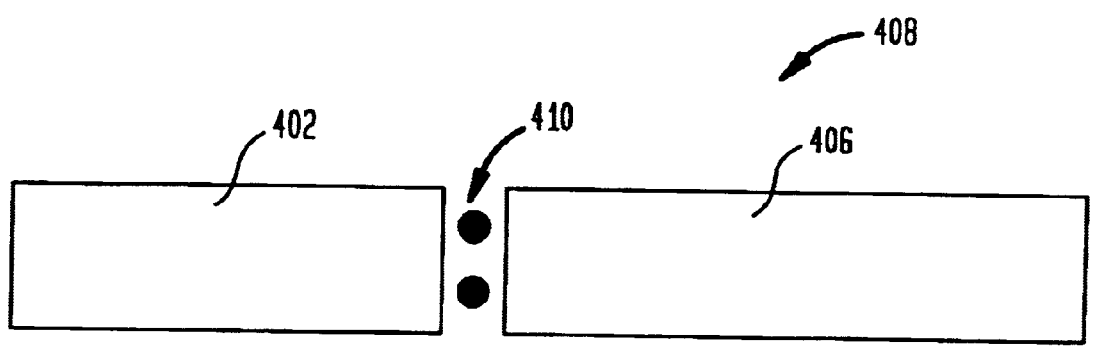

The WAMIL language includes commands and statements that are elements of IF-constructs and while-constructs. A WAMIL command or integration construct data structure has the format of "interface:command," e.g., "TI:OP:CELL, NUMERAL," "WAM:CONNECT SDP," or "WAM:GETSDP." As depicted in FIG. 4A, a WAMIL command 400 preferably has a first field 402 that identifies an interface and a second field 406 that identifies a command. The interface identified by the first field 402 is the interface in which the command of the second field 406 is valid. Preferably, the first field 402 precedes, or is a header for, the second field 406 and is separated by a third field 404, e.g., an alphanumeric character such as a colon (:) 410 (FIG. 4B). Alternatively, the second field 406 could precede the first field 402.

All WAMIL commands, i.e., WAM:COMMAND, can (in this embodiment of the WAMIL language) be uppercase letters. Also, each alphanumeric text string in the field 402, e.g., TI, can (in this embodiment of the WAMIL language) be in uppercase letters. But commands from other interfaces can be in lowercase letters. For information, refer to the WAM Interface Commands section below.

The invention has been described, for convenience, in terms of the TI interface, the SDP interface and/or the APXRCV interface to the monitoring system for the large wireless system described in the Background Section above. However, the scripting language according to the invention is applicable to integrate commands of discrete interfaces from other domains or to write scripts to generate liaison interfaces to other user interfaces such as those found in the air traffic control arts, train and subway control arts, chemical processing plant control arts, power generation plant control arts, etc. Again, common characteristics of these interfaces include (1) that they hold the user captive by requiring a great deal of direct user interaction and (2) that they are mature products for which research and development efforts have been greatly diminished, making substantive redesigns, e.g., software rewrites, (to obtain more user-friendly output) prohibitively expensive. Thus, a liaison interface written using the scripting language according to the invention does not disturb the existing monitoring system and yet achieves a desired goal of greatly reducing the amount of direct interaction between the user and user-interface without redesigning the software of the dedicated non-text-variable-output systems.

Details of the Liaison Interface are contained in a first copending U.S. patent application entitled "Liaison Interface," by the same inventor, Gaspar Hernandez, III, filed on the same date, Sep. 29, 1999, that is assigned to the same assignee, Lucent Technologies Inc. The entire contents of this first copending application are hereby incorporated by reference.

One of the commands in the WAMIL scripting language is the "GETSDP" command. More details of this command can be found in a second copending U.S. patent application, entitled "Technology to Translate Non-Text Display Generation Data Representing An Indicator Into Text Variables," by the same inventor, Gaspar Hernandez, III, filed on the same date, Sep. 29, 1999, that is assigned to the same assignee, Lucent Technologies Inc. The entire contents of this second copending application are hereby incorporated by reference.

The programmed processor 320 preferably has one or more programs to generate a script interpreter that will interpret each line in a script. The interpreter can be executed from a command line or by way of a Graphical User Interface (GUI). The program processor 320 preferably also includes a program to generate a scriptor by which a user can write a script and/or debug an existing script.

Details of a Scriptor and an Interpreter especially suited to the WAMIL language are contained in a third copending U.S. patent application entitled "Scriptor and Interpreter," filed by the same inventor, Gaspar Hernandez, III, filed on the same date, Sep. 29, 1999, that is assigned to the same assignee, Lucent Technologies Inc. The entire contents of this third copending application are hereby incorporated by reference.

Details of a Comand Line Generator to ease the burden on a user represented by command line execution are contained in a fourth copending application, entitled "Command Line Generator," by the same inventor, Gaspar Hernandez, III, filed on the same date, Sep. 29, 1999, that is assigned to the same assignee, Lucent Technologies Inc. The entire contents of this fourth copending application are hereby incorporated by reference.

Some example scripts written in the WAMIL language follow. After that discussions of the WAMIL Interpreter environment, WAMI key global variables, WAM VAR variables, WAM lists, control flow for WAMIL script execution and the WAM Linker are provided to help establish a context to appreciate the capabilities and flexibility of a script written in the WAMIL language. Then, a general discussion of the IF THEN ELSE type of IF-construct, the IF THENDO ELSEDO ENDIF type of IF-construct and the WHILE ENDWHILE variation of an IF-construct are presented, followed by a detailed glossary of commands that can be embedded in the integration construct data structure according to the invention. That will be followed by a detailed glossary of IF-construct elements. Then is general discussion of the Linker, followed by a detailed glossary of linker commands are presented.

An example of a script used to generate the liaison interface 306 that corresponds to the interactions depicted in FIG. 2 is listed below in Script #1.

SCRIPT #1

| LINE # | COMMAND |
| --- | --- |
| 01 | WAM:MSC 5 |
| 02 | WAM:CELL 49 |
| 03 | WAM:GETAPX cell2 BACKUP |
| 04 | IF:AFAIL |
| 05 | THENDO: |
| 06 |   WAM:PRINT APXRCV cell2 form backup failed, script aborted. |
| 07 |   WAM:ENDTEST |
| 08 | ELSEDO: |
| 09 | ENDIF: |
| 10 | WAM:GETAPXFLD cell2 f_list4.c_feat[2] |
| 11 | IF:AFAIL |
| 12 | THENDO: |
| 13 |   WAM:PRINT APXRCV cell2 field retrieval failed, script aborted |
| 14 |   WAM:ENDTEST |
| 15 | ELSEDO: |
| 16 | ENDIF: |
| 17 | IF:TEST_EXPR APXVAR EQ n |
| 18 | THENDO: |
| 19 |   WAM:SETVAR APXVAR y |
| 20 |   WAM:PUTAPXFLD cell2 f_list.c_feat[2] |
| 21 |   IF:AFAIL |
| 22 |   THENDO: |
| 23 |     WAM:PRINT APXTCV field update failed, script aborted |
| 24 |     WAM:ENDTEST |
| 25 |   ELSEDO: |
| 26 |     WAM:PRINT Inventory feature enabled |
| 27 |   ENDIF: |
| 28 | ELSEDO: |
| 29 | ENDIF: |
| 30 | WAM:CONNECT TI |
| 31 | IF:LFAIL |
| 32 | THENDO: |
| 33 |   WAM:PRINT TI login attempt failed, script aborted |
| 34 |   WAM:PUTAPX cell2 BACKUP |
| 35 |   WAM:ENDTEST |
| 36 | ELSEDO: |
| 37 | ENDIF: |
| 38 | TI:op:cell 49, inventory |
| 39 | WAM:DISCONNECT TI |
| 40 | WAM:PUTAPX cell2 BACKUP |
| 41 | WAM:ENDTEST |

Script #1 is written in the Wireless Automation Manager Interface Language (WAMIL). A brief discussion of the lines in the script will be presented.

In line 1 of Script #1, the Mobile Switching Center (MSC) variable is set to the value 5. In line 2, the cell variable, CELL, is set to the value 49. In line 3, the GETAPX command is recited, which makes a copy of the database corresponding to the APXRCV database named cell2 and names the copy as "backup." Line 3 of Script #1 corresponds to Item 210 of FIG. 2. Lines 4–9 are included in Script #1 to account for the possibility that there might be a failure in making a backup of the APXRCV database named cell2 database. Lines 4–9 define an IF-construct that tests for whether there has been a failure in making the backup copy. Line 5 indicates the commands to be executed if there is a failure, namely the commands in lines 6 and 7. Line 6 lists the print command to print a text string that notifies of the failure. Line 7 recites the command ENDTEST that terminates interpretation of the script. Line 8 indicates the commands to be interpreted if the tested condition is false, i.e., if the APXRCV database named cell2 is backed up successfully. When the backup copy is made successfully, then the IF-construct terminates at line 9 with the command "ENDIF."

At line 10, the command to retrieve the value of a field in the cell2 database is recited. This corresponds to Item 212 of FIG. 2. Lines 11–16 recite an IF-construct that is similar to lines 4–9. But in lines 11–16, the error message to be printed refers to the failure to retrieve a field in the database rather than a failure to backup the entire database. Lines 17–29 recite a third IF-construct.

The third IF-construct of Script #1 corresponds to Item 214 and 216 of FIG. 2. At line 17, the value of the field retrieved in line 10 is tested. To reiterate, this corresponds to Item 214 of FIG. 2. The value of this field is tested to determine if it enables the use of a desired command from the TI interface. If the condition is true, namely, if the field value equals n (meaning that the feature is disabled), then the commands denoted by line 18 are interpreted. Line 19 recites a command to set the WAM Interpreter (WAMI) variable APXVAR to the value y. Line 20 recites a command to put the value of APXVAR into the desired field in the APXRCV database named cell2. This corresponds to Item 2 of FIG. 2.

Line 21–24 correspond to lines 11–14, which account for the possibility that the requested change to the value in the database will not be made successfully. The text string recited in line 23 is a notification that the field update failed and that interpretation of the script has been terminated. Lines 25–26 correspond to the condition that the field in the database was changed successfully. Line 26 recites a command to print a text string that notifies of the successful field change.

In line 30 of Script #1, a TI session is initiated. Lines 31–37 correspond to an IF-construct to account for the possibility that a TI interface session might not be successfully initiated. Line 33 recites the print command to print a text string that indicates that the TI interface session could not be established. Line 34 recites a command to restore the APXRCV database named cell2 database to the values in the copy named BACKUP.

Line 38 of Script #1 recites the TI interface command to perform an inventory on cell 49. This corresponds to Item 220 of FIG. 2. Line 39 recites the command to terminate the TI interface session. Line 40 recites the command to restore the database for the APXRCV database named cell2 to the value stored in the copy named BACKUP. This corresponds to item 224 of FIG. 2. Lastly, the script terminates with line 41.

Another example script, namely Script #2, follows. Script #2 uses the SDP interface and the TI interface.

SCRIPT #2

| LINE # | COMMAND |
|---|---|
| 01 | WAM:MSC 5 |
| 02 | WAM:CONNECT SDP |
| 03 | IF:LFAIL |
| 04 | THENDO: |
| 05 |    WAM:PRINT SDP OMP login attempt failed, script aborted |
| 06 |    WAM:ENDTEST |
| 07 | ELSEDO: |
| 08 | ENDIF: |
| 09 | IF:SDPPORT |
| 10 | THENDO: |
| 11 |    WAM:PRINT SDP vtty ports not available script aborted |
| 12 |    WAM:ENDTEST |
| 13 | ELSEDO: |
| 14 | ENDIF: |
| 15 | WAM:CELL 49 |
| 16 | WAM:BBAVAR |
| 17 | SDP:2138,49 |
| 18 | WAM:GETSDP BBA |
| 19 | IF:TEST_EXPR SDPVAR_COLOR EQ BLACK_ON_GREEN |
| 20 | THENDO: |
| 21 |    WAM:PRINT BBA BBAVAR is ACTIVE |
| 22 |    WAM:SET WAMI 1 |
| 23 | ELSEDO: |
| 24 |    WAM:PRINT:BBA BBAVAR is NOT ACTIVE |
| 25 | ENDIF: |
| 26 | WAM:CONNECT TI |
| 27 | IF:LFAIL |
| 28 | THENDO: |
| 29 |    WAM:PRINT TI login attempt failed, script aborted |
| 30 | WAM:ENDTEST |
| 31 | ELSEDO: |
| 32 | ENDIF: |
| 33 | IF:TEST_EXPT WAMI EQ 1 |
| 34 | THENDO: |
| 35 |    TI:dgn:cell 49, bba BBAVAR |
| 36 | ELSEDO: |
| 37 |    TI:rst:cell 49, bba BBAVAR |
| 38 | ENDIF: |
| 39 | WAM:DISCONNECT TI |
| 40 | WAM:DISCONNECT SDP |
| 41 | WAM:ENDTEST |

In line 1 of Script #2, the Mobile Switching Center Variable, MSC, is set to the value 5. Line 2 recites the command to connect to the SDP interface. Lines 3–8 correspond to an IF-construct for dealing with a first kind of possible failure to establish an SDP interface session. Lines 9–14 present another IF-construct to deal with a second kind of failure to establish an SDP interface session could not be established.

Line 15 of Script #2 sets the cell variable, CELL, to the value 49. Line 16 recites the BBVAR command, which indicates that the value for the variable BBA will be supplied by the user to the script as an argument appended to the command line.

Line 17 of Script #2 is a command for the SDP interface to return an arrangement of screen indicators identified by screen 2138, for the cell 49. Line 18 recites the GETSDP command to convert the nontext attributes of an indicator corresponding to the value of the variable BBA into text variables. Again, the GETSDP command is explained in detail in the second copending application that has been incorporated by reference, as discussed above.

Lines 19–25 of Script #2 represent an IF-construct for testing the condition of whether the indicator is in a particular state. If so, i.e., if the condition is satisfied, then the commands in lines 21 and 22 are to be interpreted. If not, i.e., if the condition is not satisfied, then the command in line 24 is to be interpreted.

Line 26 of Script #2 recites the command to establish a second interface session, namely a TI interface session. Lines 27–32 account for the possibility that the TI interface session can not be established.

Lines 33–38 of Script #2 represent an IF-construct for deciding whether to perform diagnostics on a cell BBA (line 35) (which take the cell out of service for the duration of the diagnostics) or restore the cell BBA (line 37) depending upon the value of the general WAMIL variable, WAM, that is tested in line 33. It is noted that the value of the WAMIL variable, WAM, corresponds to the state of the indicator, as determined in lines 21–22. The default value for the WAMIL variable WAMI is zero. Hence, no WAM:SET WAMI 0 command is included after line 24, whereas it is necessary in line 22 because it is changing the default value.

Line 39 of Script #2 terminates the TI interface session. Line 40 terminates the SDP interface session. Line 41 terminates execution of Script #2.

A third example of a script follows. Script #3 emphasizes flow control using the "IF:OMSG" statement as the basis of a second form of an IF-construct. In light of the more detailed discussion of WAMIL commands and IF-construct elements provided below, as well as the discussion above, Script #3 is considered to be self-explanatory.

SCRIPT #3

| LINE # | COMMAND |
|---|---|
| 01 | WAM:MSC 5 |
| 02 | WAM:CELL 49 |
| 03 | WAM:CCC 4 |
| 04 | WAM:CONNECT TI |
| 05 | TI:rst:cell 49, ccc 4 |
| 06 | TI:op:cell 49 |
| 07 | IF:OMSG OP:CELL CELLVAR CCC CCCVAR, ACTIVE |
| 08 | THENDO: |
| 09 |   WAM:PRINT CCC CCCVAR is active script will continue |
| 10 | ELSEDO: |
| 11 |   IF:OMSG OP:CELL CELLVAR CCC CCVAR, ACTIVE |
| 12 |   THEN:CONTINUE |
| 13 |   ELSE:WAITQUERY 5 TI 10 |
| 14 |   IF:OMSG OP:CELL CELLVAR CCC CCCVAR, ACTIVE |
| 15 |   THENDO: |
| 16 |   ELSEDO: |
| 17 |     WAM:PRINT CCC CCVAR never became active |
| 18 |     WAM:ENDTEST |
| 19 |   ENDIF: |
| 20 | ENDIF: |
| 21 | TI:dgn:cell 49, ccc 4 |
| 22 | IF:OMSG COMPLETED |
| 23 | THEN:CONTINUE |
| 24 | ELSE:WAITQUERY 5 TI 10 |
| 25 | WAM:DISCONNECT TI |
| 26 | WAM:ENDTEST |

A fourth example script follows, namely Script #4. Script #4 emphasizes the WAM:WMMI suite of commands and its related commands. For similar reasons as those presented in the discussion of Script #3, Script #4 is considered to be self-explanatory.

SCRIPT #4

| LINE # | COMMAND |
|---|---|
| 01 | WAM:WAMLIST Please Enter Paging Rate |
| 02 | WAM:WMMIO TESTEND WAMVAR 1 HOME This is Our Message |
| 03 | WAM:WAIT 20 |
| 04 | WAM:WMMI_GETCOUNT WAMVAR |
| 05 | IF:TEST_EXPR WAMVAR GT 3 |
| 06 | THENDO: |
| 07 |   WAM:PRINT Paging rate is WAMVAR, to fast! Reduce to default 1200 per hour. |
| 08 |   WAM:WMMI_SEND CHANGERATE 1200 |
| 09 |   WAM:WAIT 10 |
| 10 |   WAM:WMMI_GET COUNT WAMVAR |
| 11 |   IF:TEST_EXPR WAMVAR LT 20 |
| 12 |   THENDO: |
| 13 |     WAM:PRINT Paging rate is good now! |
| 14 |   ELSEDO: |
| 15 |     WAM:PRINT Paging rate still too fast! Script aborted! |
| 16 |     WAM:WMMI_STOP |
| 17 |     WAM:ENDTEST |
| 18 |   ENDIF: |
| 19 | ELSEDO: |
| 20 |   WAM:PRINT Paging rate is not bad! |
| 21 | ENDIF: |
| 22 | WAM:WMMI_SEND SENDPAT Send this message only once! |
| 23 | WAM:WAIT 5 |
| 24 | WAM:WMMI_SEND CHANGERPAT This is our new message. |
| 25 | WAM:WAIT 10 |
| 26 | WAM:WMMI_STOP |
| 27 | WAM:ENDTEST |

WAMIL Interpreter Environment

The Wireless Application Manager (WAM) Interface Language (WAMIL) Interpreter environment is the preferred, but not the only, environment to execute WAMIL scripts that include the integration construct data structure according to the invention. This environment will now be discussed in more detail.

Command Line Script Execution

Again, a WAMIL script is passed to an interpreter, preferably the WAM Interpreter (WAMI), for execution.

All WAMIL scripts can (in this embodiment of the WAMIL language) have a .wamil extension. For example, the above script if named AUTO1.wamil would be executed as follows, the .wamil extension is understood:

WAM21 AUTO1

WAMIL Script Output File

All WAMIL scripts generate an output file. all (in this embodiment of the WAMIL language) output files have a .rpt extension.

Default script output location is ~myhome/WAMfiles/Scripts.dir, else -rpt switch is used.

WAM21 AUTO1 -rpt ~some/place/else

Output files are overwritten unless the append option is specified as follows:

WAM21 AUTO1 -rpt ~some/place/else -opt a -endopt

For example, the above script when executed as the script name AUTO1 would generate the following output:

Test Script Name: AUTO1

Test Script Location: /phoenix/h47/ghernand/WAMfiles/wam.wamil

Test Script Report Name: AUTO1

Test Script Report Location: phoenix/h47/ghernand/WAMfles/Scripts.dir

Test On MSC 5
FStart Test Cell: 49
Connect To TIpdunix on MSC 5
Executed TI: op:cell 49
op:cell 49
IP all specified cells ACT
M 45 OP:CELL 49 BBA 6, OOS, FRCELL, RMVD
12/08/98 45 #073412
M 45 OP:CELL 49 CCC 6, ACTIVE
   BLOCKING FROM CELL, NO ACU ON CCC SHELF
   BLOCKING FROM SECTOR 3, NO BBA IN SERVICE
12/08/98 45 #073414
M 45 OP:CELL 49 CCC 4, CCU 3, OOS, FRCELL, RMVD
12/08/98 45 #073415
M 46 OP:CELL 49 PROG CONTROL OFF-NORMAL INTERRUPTS INHIBITED:
   CSC 0 PROCID:
     MWPER
     MPARF
     NCIOCF
     CPIST
     CPIMS
     CPUADRV
     CPUMTX
   ANTFT INHIBITED
OCFT INHIBITED
   PLFT INHIBITED
   TPFT INHIBITED
   RTDIAG INHIBITED
12/08/98 46 #073417
M 46 OP:CELL 49 COMPLETED
12/08/98 46 #073418
M 46 OP:CELL 49 DL 0 CONNECTED
12/08/98 46 #073427
M 46 OP:CELL 49 DL 1 CONNECTED
12/08/98 46 #073428
M 46 OP:CELL 49 STATUS & CONTROLS
   BOOT ALW, CP ALW, PH MON ALW, PH STATE ACTIVE, DL(S) UP
   FORWARD SETUP CHANNEL CONTROL NORMAL (INH)
12/08/98 46 #073430
Disconnect From TIpdunix on MSC 5
ENDTEST MSC 5 CELL 49
END OF TEST SCRIPT EXECUTION

WAMIL Commands Output

All WAMIL commands, when executed, generate output messages to the script output file. These messages can be monitored to track script progress. To turn WAMIL commands output messages off the WAM:OUTPUTOFF command can be used.

WAMIL DISPLAY Command

All WAMIL scripts are executed in the background. To slow execution of the script and monitor its progress the WAM:DISPLAY <seconds> command can be included in the script. This command will open a display window in which the script will be executed.

WAMI Key Global Variables

The WAMIL scripting language has a predefined set of global variables, known as key global variables or key variables. They anticipate most of the parameters, settings and/or preferences related to a wireless system that a user might wish to manipulate. Because they are predefined, these key global variables also have default values and do not need to be created. Non-key global variables are not predetermined. Rather, they are created by the user with the CREATEVAR command (to be discussed below) to help solve the particular problem for which the script has been written. Global variables will be discussed further below after the table listing the WAM global variables.

Below is a list of all (in this embodiment of the WAMIL language) WAMI key global variables. The list also shows the variable type, default value and a brief description.

TABLE 1

WAMI Key Global Variables

| VARIABLE | DEFAULT | VALUE TYPE | DESCRIPTION |
|---|---|---|---|
| ADDCE | 0 | Integer | Number of Channel Elements to add. |
| ADRS | NULL | String | Memory Address |
| AFAIL | 0 | Integer | APXRCV failure flag |
| ANT | 0 | Integer | Antenna face Number |
| AU | 1 | Integer | Cell Amplifier Unit Number |
| BBA | 1 | Integer | BCR-BIU-ACU Trio Number |
| CAT | 0 | Integer | Clock and Tone Board Number |
| CCC | 1 | Integer | CDMA Cluster Controller Number |
| CCU | 1 | Integer | CDMA Channel Unit Number |
| CDMADPC | 0 | Integer | BBA Power Control Option |
| CELL | 0 | Integer | Cell Site Number |
| CELL_TYPE | SERIESII | Alphanumeric | Cell Site Equipment Type |
| CFAIL | 0 | Integer | Interface Connection Flag |
| CGSA | 0 | Integer | Cellular Geographic Service Area |
| CONFIG | 0 | Integer | Cell Configuration Option |
| CSC | 0 | Integer | Cell Site Controller |
| DCCH | 0 | Integer | Dedicated/Digital Control Channel |
| DCS | 0 | Integer | Digital Cellular Switch Number |
| DisplayDelay | 1 | Integer | Script Display Window Delay |
| DL | 0 | Integer | Cell Site Data Link |
| DS1 | 0 | Integer | Digital Service 1 Number |
| ECP | 0 | Integer | Executive Cellular Processor Number |
| ERR | 0 | Integer | WAM Interpreter exit value |
| GEN | 0 | Alphanumeric | Generic Number/Name |
| INACT | 60 | Integer | Interface Session Inactivity (Minutes) |
| LAC | 0 | Integer | Cell Linear Amplifier Circuit Number |
| LC | 0 | Integer | Cell Locate Radio Number |
| LFAIL | 0 | Integer | Interface Login Flag |
| LMT | 0 | Integer | Lightwave Microcell Transceiver Number |
| LOOPERcnt | 1 | Integer | WAMI script looping counter |
| LOOPER | 1 | Integer | WAMI script looping limit |
| MICROCELL | 0 | Integer | FLEXANT RCS Number |
| MSC | 0 | Integer | Mobile Switching Center Number |
| OC | 0 | Integer | Overhead Channel Number |
| PH | 0 | Alphanumeric | TI Specified Phase Number(s) |
| PL | 0 | Integer | Pilot Level Number |
| RA | 0 | Alphanumeric | Cell Radio Number |

TABLE 1-continued

WAMI Key Global Variables

| VARIABLE | DEFAULT | VALUE TYPE | DESCRIPTION |
|---|---|---|---|
| REL | 8.0 | Alphanumeric | Current software release |
| RG | 0 | Integer | Cell Reference Generator Number |
| RPT | 0 | Integer | TI Repeat Diagnostics Number |
| RptName | None | Alphanumeric | Script Report Name |
| SDPFAIL | 0 | Integer | SDP interface failure flag |
| SDPPORT | 0 | Integer | SDP port flag |
| SG | 0 | Integer | Server Group Number |
| SPOOL | 10 | Integer | WAMI Spooler Pause (Seconds) |
| SU | 0 | Integer | Cell Setup Radio Number |
| SW | 0 | Integer | Switch Identification Number |
| TFAIL | 0 | Integer | Interface Command Time Out Flag |
| TimeOut | 30 | Integer | WAMI Interface Time Out (Seconds) |
| TP | 0 | Integer | Traffic Path Number |
| TRACE | 0 | Integer | WAMI TRACE Flag |
| TRKGRP | 0 | Integer | Trunk Group Number |
| TRKMBR | 0 | Integer | Trunk Member Number |
| VRADPC | 0 | Integer | Voice Radio Power Control Option |
| VRN | 0 | Integer | Voice Radio Number |
| Wait | 10 | Integer | WAMI Script Execution Pause (Seconds) |
| WAM | 0 | Alphanumeric | WAMI Interpreter global variable |
| XMITC | 0 | Integer | Transmitter Control Action Option |

Key Variables in a WAMIL Script

Key variables already exist with default values.

Interface commands reference key global variables.

WAM Interpreter commands alter, act upon, or perform functions based upon the current values of the key global variables.

Below are a few examples of key global variables. A complete discussion follows later.

| WAMI GLOBAL VARIABLE | DEFAULT VALUE |
|---|---|
| MSC | 0 |
| CELL | 0 |
| CCC | 1 |
| CCU | 1 |
| RA | 0 |

Direct Assignment Commands

WAMI key global variables can be altered with WAM Interpreter assignment commands. An example script follows:

|  | MSC | CELL |
|---|---|---|
| SCRIPT | 0 | 0 |
| WAM:MSC 5 | 5 | 0 |
| WAM:CELL 49 | 5 | 49 |
| WAM:CONNECT TI | 5 | 49 |
| TI:op:cell 49 | 5 | 49 |
| WAM:CELL 101 | 5 | 101 |
| TI:op:cell 101 | 5 | 101 |
| WAM:SET CELL 60 | 5 | 60 |
| TI:op:cell 60 | 5 | 60 |
| WAM:DISCONNECT TI | 5 | 60 |
| WAM:ENDTEST | 5 | 60 |

Referencing WAMI Key global variables Within Strings

To reference a WAMI key global variable within a string the suffix VAR is added to the key global variable name.

WAM:PRINT The script CELL number is CELLVAR.

If CELL was set to the value of 49, the above would print to the WAMIL script output file as follows:

The script CELL number is 49.

WAM Interpreter Script Parsing & Execution

Each line of a WAMIL script is parsed and then executed. The interpreter parser and executor each have a four step process:

PARSER
1) Check command syntax.
2) Verify against key global variables if interface command.
3) Check for Parser required flags or states.
4) Set Parser & Executor required flags & states.

EXECUTOR
1) Check for Executor required flags or states.
2) Perform key global variable & keyword substitutions.
3) Execute command.
4) Set Parser & Executor required flags & states.

WAM Interpreter Keywords & Operators

The WAM Interpreter (WAMI) supports path keywords which can be used for the path argument on most commands. Below is a list of these keywords along with a description of their meaning:

| PATH KEYWORD | DESCRIPTION |
|---|---|
| CERT | Script located in certified directory. |
| HOME | Script located in user's HOME directory. |
| SHARE | Script located in WAMI SHARE directory |

The WAM Interpreter also supports print character keywords which can be inserted in strings to print special characters or WAMI information. Below is a list of these keywords along with the character, or information, substituted with when referenced with a string:

| KEYWORD | CHARACTER |
|---|---|
| REPORTNAME | The WAMIL script report name. |
| REPORTPATH | The WAMIL script output file location. |
| SCRIPT_NAME | The WAMIL script name. |
| SCRIPTPATH | The WAMIL script location |
| WAMBLANK | A blank space |
| WAMBUFFER | WAM Interpreter buffer |
| WAMHOME | The user's current HOME |

-continued

| KEYWORD | CHARACTER |
|---------|-----------|
| WAMNL   | new line  |
| WAMTAB  | tab       |

The WAM Interpreter also supports the use of relational operators within IF-constructs and WHILE-constructs, and mathematical operators with the MATHVAR command. Below is a list of all (in this embodiment of the WAMIL language) the relational operators supported:

| OPERATOR NAME | DESCRIPTION |
|---------------|-------------|
| +   | Plus |
| −   | Minus |
| *   | Multiply |
| /   | Divide |
| EQ  | Equal To |
| GT  | Greater Than |
| GTE | Greater Than Or Equal To |
| LT  | Less Than |
| LTE | Less Than Or Equal To |
| NE  | Not Equal To |

WAMI VAR Variables

WAMI Key Variables

In addition to the predefined WAM global variables that have default values, the WAMIL language also supports auxiliary/complimentary global values that are created as needed by the user via the CREATEVAR command.

All key variables have complimentary/auxiliary storage locations, also known as VAR variables. A WAMI key global variable can be set to a value or point to an auxiliary WAMI VAR variable, i.e., storage location.

Associations

When a WAMI key global variable points to a WAMI VAR variable within a script, the WAMI key global variable value is then the current value of the WAMI VAR variable. In such a case, the WAMI key global variable has an association with a WAMI VAR variable. Thus, all (in this embodiment of the WAMIL language) references to the WAMI key global variable will yield the value of the WAMI VAR variable it is associated with.

A key global variable can only (in this embodiment of the WAMIL language) be referenced in an interface command that expects it as an argument. But the WAMI VAR variable can be referenced by any (in this WAMIL language embodiment) command so long as it has been associated with a key global variable. In this sense, WAMI key global variables are private and protected, while WAMI VAR variables are public.

VAR Type Commands

This is a dual function command that will also illicit a response from the WAM GUI platform. An argument passed to script is assigned to a WAMI VAR variable, and an association with the corresponding WAMI key global variable is automatically established. An example script, with an indication of variable values, follows.

| SCRIPT | MSC | CELL | CELLVAR |
|--------|-----|------|---------|
|                    | 0 | 0       | ?  |
| WAM CELLVAR        | 0 | CELLVAR | 49 |
| WAM:MSC 5          | 5 | CELLVAR | 49 |
| WAM:CONNECT TI     | 5 | CELLVAR | 49 |
| TI:op:cell CELLVAR | 5 | CELLVAR | 49 |
| WAM:DISCONNECT TI  | 5 | CELLVAR | 49 |
| WAM:ENDTEST        | 5 | CELLVAR | 49 |

The above script if named AUTO1 could be executed from the command line as follows:

WAM21 AUTO1 -cell 49

Inheritance

A WAMI key global variable can inherit the association of another WAMI key global variable by use of the WAM:SET command. An example script, with an indication of variable values, follows.

| SCRIPT | MSC | CELL | CCC | CCU | CCCVAR |
|--------|-----|------|-----|-----|--------|
|                    | 0 | 0  | 1      | 1      | ? |
| WAM:MSC5           | 5 | 0  | 1      | 1      | ? |
| WAM:CELL 49        | 5 | 49 | 1      | 1      | ? |
| WAM:CCCVAR         | 5 | 49 | CCCVAR | 1      | 2 |
| WAM:SET CCU CCC    | 5 | 49 | CCCVAR | CCCVAR | 2 |
| WAM:CONNECT TI     | 5 | 49 | CCCVAR | CCCVAR | 2 |
| TI:op:cell 49, ccc CCVAR, ccu CCCVAR | 5 | 49 | CCCVAR | CCCVAR | 2 |
| WAM:DISCONNECT TI  | 5 | 49 | CCCVAR | CCCVAR | 2 |
| WAM:ENDTEST        | 5 | 49 | CCCVAR | CCCVAR | 2 |

The above script if named AUTO1 could be executed from the command line as follows:

WAM21 AUTO1 -ccc 2

Association Transfers

A WAMI key global variable association can be transferred to another WAMI key global variable by use of the WAM:SETVAR command. An example script, with an indication of variable values, follows.

| SCRIPT | CCC | CCU | CCCVAR | CCUVAR |
|--------|-----|-----|--------|--------|
|                    | 1      | 1      | ? | ? |
| WAM:MSC 5          | 1      | 1      | ? | ? |
| WAM:CELL 49        | 1      | 1      | ? | ? |
| WAM:CCCVAR         | CCCVAR | 1      | 2 | ? |
| WAM:CCUVAR         | CCCVAR | CCUVAR | 2 | 4 |
| WAM:CONNECT TI     | CCCVAR | CCUVAR | 2 | 4 |
| TI:op:cell 49, ccc CCCVAR, ccu CCUVAR | CCCVAR | CCUVAR | 2 | 4 |
| WAM:SETVAR CCUVAR CCC | CCCVAR | CCCVAR | 2 | CCCVAR |
| TI:op:cell 49, ccc CCCVAR, ccu CCCVAR | CCCVAR | CCCVAR | 2 | CCCVAR |

-continued

| SCRIPT | CCC | CCU | CCCVAR | CCUVAR |
|---|---|---|---|---|
| WAM:DISCONNECT TI | CCCVAR | CCCVAR | 2 | CCCVAR |
| WAM:ENDTEST | CCCVAR | CCCVAR | 2 | CCCVAR |

The above script if named AUTO1 could be executed from the command line as follows: WAM21 AUTO1 -ccc 2 -ccu 4.

A example WAMIL Script With VAR Variables

| SCRIPT | MSC | CELL | CCC | CCU |
|---|---|---|---|---|
|  | 0 | 0 | 1 | 1 |
| WAM:MSCVAR | MSCVAR | 0 | 1 | 1 |
| WAM:CELLVAR | MSCVAR | CELLVAR | 1 |  |
| WAM:CCCVAR | MSCVAR | CELLVAR | CCCVAR | CCUVAR |
| WAM:CCUVAR | MSCVAR | CELLVAR | CCCVAR | CCUVAR |
| WAM:CONNECT TI | MSCVAR | CELLVAR | CCCVAR | CCUVAR |
| TI:op:cell CELLVAR, ccc CCCVAR, ccu CUVAR |  |  |  |  |
| WAM:DISCONNECT TI | MSCVAR | CELLVAR | CCCVAR | CCUVAR |
| WAM:ENDTEST | MSCVAR | CELLVAR | CCCVAR | CCUVAR |

The above script if named AUTO1 could be executed from the command line as follows:

WAM21 AUTO1 -msc 5 -cell 49 -ccc 2 -ccu 4

Referencing WAMI VAR Variables Within Strings

To reference an auxiliary WAMI VAR variable within a string it can (in this embodiment of the WAMIL language) be associated to a WAMI key global variable first. There is no way to directly reference it.

For example, the following example script lines print the value of CELL which has been assigned 49.

WAM:CELL 49

WAM:PRINT The script CELL number is CELLVAR.

If the cell number is passed as an argument during command line execution, for example -cell 101, the following script lines,

WAM:CELLVAR

WAM:PRINT The script CELL number is CELLVAR.

will generate output to the script WAMIL report file as follows:

The script CELL number is 101.

Creating WAMI VAR Variables

WAMI VAR variables can be created with the CREATEVAR command.

The new VAR variable created will be of type integer.

The new VAR variable can be associated with any (in this WAMIL language embodiment) WAMI global variable.

A complimentary WAMI global variable is also created simultaneously, but it is not a key global variable (key variable).

WAMI VARn LIST

Not only (in this embodiment of the WAMIL language) can single variables be set in the WAMIL language, but an interface command can access an entry in any (in this WAMIL language embodiment) array of variables, i.e., a list.

Auxiliary/Complementary WAMI Global Variable LIST

A WAMI key global variable can be set to a value, set to point to a WAMI VAR variable, or set to point to a WAMI VARn variable (an element in a list, i.e., a one-dimensional array).

WAMI VARn variables do not support Inheritance nor Association Transfers because they are elements of a list.

LIST Declaration Commands

A LIST can (in this embodiment of the WAMIL language) first be declared before WAMI VARn variables from a LIST can be used within a script.

A LIST can be declared anywhere within a WAMIL script.

The LIST size is provided as an argument with a LIST declaration command.

VARn Variables

LIST VARn variables are referenced using a numerical index into the LIST that is appended to the text string, VAR. The first VARn variable has an index of 1. An example script with an indication of variable values, follows.

|  | BBA | BBALIST |
|---|---|---|
| SCRIPT | 1 | ? |
| WAM:MSC 5 | 1 | ? |
| WAM:CELL 49 | 1 | 2 4 6 |
| WAM:BBALIST 3 | 1 | 2 4 6 |
| WAM:CONNECT TI | 1 | 2 4 6 |
| WAM:SET BBA BBAVAR1 | 2 | 2 4 6 |
| TI:op:cell 49, bba BBAVAR1 | 2 | 2 4 6 |
| WAM:SET BBA BBAVAR2 | 4 | 2 4 6 |
| TI:op:cell 49, bba BBAVAR2 | 4 | 2 4 6 |
| WAM:SET BBA BBAVAR3 | 6 | 2 4 6 |
| TI:op:cell 49, bba BBAVAR3 | 6 | 2 4 6 |
| WAM:DISCONNECT TI | 6 | 2 4 6 |
| WAM:ENDTEST | 6 | 2 4 6 |

The above script if named AUTO1 could be executed from the command line as follows:

WAM21 AUTO1 -bbalist 2 4 6 -endlist

VARn Type Commands

VARn variable referenced is automatically associated to the key global variables in the script. An example script, with an indication of variable values, follows.

| SCRIPT | BBA | BBALIST |
|---|---|---|
|  | 1 | ? |
| WAM:MSC5 | 1 | ? |
| WAM:CELL 49 | 1 | 2 4 6 |
| WAM:BBALIST 3 | 1 | 2 4 6 |
| WAM:BBAVAR1 | BBAVAR1 | 2 4 6 |
| WAM:CONNECT TI | BBAVAR1 | 2 4 6 |
| TI:op:cell 49, bba BBAVAR1 | BBAVAR1 | 2 4 6 |
| WAM:DISCONNECT TI | BBAVAR1 | 2 4 6 |
| WAM:ENDTEST | BBAVAR1 | 2 4 6 |

In line 4 of this example script, the key global variable BBA is associated with the first variable in the complimentary/auxiliary BBA list.

The above script if named AUTO1 could be executed from the command line as follows: WAM21 AUTO1 -bbalist 2 4 6 -endlist

Referencing VARn Variables Within Strings

A VARn variable can be directly referenced within a string, no association needs to be established.

WAM:PRINT The script BBA number is BBAVAR1.

WAMLIST

WAMLIST is a special WAM Interpreter LIST of infinite size.

No LIST size can (in this embodiment of the WAMIL language) be stated upon the declaration of a WAMLIST.

The WAMLIST string, e.g. (in the script below), "Enter Two BBA Numbers," provided as an argument can be used by other applications to prompt a user, or simply as a comment field.

WAMLIST VARn variables referenced outside the LIST return a blank value.

A WAMLIST can be declared anywhere within a WAMIL script. An example script, with an indication of variable values, follows.

| SCRIPT | BBA | WAMLIST |
|---|---|---|
| | 1 | ? |
| WAM:MSC5 | 1 | ? |
| WAM:CELL 49 | 1 | ? |
| WAM:WAMLIST Enter Two BBA Nos. | 1 | 2 4 |
| WAM:CONNECT TI | 1 | 2 4 |
| WAM:SET BBA WAMVAR1 | 2 | 2 4 |
| TI:op:cell 49, bba WAMVAR1 | 2 | 2 4 |
| WAM:SET BBA WAMVAR2 | 4 | 2 4 |
| TI:op:cell 49, bba WAMVAR2 | 4 | 2 4 |
| WAM:DISCONNECT TI | 4 | 2 4 |
| WAM:ENDTEST | 4 | 2 4 |

The above script if named AUTO1 could be executed from the command line as follows:

WAM21 AUTO1 -wamlist 2 4 -endlist

WAMIL Control Flow

Some aspect of the flow control that takes place during execution of a WAMIL script will now be discussed.

WAM Interpreter Buffer

Always holds output of the last interface command executed, unless altered.

Flushed prior to the execution of an interface command.

Can be flushed with WAM Interpreter command WAM:FLUSHBUFF

Can be appended to with WAITQUERY command execution.

Can be overwritten with execution of WAM:INPUT command.

Can be output to a file with execution of the WAM:OUTPUT or WAM:PUTS command.

CONNECT Command

Establishes a session between the WAM Interpreter and the interface provided as an argument.

WAM:CONNECT interface

Sets LFAIL flag if server login attempt fails.

Sets TFAIL flag if an interface command execution times out.

Sets CFAIL flag if an active session unexpectedly disconnects.

For SDP interface, sets SDPPORT flag if no vtty ports are available after a successful login, and SDPFAIL for any failure during the execution of an SDP interface command.

ENDTEST Command

Terminates the WAMIL script.

WAM:ENDTEST

Terminates all (in this embodiment of the WAMIL language) active sessions upon execution.

Can (in this embodiment of the WAMIL language) be included at the end of a script or a syntax error will be generated.

IF:OMSG Construct

Searches the WAM Interpreter buffer for the string provided as an argument.

IF:OMSG string

Argument string can include global-style matching patterns (*, ?, [ ], \).

It can include references to WAMI key global variables and VARn variables.

A match evaluates as TRUE, while no match evaluates as FALSE. An example script follows.

WAM:MSC 5
WAM:CELL 49
WAM:CCC 4
WAM:CONNECT TI
TI:op:cell 49
IF:OMSG OP:CELL CELLVAR CCC CCCVAR, ACTRVE
THEN:CONTINUE
ELSE:PRINT CCC CCCVAR is not active.
WAM:DISCONNECT TI
WAM:ENDTEST

IF THEN ELSE Construct

Can (in this embodiment of the WAMIL language) be complete and include an IF, and at a minimum one THEN and one ELSE.

Multiple THEN and ELSE command can exist within a construct.

Supports the WAM Interpreter WAITQUERY command which camps on the TI interface. An example script follows.

WAM:MSC 5
WAM:CELL 49
WAM:CCC 4
WAM:CONNECT TI
TI:rst:cell 49, ccc 4
TI:op:cell 49
IF:OMSG OP:CELL CELLVAR CCC CCCVAR, ACTIVE
THEN:CONTINUE
THEN:PRINT CCC CCCVAR is active.
ELSE:WAITQUERY 5 TI 10
WAM:DISCONNECT TI
WAM:ENDTEST

IF THENDO ELSEDO ENDIF Construct

All the commands between the THENDO and ELSEDO constructs are executed if the result of the IF command execution is TRUE, and all (in this embodiment of the WAMIL language) the commands between the ELSEDO and ENDIF are executed if the result of the IF command execution is FALSE.

All WAMIL IF THENDO ELSEDO ENDIF constructs can (in this embodiment of the WAMIL language) be complete and include an IF, a THENDO, an ELSEDO, and an ENDIF.

Any WAMIL IF THEN ELSE construct can be nested within any (in this WAMIL language embodiment) THENDO ELSEDO, or ELSEDO ENDIF construct. Also, IF THENDO ELSEDO ENDIF constructs can be nested within other IF THENDO ELSEDO ENDIF constructs, as desired.

WHILE ENDWHILE Construct

Continuously loops through the execution of a group of commands until WHILE TEST_EXPR evaluates false.

Supports the BREAK: command to break out of the loop at any (in this WAMIL language embodiment) time. An example script follows.

```
WHILE:TEST_EXPR CELLVAR LT 223
   TI:op:cell CELLVAR
   WAM:INCRVAR CELLVAR 1
ENDWHILE:
```

An example WAML Script That Illustrates Control Flow

```
WAM:MSC 5
WAM:CELL 49
WAM:CCC 4
WAM:CONNECT TI
TI:rst:cell 49, ccc 4
TI:op:cell 49
IF:OMSG OP:CELL CELLVAR CCC CCCVAR,
   ACTIVE
THENDO:
   WAM:PRINT CCC CCCVAR is active script will con-
     tinue.
ELSEDO:
   IF:OMSG OP:CELL CELLVAR CCC CCCVAR,
     ACTIVE
   THEN:CONTINUE
ELSE:WAITQUERY 5 TI 10
   IF:OMSG OP:CELL CELLVAR CCC CCCVAR,
     ACTIVE
   THENDO:
   ELSEDO:
     WAM:PRINT CCC CCCVAR never became active.
     WAM:ENDTEST
   ENDIF:
ENDIF:
TI:dgn:cell 49, ccc 4
IF:OMSG COMPLETED
THEN:CONTINUE
ELSE:WAITQUERY 5 TI 10
WAM:DISCONNECT TI WAM:ENDTEST
```

SPOOL Command

The WAMIL SPOOL command which adjust the pause of the spooler.

GET_TI Command

The WAMIL GET_TI command which allows assignment of an output message value to a script VAR variable.

TRACE Command

TRACE command with specified options allows low level tracing of WAMIL commands and variables during a script execution.

TRACE can be turned on with TRACEON command, or off with TRACEOFF command, at any (in this WAMIL language embodiment) time during execution of a script.

Opens a TRACE display window to allow viewing of actual TRACE during script execution.

Creates a trace log file called, wam.tracelog, which is located in the user's HOME wam.trace sub-directory and is appended to during the execution of any (in this WAMIL language embodiment) TRACE.

The following table indicates arguments that can be passed to the TRACE command. It is noted that every (in this embodiment of the WAMIL language) WAM Interpreter command can be traced by substituting the name of the command for the argument, x, that can be appended to the TRACE command.

| TRACE | OPTION |
| --- | --- |
| WAMI command execution level | x |
| WAMI executor states | i |
| WAMI session states | f |
| WAMI variables | v |
| WAMI stack | s |
| WAMI buffer | o |

PAUSE Command

The WAMIL PAUSE command can be used for semi-automation, or to prompt the user for a decision.

Upon execution of the PAUSE command, a box is displayed, prompting the user to decide whether the script execution should be continued or aborted:

File Creation

The WAMIL PUTS command can be used to create files from within a script. The following example script creates a file used to update an APXRCV DB form.

```
WAM:MSCVAR
WAM:CELLVAR
WAM:ANTVAR
WAM:WAMLIST Enter a value for t_add and a value for
   t_drop
WAM:PUTS HOME TEMP.dbf t_add=WAMVAR1
WAM:PUTS HOME TEMP.dbf t_drop=WAMVAR2
WAM:PUTAPX ceqface TEMP
WAM:UNIX rm TEMP.dbf
WAM:ENDTEST
```

Script Looping

A WAMIL script can be looped using the -loop option. In the following example the script AUTO1 is looped 10 times.

WAM21 AUTO1 -loop 10

UNIX Command

The WAMIL UNIX command allows the execution of any (in this WAMIL language embodiment) UNIX executable from within a WAMIL script.

The following example script executes another WAMIL script using the UNIX command, after using the UNIX command to delete a temporary file. The executed WAMIL script process is then stopped after three minutes:

WAM:MSCVAR
WAM:CELLVAR
WAM:ANTVAR
WAM:WAMLIST Enter a value for t_add and a value for t_drop
WAM:PUTS HOME TEMP.dbf t_add=WAMVAR1
WAM:PUTS HOME TEMP.dbf t_drop=WAMVAR2
WAM:PUTAPX ceqface TEMP
WAM:UNIX rm TEMP.dbf
WAM:UNIX WAM21 jt1234 -msc MSCVAR -cell CELLVAR &
WAM:WAIT 180
WAM:UNIX kill –9 WAMVAR
WAM:ENDTEST

WAMI Linker

WAMIL scripts can be linked by creation of a Linker script. The WAM Interpreter LINK:EXEC command can be used to define the execution mode of the linked scripts.

A detailed glossary of WAMI Link commands is presented later in this document.

Serial or Parallel Execution

A linked script can be executed in a serial or parallel fashion.

In a serial fashion execution of the next Linker script command does not start until the linked script has completed execution. WAMI key global variables can be altered by a serially executed linked script.

In a parallel fashion the linked script is launched and becomes independent of the Linker script. WAMI key global variables CANNOT be altered by a script executed in a parallel fashion.

A WAMIL Linker Script

An example WAMIL Linker script below links four WAMIL scripts together. Two of the scripts are executed in a serial fashion:

LINK:EXEC PARALLEL
LINK:SCRIPT HOME jt1234
LINK:SCRIPT HOME jt2023
LINK:EXEC SERIAL
LINK:SCRIPT HOME jt4567
LINK:SCRIPT HOME jt9988
WAM:ENDTEST

The above Linker script if named AUTO1 could be executed from the command line as follows: WAM21 AUTO1 -link.

Linker Script Output

WAMIL Linker scripts generate their own output files. Linker output files also include output from serially executed linked scripts. Linked WAMIL scripts also generate their own output file.

If the above Linker script was named LINKAUTO, execution of the script would generate five separate output files:

LINKAUTO.rpt, jt1234.rpt, jt2023, jt4567.rpt, jt9988.rpt

Commands Embeddable Within Integration Construct Data Structure

A table listing the names of WAMI Interface Commands that can be embedded in the integration construct data structure, according to the invention, follows immediately. More detailed discussions of each of the commands are provided after the table.

| WAMI Interface Commands | | | | |
|---|---|---|---|---|
| ADDCE | CGSA | FLUSHTAGS | OC | SG |
| ADRS | CLOSE | GEN | OPEN | SPOOL |
| ANT | COMMENT | GENVAR | OUTPUT | SU |
| ANTVAR | CONFIG | GETAPX | OUTPUTOFF | SW |
| APXVAR | CONNECT | GETAPXFLD | OUTPUTON | TIME |
| AU | CREATEVAR | GETCELLS | PAUSE | TTMEOUT |
| BBA | CSC | GETGEN | PH | TIMER |
| BBALIST | CSCVAR | GETLISTVAR | PL | TP |
| BBAVAR | DATE | GETROP | PRINT | TRACE |
| BBAVARn | DCCH | GETSDP | PUTAPX | TRACEOFF |
| CAT | DCS | GET_TI | PUTAPXFLD | TRACEON |
| CATLIST | DECR | INCR | PUTS | TRKGRP |
| CATVARn | DECRVAR | INCRVAR | RA | TRKMBR |
| CCC | DELCE | INITIALIZE | RALIST | UNIX |
| CCCLIST | DISCONNECT | INPUT | RAVAR | VRADPC |
| CCCVAR | DISPLAY | LAC | RAVARn | VRN |
| CCCVARn | DL | LAUNCH | REPORT | WAIT |
| CCU | DSI | LC | RESTOREWAM | WAM |
| CCULIST | ECP | LMT | RG | WAMLIST |
| CCUVAR | EMAILME | LOOPCELL | RPT | WAMVAR |
| CCUVARn | EMAILRPT | LOOPCELLVARS | SAVEWA | WMMI |
| CDMADPC | ENDTEST | MATHVAR | SEND | WMMI_GET |
| CE | EXEC | MICROCELL | SET | WMMI_SEND |
| CELL | FLUSHBUFF | MSC | SETLISTVAR | WMMI_STOP |
| CELLVAR | FLUSHIP | MSCVAR | SETVAR | XMITC |

Each WAMIL command in this section will be explained in detail. A quick purpose is presented along with its syntax and an example of the command. There is also a detailed description along with errors generated, if any, and the output generated by the command to the WAMIL report file. If the command alters key variables, these key variables are stated. An example script is also provided for almost all (in this embodiment of the WAMIL language) the commands. Each example is simple, but serves as a basis to enhance understanding of the command in the context of a WAMIL script.

For execution of WAMIL scripts via the WAMI GUI Platform, WAMIL commands with dual functions that also generate a response from the WAMI GUI Platform have a section which discusses how the platform handles the command.

Glossary of WAMI Interface Commands

This section presents a detailed glossary of commands that can be embedded in the integration construct data structure according to the invention. The integration construct data structure, again, is also known as a WAM interface command. These commands are best suited to the WAM Interpreter. They commands can be used in WAMIL scripts to change script variables, input/output parameters, or perform specific functions or capabilities.

Again, a WAM interface command is structured as, e.g.,

WAM:CELL 93 where CELL is the actual WAM interface command and the value of 93 is the command argument.

The glossary begins with the command, ADDCE, and ends with the command, XMITC.

ADDCE

The ADDCE command can be embedded in the integration construct data structure according to the invention.
PURPOSE: This command changes the WAMI global number of channel elements to add the variable, ADDCE, to the value provided as an argument.
SYNTAX: WAM:ADDCE value
EXAMPLE CALL: WAM:ADDCE 2
DESCRIPTION: The ADDCE command sets the WAMI global number of channel elements to add variable to the value provided as an argument. After execution of this command, all (in this embodiment of the WAMIL language) subsequent commands which require use of the global number of channel elements to add variable, and all (in this embodiment of the WAMIL language) IF-construct commands which test the current script global number of channel elements to add variable, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution of an ADDCE command:

Set Number Of Channel Elements to Add To 2
ERRORS: None.
ALTERS: ADDCE
DEFAULT VALUE: ADDCE is set to 0 upon initial startup, and is of type string. The WAM:INITIALIZE command also sets this variable to 0.
SEE ALSO: WAM:INITIALIZE

ADRS

The ADRS command can be embedded in the integration construct data structure according to the invention.
PURPOSE: Changes the WAMI global memory address number variable, ADRS, to the value provided as an argument.
SYNTAX: WAM:ADRS value
EXAMPLE CALL: WAM:ADRS X'500be020,18
DESCRIPTION: The WAM:ADRS command sets the WAMI global memory address number variable to the value provided as an argument. After execution of this command, all (in this embodiment of the WAMIL language) subsequent commands which require use of an memory address number, and all (in this embodiment of the WAMIL language) IF-construct commands which test the current script memory address number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution of an ADRS command:

Set Memory Address To X'500be020,18
ERRORS: None.
ALTERS: ADRS
DEFAULT VALUE: ADRS is set to NULL upon initial startup, and is of type string. The WAM:INITIALIZE command also sets this variable to NULL.
SEE ALSO: WAM:INITIALIZE
EXAMPLE: The following script lines will set the WAMIL script ADRS variable to X500be020,18 and then execute a TI interface command:

WAM:CELL 49
WAM:CCC 2
WAM:ADRS X500be020,18
TI:dump:cell 49, ccc 2; adrs X500be020,18

ANT

The ANT command can be embedded in the integration construct data structure according to the invention.
PURPOSE: Changes the WAMI global antenna face variable, ANT, to the value provided as an argument.
SYNTAX: WAM:ANT value
EXAMPLE CALL: WAM:ANT 1
DESCRIPTION: The WAM:ANT command sets the WAMI global antenna face variable to the value provided as an argument. After execution of this command, all (in this embodiment of the WAMIL language) subsequent commands which require use of an antenna face number, and all (in this embodiment of the WAMIL language) IF-construct commands which test the current script antenna face number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution an ANT command:

Set Antenna Face 1
ERRORS: None.
ALTERS: ANT
DEFAULT VALUE: ANT is set to 0 upon initial startup, and is of type integer. The WAM:INITIALIZE command also sets this variable to 0.

SEE ALSO: WAM:INITIALIZE
EXAMPLE: The following script lines will set the WAMIL script ANT variable to 1 and then execute a TI interface command:
  WAM:CELL 49
  WAM:ANT 1
  TI:op:cell 49, sg 0, ant 1, all!

ANTVAR

The ANTVAR command can be embedded in the integration construct data structure according to the invention.
PURPOSE: Declares to the WAM Interpreter, that a value for the WAMI VAR variable ANTVAR will be supplied to the script.
SYNTAX: WAM:ANTVAR
EXAMPLE CALL: WAM:ANTVAR
DESCRIPTION: The WAM:ANTVAR command is a WAMIL declaration command which executes an assignment function. Upon detection of this command, the WAM Interpreter will search the command line arguments for a value to assign to the WAMI VAR variable ANTVAR.

Like standard WAMI VAR variable declaration commands, the execution of this command also enables an association with the WAMI global ANT variable. Therefore, until the WAMI global ANT variable association is transferred to another WAMI VAR variable, or disabled, all (in this embodiment of the WAMIL language) references to the WAMI global ANT variable will use the ANTVAR variable value.

For script syntax, until an actual ANT number is passed as an argument, when a ANTVAR command is used the ANT number within a script shall be referenced as ANTVAR from that point forward.

This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:ANTVAR is encountered the WAMI GUI platform will prompt the user for the script ANTVAR value. Subsequent WAM:ANTVAR commands encountered will not cause additional prompting.
SCRIPTOR: If a ANTVAR command is deleted from the current script, the Scriptor will prompt the user for a ANT number and then insert a WAM:ANT value command in place of the ANTVAR command deleted.
OUTPUT: The following is an example of the output generated to the WAMIL report file, upon execution a ANTVAR command:
  Set ANT To Argument Value of 2
ERRORS: If no command line value has been provided, the WAM Interpreter will generate an error and script execution will be aborted.
ALTERS: ANTVAR
DEFAULT VALUE: ANTVAR is set to an unknown state upon initial startup, and is of type integer. The WAM:INITIALIZE command does not reset this WAMI VAR variable.
SEE ALSO: WAM:ANT value
EXAMPLE: The following script executes a TI command for the ANT number supplied:
  WAM:MSC 5
  WAM:CELL 49
  WAM:SG 0
  WAM:ANTVAR
  WAM:CONNECT TI
  TI:op:cell 49, sg 0, ant ANTVAR, all!
  WAM:DISCONNECT TI
  WAM:ENDTEST

APXVAR

The APXVAR command can be embedded in the integration construct data structure according to the invention.
PURPOSE: Declares to the WAM Interpreter, that a value or string for the WAMI VAR variable APXVAR will be supplied to the script.
SYNTAX: WAM:APXVAR prompt string
EXAMPLE CALL: WAM:APXVAR Enter Neighbor Cell Number
DESCRIPTION: The WAM:APXVAR command is a WAMIL declaration command which executes an assignment function. Upon detection of this command, the WAM Interpreter will (for this embodiment of the WAMIL language) search the command line arguments for a value or string to assign to the WAMI VAR variable APXVAR. Unlike other WAMI VAR variable declaration commands, the execution of this command does not enable an association with a WAMI global variable since there is no complementary APX WAMI global variable.

This command has a dual function. The prompt_string argument, although not used by the WAM Interpreter, will generate a syntax error if omitted. For prompt_string use refer to the WAMI GUI PLATFORM section below.
WAMI GUI PLATFORM: Prior to execution of a WAMIL script, the WAMI GUI platform searches the script for special commands. If a WAM:APXVAR is encountered the WAMI GUI platform will prompt the user, using prompt_string, for the script APXVAR value or string. Subsequent WAM:APXVAR commands encountered will not cause additional prompting.
OUTPUT: The following is an example of the output generated to the WAMIL report file, upon execution an APXVAR command:
  Set APXVAR To Argument Value of 173
ERRORS: The prompt_string argument, although not used by the WAM Interpreter, will generate a syntax error if omitted.
If no command line value or string has been provided, the WAM Interpreter will generate an error and script execution will be aborted.
ALTERS: APXVAR
DEFAULT VALUE: APXVAR is set to an unknown state upon initial startup, and is of type string. The WAM:INITIALIZE command does not reset this WAMI VAR variable.
SEE ALSO: WAM:WAMVAR prompt_string
EXAMPLE: The following script adds a neighbor to cell 49:
  WAM:MSC 5
  WAM:CELL 49
  WAM:ANT 1
  WAM:SG 0
  WAM:APXVAR Enter Neighbor Cell Number
  WAM:PUTAPXFLD fci cdmanbr_list1.ncs_c[1]= APXVAR
  WAM:ENDTEST

AU

The AU command can be embedded in the integration construct data structure according to the invention.
PURPOSE: Changes the WAMI global cell amplifier unit number variable, AU, to the value provided as an argument.

SYNTAX: WAM:AU value
EXAMPLE CALL: WAM:AU 1
DESCRIPTION: The WAM:AU command sets the WAMI global cell amplifier unit number variable to the value provided as an argument. After execution of this command, all (in this embodiment of the WAMIL language) subsequent commands which require use of the cell amplifier unit number, and all (in this embodiment of the WAMIL language) IF-construct commands which test the current script cell amplifier unit number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution an AU command:

Set Amplifier Unit 1
ERRORS: None.
ALTERS: AU
DEFAULT VALUE: AU is set to 1 upon initial startup, and is of type integer. The WAM:INITIALIZE command also sets this variable to 1.
SEE ALSO: WAM:INITIALIZE
EXAMPLE: The following script lines will set the WAMIL script AU variable to 1 and then execute a TI interface command:

WAM:CELL 49

WAM:AU 1

TI:op:cell 49, au 1

BBA

The BBA command can be embedded in the integration construct data structure according to the invention.
PURPOSE: Changes the WAMI global BCR-BIU-ACU trio variable, BBA, to the value provided as an argument.
SYNTAX: WAM:BBA value
EXAMPLE CALL: WAM:BBA 4
DESCRIPTION: The WAM:BBA command sets the WAMI global BBA number variable to the value provided as an argument. After execution of this command, all (in this embodiment of the WAMIL language) subsequent commands which require use of the BCR-BIU-ACU trio number, and all (in this embodiment of the WAMIL language) IF-construct commands which test the current script BCR-BIU-ACU trio number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution an BBA command:

Set BCR-BIU-ACU Trio 4:

BCR (BaseBand Combiner/Radio)

BIU (Bus Interface Unit)

ACU (Analog Conversion Unit)
ERRORS: None.
ALTERS: BBA
DEFAULT VALUE: BBA is set to 1 upon initial startup, and is of type integer. The WAM:INITIALIZE command also sets this variable to 1.
SEE ALSO: WAM:INITIALIZE
EXAMPLE: The following script will set the WAMIL script BBA variable to 4 and then execute a TI interface command:

WAM:MSC 5

WAM:CELL 49

WAM:CONNECT TI

WAM:BBA 4

TI:op:cell 49, bba 4

WAM:DISCONNECT TI

WAM:ENDTEST

BBALIST

The BBALIST command can be embedded in the integration construct data structure according to the invention.
PURPOSE: Declares to the WAM Interpreter, that a list of WAMI VARn BBA numbers will be supplied to the script.
SYNTAX: WAM:BBALIST value
EXAMPLE CALL: WAM:BBALIST 3
DESCRIPTION: The BBALIST command is a WAMIL declaration command which instructs the WAM Interpreter that a list of BBA numbers will be supplied to the script. This command executes the assignment of the BBA numbers provided to the WAMI VARn BBA List.

Upon detection of this command, the WAM Interpreter will search the command line arguments for the BBA numbers. The total number of BBAs to assign is determined by the value argument of the command. This value declares to the WAM Interpreter the exact size of the BBA List. The BBA numbers within the BBA List can then be referenced within the script as WAMI VARn variables, according to their index position in the list. For example, BBAVAR2 refers to the second BBA number in the BBA List. The order of the BBA numbers provided determine the order of their placement within the BBA List.

Up to 30 BBA numbers can be passed as an argument with this command. Therefore, the maximum acceptable size for the BBA List is 30. If a value larger than 30 is used, the WAM Interpreter will generate an error and script execution will be aborted.

This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:BBALIST command is encountered the WAMI GUI platform will prompt the user for the quantity of BBA numbers defined by the command argument value. Subsequent WAM:BBALIST commands encountered will not cause additional prompting.
SCRIPTOR: If this command is deleted from the current script, the WAMIL Scriptor will delete all (in this embodiment of the WAMIL language) reference BBAVARn commands existing in the script also. The script WAMIglobal BBA variable will then be set to the default value of 1.

The Scriptor will only (in this embodiment of the WAMIL language) allow insertion of one BBALIST command into the current script.
OUTPUT: The following is an example of the output generated to the WAMIL report file upon execution of a BBALIST command:

Total Number of BBA List Values Set To 4

BBA List Values: 2 4 6 8
ERRORS: If a value larger than 30 is used the WAM Interpreter will generate an error and script execution will be aborted.

Any references within a script to a WAMIVARn variable prior to the declaration of the list will generate a syntax error.

If more than one BBALIST command is used in a WAMIL script, only (in this embodiment of the WAMIL language) the first list declaration is used, and therefore takes precedence. Thus subsequent BBALIST commands have no effect.
ALTERS: WAMIVARn BBA List.
DEFAULT VALUE: The WAMIVARn BBA List variable is set to an unknown state upon initial startup, and is of type integer. The WAM:INITIALIZE command does not reset this list.
SEE ALSO: WAM:BBAVARn, WAM:INITIALIZE
EXAMPLE: The following script sets the WAMIVARn BBA List length to 2, and executes a TI command for each BBA number in the list:
  WAM:MSC 5
  WAM:CELL 49
  WAM:BBALIST 2
  WAM:CONNECT TI
  WAM:BBAVAR1
  TI:op:cell 49, bba BBAVAR1
  WAM:BBAVAR2
  TI:op:cell 49, bba BBAVAR2
  WAM:DISCONNECT TI
  WAM:ENDTEST

BBAVAR

The BBAVAR command can be embedded in the integration construct data structure according to the invention.
PURPOSE: Declares to the WAM Interpreter, that a value for the WAMIVAR variable BBAVAR will be supplied to the script.
SYNTAX: WAM:BBAVAR
EXAMPLE CALL: WAM:BBAVAR
DESCRIPTION: The WAM:BBAVAR command is a WAMIL declaration command which executes an assignment function. Upon detection of this command, the WAM Interpreter will search the command line arguments for a value to assign to the WAMI VAR variable BBAVAR.

Like standard WAMI VAR variable declaration commands, the execution of this command also enables an association with the WAMI global BBA variable. Therefore, until the WAMI global BBA variable association is transferred to another WAMI VAR variable, or disabled, all (in this embodiment of the WAMIL language) references to the WAMI global BBA variable will use the BBAVAR variable value.

For script syntax, until an actual BBA number is passed as an argument, when a BBAVAR command is used the BBA number within a script shall be referenced as BBAVAR from that point forward.

This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:BBAVAR is encountered the WAMI GUI platform will prompt the user for the script BBAVAR value. Subsequent AM:BBAVAR commands encountered will not cause additional prompting.
SCRIPTOR: If a BBAVAR command is deleted from the current script, the Scriptor will prompt the user for a BBA number and then insert a WAM:BBA value command in place of the BBAVAR command deleted.
OUTPUT: The following is an example of the output generated to the WAMIL report file, upon execution a BBAVAR command:
  Set BBA To Argument Value of 8
ERRORS: If no command line value has been provided, the WAM Interpreter will generate an error and script execution will be aborted.
ALTERS: BBAVAR
DEFAULT VALUE: BBAVAR is set to an unknown state upon initial startup, and is of type integer. The WAM:INITIALIZE command does not reset this WAMI VAR variable.
SEE ALSO: WAM:BBA value
EXAMPLE: The following script executes a TI command for the BBA number supplied:
  WAM:MSC 5
  WAM:CELL 49
  WAM:BBAVAR
  WAM:CONNECT TI
  TI:op:cell 49, bba BBAVAR
  WAM:DISCONNECT TI
  WAM:ENDTEST

BBAVARn

The BBAVARn command can be embedded in the integration construct data structure according to the invention.
PURPOSE: Instructs the WAM Interpreter to set the WAMI global BBA variable to the value of the referenced WAMI VARn BBA variable, in position n, of the BBA List passed as an argument.
SYNTAX: WAM:BBAVARn
EXAMPLE CALL: WAM:BBAVAR2
DESCRIPTION: The WAM:BBAVARn command is an assignment command. This command can only (in this embodiment of the WAMIL language) be executed if a BBA List has been declared in the script. Upon execution, this command assigns a BBA List variable value to the WAMI global BBA variable.

The value n, can (in this embodiment of the WAMIL language) be a valid index into the BBA List. any (in this WAMIL language embodiment) BBA List value can be assigned to the WAMI global BBA variable by execution of this command, where n is the BBA value location within the BBA List. Upon execution, the BBA number within a script is referenced as BBAVARn from that point forward.

Like standard WAMI VARn variable assignment commands, the execution of this command also enables an association with the WAMI global BBA variable. Therefore, until the WAMI global BBA variable association is transferred to a WAMI VAR variable, or disabled, all (in this embodiment of the WAMIL language) references to the WAMI global BBA variable will use the BBAVARn variable value.

For script syntax, until actual BBA List values are passed as an argument, when a BBAVARn command is used the BBA number within a script shall be referenced as BBAVARn from that point forward.
OUTPUT: The following is an example of the output generated to the WAMIL report file upon execution of a BBAVARn command, when a BBA List of 3 was previously declared, and the BBA List numbers passed as an argument are 2 4 6:
  Set BBA To BBAVAR2 Value Of 4
SCRIPTOR: If a BBAVARn command is deleted from the current script, the Scriptor will prompt the user for a BBA number and then insert a WAM:BBA value command in place of the BBAVARn command deleted.
ERRORS: An invalid BBAVARn command used within a script, where n refers to a BBA List index outside the list range, will generate an error. Script execution will then be aborted.
If a BBAVARn command is used within a script in which no BBA List has been declared, the WAM Interpreter will generate an error and terminate execution of the script.
ALTERS: BBA
DEFAULT VALUE: None (in this WAMIL language embodiment).
SEE ALSO: WAM:BBA value, WAM:BBALIST value
EXAMPLE: The following script sets the WAMI VARn BBA List length to 2, and executes a TI command for each BBA number in the list:
  WAM:MSC 5
  WAM:CELL 49
  WAM:BBALIST 2
  WAM:CONNECT TI
  WAM:BBAVAR1
  TI:op:cell 49, bba BBAVAR1
  WAM:BBAVAR2
  TI:op:cell 49, bba BBAVAR2
  WAM:DISCONNECT TI
  WAM:ENDTEST

CAT

The CAT command can be embedded in the integration construct data structure according to the invention.
PURPOSE: Changes the WAMI global clock and tone board number variable, CAT, to the value provided as an argument.
SYNTAX: WAM:CAT value
EXAMPLE CALL: WAM:CAT 6
DESCRIPTION: The WAM:CAT command sets the WAMI global CAT variable to the value provided as an argument. After execution of this command, all (in this embodiment of the WAMIL language) subsequent commands which require use of the clock and tone board number, and all (in this embodiment of the WAMIL language) IF-construct commands which test the current script clock and tone board number, will reference the new value.
Execution of this command also disables any (in this WAMIL language embodiment) association which exists between this WAMI global variable and any WAMI VAR variable.
OUTPUT: The following is an example of the output generated to the WAMIL report file, upon execution a CAT command:
  Set Clock and Tone Board 6
ERRORS: None.
ALTERS: CAT
DEFAULT VALUE: CAT is set to 0 upon initial startup, and is of type integer. The WAM:INITIALIZE command also sets this variable to 0.
SEE ALSO: WAM:INITIALIZE
EXAMPLE: The following script lines set the WAMIL script CAT variable to 6 and then execute a TI interface command:
  WAM:CELL 49
  WAM:CAT 6
  TI:op:cell 49, cat 6

CATLIST

The CATLIST command can be embedded in the integration construct data structure according to the invention.
PURPOSE: Declares to the WAM Interpreter, that a list of WAMI VARn CAT numbers will be supplied to the script.
SYNTAX: WAM:CATLIST value
EXAMPLE CALL: WAM:CATLIST 3
DESCRIPTION: The CATLIST command is a WAMIL declaration command which instructs the WAM Interpreter that a list of CAT numbers will be supplied to the script. This command executes the assignment of the CAT numbers provided to the WAMI VARn CAT List.
Upon detection of this command, the WAM Interpreter will search the command line arguments for the CAT numbers. The total number of CATs to assign is determined by the value argument of the command. This value declares to the WAM Interpreter the exact size of the CAT List. The CAT numbers within the CAT List can then be referenced within the script as WAMI VARn variables, according to their index position in the list. For example, CATVAR2 refers to the second CAT number in the CAT List. The order of the CAT numbers provided determine the order of their placement within the CAT List.
Up to 10 CAT numbers can be passed as an argument with this command. Therefore, the maximum acceptable size for the CAT List is 10. If a value larger than 10 is used the WAM Interpreter will generate an error and script execution will be aborted.
This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:CATLIST command is encountered the WAMI GUI platform will prompt the user for the quantity of CAT numbers defined by the command argument value. Subsequent WAM:CATLIST commands encountered will not cause additional prompting.
SCRIPTOR: If this command is deleted from the current script, the WAMIL Scriptor will delete all (in this embodiment of the WAMIL language) reference CATVARn commands existing in the script also. The script WAMI global CAT variable will then be set to the default value of 0.
The Scriptor will only (in this embodiment of the WAMIL language) allow insertion of one CATLIST command into the current script.
OUTPUT: The following is an example of the output generated to the WAMIL report file upon execution of a CATLIST command:
  Total Number of CAT List Values Set To 3
  CAT List Values: 0 6 7
ERRORS: If a value larger than 10 is used the WAM Interpreter will generate an error and script execution will be aborted.
Any references within a script to a WAMI VARn variable prior to the declaration of the list will generate a syntax error.
If more than one CATLIST command is used in a WAMIL script, only (in this embodiment of the WAMIL language) the first list declaration is used, and therefore takes precedence. Thus subsequent CATLIST commands have no effect.
ALTERS: WAMI VARn CAT List.
DEFAULT VALUE: The WAMI VARn CAT List variable is set to an unknown state upon initial startup, and is of type integer. The WAM:INITIALIZE command does not reset this list.
SEE ALSO: WAM:CATVARn, WAM:INITIALIZE
EXAMPLE: The following script sets the WAMI VARn CAT List length to 2, and executes a TI command for each CAT number in the list:

WAM:MSC 5
WAM:CELL 49
WAM:CATLIST 2
WAM:CONNECT TI
WAM:CATVAR1
TI:op:cell 49, cat CATVAR1
WAM:CATVAR2
TI:op:cell 49, cat CATVAR2
WAM:DISCONNECT TI
WAM:ENDTEST

CATVARn

The CATVARn command can be embedded in the integration construct data structure according to the invention.
PURPOSE: Instructs the WAM Interpreter to set the WAMI global CAT variable to the value of the referenced WAMI VARn CAT variable, in position n, of the CAT List passed as an argument.
SYNTAX: WAM:CATVARn
EXAMPLE CALL: WAM:CATVAR2
DESCRIPTION: The WAM:CATVARn command is an assignment command. This command can only (in this embodiment of the WAMIL language) be executed if a CAT List has been declared in the script. Upon execution, this command assigns a CAT List variable value to the WAMI global CAT variable.

The value n, can (in this embodiment of the WAMIL language) be a valid index into the CAT List. any (in this WAMIL language embodiment) CAT List value can be assigned to the WAMI global CAT variable by execution of this command, where n is the CAT value location within the CAT List. Upon execution, the CAT number within a script is referenced as CATVARn from that point forward.

Like standard WAMI VARn variable assignment commands, the execution of this command also enables an association with the WAMI global CAT variable. Therefore, until the WAMI global CAT variable association is transferred to a WAMI VAR variable, or disabled, all (in this embodiment of the WAMIL language) references to the WAMI global CAT variable will use the CATVARn variable value.

For script syntax, until actual CAT List values are passed as an argument, when a CATVARn command is used the CAT number within a script shall be referenced as CATVARn from that point forward.
OUTPUT: The following is an example of the output generated to the WAMIL report file upon execution of a CATVARn command, when a CAT List of 2 was previously declared, and the CAT List numbers passed as an argument are 6 7:
  Set CAT To CATVAR2 Value Of 7
SCRIPTOR: If a CATVARn command is deleted from the current script, the Scriptor will prompt the user for a CAT number and then insert a WAM:CAT value command in place of the CATVARn command deleted.
ERRORS: An invalid CATVARn command used within a script, where n refers to a CAT List index outside the list range, will generate an error. Script execution will then be aborted.

If a CATVARn command is used within a script in which no CAT List has been declared, the WAM Interpreter will generate an error and terminate execution of the script.
ALTERS: CAT
DEFAULT VALUE: None (in this WAMIL language embodiment).
SEE ALSO: WAM:CAT value, WAM:CATLIST value
EXAMPLE: The following script sets the WAMI VARn CAT List length to 2, and executes a TI command for each CAT number in the list:
  WAM:MSC 5
  WAM:CELL 49
  WAM:CATLIST 2
  WAM:CONNECT TI
  WAM:CATVAR1
  TI:op:cell 49, cat CATVAR1
  WAM:CATVAR2
  TI:op:cell 49, cat CATVAR2
  WAM:DISCONNECT TI
  WAM:ENDTEST

CCC

The CCC command can be embedded in the integration construct data structure according to the invention.
PURPOSE: Changes the WAMI global CDMA Cluster Controller number variable, CCC, to the value provided as an argument.
SYNTAX: WAM:CCC value
EXAMPLE CALL: WAM:CCC 2
DESCRIPTION: The WAM:CCC command sets the WAMI global CCC number variable to the value provided as an argument. After execution of this command, all (in this embodiment of the WAMIL language) subsequent commands which require use of the CDMA Cluster Controller number, and all (in this embodiment of the WAMIL language) IF-construct commands which test the current script CDMA Cluster Controller number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution a CCC command:
  Set CCC 2
ERRORS: None.
ALTERS: CCC
DEFAULT VALUE: CCC is set to 1 upon initial startup, and is of type integer. The WAM:INITIALIZE command also sets this variable to 1.
SEE ALSO: WAM:INITIALIZE
EXAMPLE: The following script will set the WAMIL script CCC variable to 2 and then execute a TI interface command:
  WAM:CELL 49
  WAM:CCC 2
  TI:op:cell 49, ccc 2, ccu 1

CCCLIST

The CCCLIST command can be embedded in the integration construct data structure according to the invention.
PURPOSE: Declares to the WAM Interpreter, that a list of WAMI VARn CCC numbers will be supplied to the script.
SYNTAX: WAM:CCCLIST value
EXAMPLE CALL: WAM:CCCLIST 3
DESCRIPTION: The CCCLIST command is a WAMIL declaration command which instructs the WAM Interpreter that a list of CCC numbers will be supplied to the script. This command executes the assignment of the CCC numbers provided to the WAMI VARn CCC List.

Upon detection of this command, the WAM Interpreter will search the command line arguments for the CCC numbers. The total number of CCCs to assign is determined by the value argument of the command. This value declares to the WAM Interpreter the exact size of the CCC List. The CCC numbers within the CCC List can then be referenced within the script as WAMI VARn variables, according to their index position in the list. For example, CCCVAR2 refers to the second CCC number in the CCC List. The order of the CCC numbers provided determine the order of their placement within the CCC List.

Up to 30 CCC numbers can be passed as an argument with this command. Therefore, the maximum acceptable size for the CCC List is 30. If a value larger than 30 is used the WAM Interpreter will generate an error and script execution will be aborted.

This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:CCCLIST command is encountered the WAMI GUI platform will prompt the user for the quantity of CCC numbers defined by the command argument value. Subsequent WAM:CCCLIST commands encountered will not cause additional prompting.
SCRIPTOR: If this command is deleted from the current script, the WAMIL Scriptor will delete all (in this embodiment of the WAMIL language) reference CCCVARn commands existing in the script also. The script WAMI global CCC variable will then be set to the default value of 1.

The Scriptor will only (in this embodiment of the WAMIL language) allow insertion of one CCCLIST command into the current script.
OUTPUT: The following is an example of the output generated to the WAMIL report file upon execution of a CCCLIST command:

Total Number of CCC List Values Set To 3

CCC List Values: 2 4 6
ERRORS: If a value larger than 30 is used the WAM Interpreter will generate an error and script execution will be aborted.

Any references within a script to a WAMI VARn variable prior to the declaration of the list will generate a syntax error.

If more than one CCCLIST command is used in a WAMIL script, only (in this embodiment of the WAMIL language) the first list declaration is used, and therefore takes precedence. Thus subsequent CCCLIST commands have no effect.
ALTERS: WAMI VARn CCC List.
DEFAULT VALUE: The WAMI VARn CCC List variable is set to an unknown state upon initial startup, and is of type integer. The WAM:INITLALIZE command does not reset this list.
SEE ALSO: WAM:CCCVARn, WAM:INITIALIZE
EXAMPLE: The following script sets the WAMI VARn CCC List length to 2, and executes a TI command for each CCC number in the list:

WAM:MSC 5
WAM:CELL 49
WAM:CCCLIST 2
WAM:CONNECT TI
WAM:CCCVAR1
TI:op:cell 49, ccc CCCVAR1, ccu 1
WAM:CCCVAR2
TI:op:cell 49, ccc CCCVAR2, ccu 1
WAM:DISCONNECT TI
WAM:ENDTEST

CCCVAR

The CCCVAR command can be embedded in the integration construct data structure according to the invention.
PURPOSE: Declares to the WAM Interpreter, that a value for the WAMI VAR variable CCCVAR will be supplied to the script.
SYNTAX: WAM:CCCVAR
EXAMPLE CALL: WAM:CCCVAR
DESCRIPTION: The WAM:CCCVAR command is a WAMIL declaration command which executes an assignment function. Upon detection of this command, the WAM Interpreter will search the command line arguments for a value to assign to the WAMI VAR variable CCCVAR.

Like standard WAMI VAR variable declaration commands, the execution of this command also enables an association with the WAMI global CCC variable. Therefore, until the WAMI global CCC variable association is transferred to another WAMI VAR variable, or disabled, all (in this embodiment of the WAMIL language) references to the WAMI global CCC variable will use the CCCVAR variable value.

For script syntax, until an actual CCC number is passed as an argument, when a CCCVAR command is used the CCC number within a script shall be referenced as CCCVAR from that point forward.

This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:CCCVAR is encountered the WAMI GUI platform will prompt the user for the script CCCVAR value. Subsequent WAM:CCCVAR commands encountered will not cause additional prompting.
SCRIPTOR: If a CCCVAR command is deleted from the current script, the Scriptor will prompt the user for a CCC number and then insert a WAM:CCC value command in place of the CCCVAR command deleted.
OUTPUT: The following is an example of the output generated to the WAMIL report file, upon execution a CCCVAR command:

Set CCC To Argument Value of 8
ERRORS: If no command line value has been provided, the WAM Interpreter will generate an error and script execution will be aborted.
ALTERS: CCCVAR
DEFAULT VALUE: CCCVAR is set to an unknown state upon initial startup, and is of type integer. The WAM:INITIALIZE command does not reset this WAMI VAR variable.
SEE ALSO: WAM:CCC value
EXAMPLE: The following script executes a TI command for the CCC number supplied:

WAM:MSC 5
WAM:CELL 49
WAM:CCCVAR
WAM:CONNECT TI
TI:op:cell 49, ccc CCCVAR, ccu 1

WAM:DISCONNECT TI
WAM:ENDTEST

CCCVARn

The CCCVARn command can be embedded in the integration construct data structure according to the invention.
PURPOSE: Instructs the WAM Interpreter to set the WAMI global CCC variable to the value of the referenced WAMI VARn CCC variable, in position n, of the CCC List passed as an argument.
SYNTAX: WAM:CCCVARn
EXAMPLE CALL: WAM:CCCVAR2
DESCRIPTION: The WAM:CCCVARn command is an assignment command. This command can only (in this embodiment of the WAMIL language) be executed if a CCC List has been declared in the script. Upon execution, this command assigns a CCC List variable value to the WAMI global CCC variable.

The value n, can (in this embodiment of the WAMIL language) be a valid index into the CCC List. Any (in this WAMIL language embodiment) CCC List value can be assigned to the WAMI global CCC variable by execution of this command, where n is the CCC value location within the CCC List. Upon execution, the CCC number within a script is referenced as CCCVARn from that point forward.

Like standard WAMI VARn variable assignment commands, the execution of this command also enables an association with the WAMI global CCC variable. Therefore, until the WAMI global CCC variable association is transferred to a WAMI VAR variable, or disabled, all (in this embodiment of the WAMIL language) references to the WAMI global CCC variable will use the CCCVARn variable value.

For script syntax, until actual CCC List values are passed as an argument, when a CCCVARn command is used the CCC number within a script shall be referenced as CCCVARn from that point forward.
OUTPUT: The following is an example of the output generated to the WAMIL report file upon execution of a CCCVARn command, when a CCC List of 3 was previously declared, and the CCC List numbers passed as an argument are 2 4 6:
  Set CCC To CCCVAR2 Value Of 4
SCRIPTOR: If a CCCVARn command is deleted from the current script, the Scriptor will prompt the user for a CCC number and then insert a WAM:CCC value command in place of the CCCVARn command deleted.
ERRORS: An invalid CCCVARn command used within a script, where n refers to a CCC List index outside the list range, will generate an error. Script execution will then be aborted.

If a CCCVARn command is used within a script in which no CCC List has been declared, the WAM Interpreter will generate an error and terminate execution of the script.
ALTERS: CCC
DEFAULT VALUE: None (in this WAMIL language embodiment).
SEE ALSO: WAM:CCC value, WAM:CCCLIST value
EXAMPLE: The following script sets the WAMI VARn CCC List length to 2, and executes a TI command for each CCC number in the list:
  WAM:MSC 5
  WAM:CELL 49
  WAM:CCCLIST 2
  WAM:CONNECT TI
  WAM:CCCVAR1
  TI:op:cell 49, ccc CCCVAR1, ccu 1
  WAM:CCCVAR2
  TI:op:cell 49, ccc CCCVAR2, ccu 1
  WAM:DISCONNECT TI
  WAM:ENDTEST

CCU

The CCU command can be embedded in the integration construct data structure according to the invention.
PURPOSE: Changes the WAMI global CDMA Channel Unit number variable, CCU, to the value provided as an argument.
SYNTAX: WAM:CCU value
EXAMPLE CALL: WAM:CCU 2
DESCRIPTION: The WAM:CCU command sets the WAMI global CCU number variable to the value provided as an argument. After execution of this command, all (in this embodiment of the WAMIL language) subsequent commands which require use of the CDMA Channel Unit number, and all (in this embodiment of the WAMIL language) IF-construct commands which test the current script CDMA Channel Unit number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution a CCU command:
  Set CCU 2
ERRORS: None.
ALTERS: CCU
DEFAULT VALUE: CCU is set to 1 upon initial startup, and is of type integer. The WAM:INITIALIZE command also sets this variable to 1.
SEE ALSO: WAM:INITIALIZE
EXAMPLE: The following script will set the WAMIL script CCU variable to 2 and then execute a TI interface command:
  WAM:CELL 49
  WAM:CCU 2
  TI:op:cell 49, ccc 1, ccu 2

CCULIST

The CCULIST command can be embedded in the integration construct data structure according to the invention.
PURPOSE: Declares to the WAM Interpreter, that a list of WAMI VARn CCU numbers will be supplied to the script.
SYNTAX: WAM:CCULIST value
EXAMPLE CALL: WAM:CCULIST 3
DESCRIPTION: The CCULIST command is a WAMIL declaration command which instructs the WAM Interpreter that a list of CCU numbers will be supplied to the script. This command executes the assignment of the CCU numbers provided to the WAMI VARn CCU List.

Upon detection of this command, the WAM Interpreter will search the command line arguments for the CCU numbers. The total number of CCUs to assign is determined by the value argument of the command. This value declares to the WAM Interpreter the exact size of the CCU List. The CCU numbers within the CCU List can then be referenced within the script as WAMI VARn variables, according to their index position in the list. For example, CCUVAR2 refers to the second CCU number in the CCU List. The order of the CCU numbers provided determine the order of their placement within the CCU List.

Up to 12 CCU numbers can be passed as an argument with this command. Therefore, the maximum acceptable size for the CCUList is 12. If a value larger than 12 is used the WAM Interpreter will generate an error and script execution will be aborted.

This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:CCULIST command is encountered the WAMI GUI platform will prompt the user for the quantity of CCU numbers defined by the command argument value. Subsequent WAM:CCULIST commands encountered will not cause additional prompting.
SCRIPTOR: If this command is deleted from the current script, the WAMIL Scriptor will delete all (in this embodiment of the WAMIL language) reference CCUVARn commands existing in the script also. The script WAMI global CCU variable will then beset to the default value of 1.

The Scriptor will only (in this embodiment of the WAMIL language) allow insertion of one CCULIST command into the current script.
OUTPUT: The following is an example of the output generated to the WAMIL report file upon execution of a CCULIST command:

Total Number of CCU List Values Set To 3

CCU List Values: 2 4 6

ERRORS: If a value larger than 12 is used the WAM Interpreter will generate an error and script execution will be aborted.

Any references within a script to a WAMI VARn variable prior to the declaration of the list will generate a syntax error.

If more than one CCULIST command is used in a WAMIL script, only (in this embodiment of the WAMIL language) the first list declaration is used, and therefore takes precedence. Thus subsequent CCULIST commands have no effect.
ALTERS: WAMI VARn CCU List.
DEFAULT VALUE: The WAMI VARn CCU List variable is set to an unknown state upon initial startup, and is of type integer. The WAM:INITIALIZE command does not reset this list.
SEE ALSO: WAM:CCUVARn, WAM:INITIALIZE
EXAMPLE: The following script sets the WAMI VARn CCU List length to 2, and executes a TI command for each CCU number in the list:

WAM:MSC 5
WAM:CELL 49
WAM:CCULIST 2
WAM:CONNECT TI
WAM:CCUVAR1
TI:op:cell 49, ccc CCUVAR1, ccu 1
WAM:CCUVAR2
TI:op:cell 49, ccc CCUVAR2, ccu 1
WAM:DISCONNECT TI
WAM:ENDTEST

CCUVAR

The CCUVAR command can be embedded in the integration construct data structure according to the invention.
PURPOSE: Declares to the WAM Interpreter, that a value for the WAMI VAR variable CCUVAR will be supplied to the script.
SYNTAX: WAM:CCUVAR
EXAMPLE CALL: WAM:CCUVAR
DESCRIPTION: The WAM:CCUVAR command is a WAMIL declaration command which executes an assignment function. Upon detection of this command, the WAM Interpreter will search the command line arguments for a value to assign to the WAMI VAR variable CCUVAR.

Like standard WAMI VAR variable declaration commands, the execution of this command also enables an association with the WAMI global CCU variable. Therefore, until the WAMI global CCU variable association is transferred to another WAMI VAR variable, or disabled, all (in this embodiment of the WAMIL language) references to the WAMI global CCU variable will use the CCUVAR variable value.

For script syntax, until an actual CCU number is passed as an argument, when a CCLVAR command is used the CCU number within a script shall be referenced as CCUVAR from that point forward.

This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:CCUVAR is encountered the WAMI GUI platform will prompt the user for the script CCUVAR value. Subsequent WAM:CCUVAR commands encountered will not cause additional prompting.
SCRIPTOR: If a CCUVAR command is deleted from the current script, the Scriptor will prompt the user for a CCU number and then insert a WAM:CCU value command in place of the CCUVAR command deleted.
OUTPUT: The following is an example of the output generated to the WAMIL report file, upon execution a CCUVAR command:

Set CCU To Argument Value of 2

ERRORS: If no command line value has been provided, the WAM Interpreter will generate an error and script execution will be aborted.
ALTERS: CCUVAR
DEFAULT VALUE: CCUVAR is set to an unknown state upon initial startup, and is of type integer. The WAM:INITIALIZE command does not reset this WAMI VAR variable.
SEE ALSO: WAM:CCU value
EXAMPLE: The following script executes a TI command for the CCU number supplied:

WAM:MSC 5
WAM:CELL 49
WAM:CCUVAR
WAM:CONNECT TI
TI:op:cell 49, ccc 1, ccu CCUVAR
WAM:DISCONNECT TI
WAM:ENDTEST

CCUVARn

The CCUVARn command can be embedded in the integration construct data structure according to the invention.
PURPOSE: Instructs the WAM Interpreter to set the WAMI global CCU variable to the value of the referenced WAMI VARn CCU variable, in position n, of the CCU List passed as an argument.
SYNTAX: WAM:CCUVARn
EXAMPLE CALL: WAM:CCUVAR2

DESCRIPTION: The WAM:CCUVARn command is an assignment command.

This command can only (in this embodiment of the WAMIL language) be executed if a CCU List has been declared in the script. Upon execution, this command assigns a CCU List variable value to the WAMI global CCU variable.

The value n, can (in this embodiment of the WAMIL language) be a valid index into the CCU List. Any (in this WAMIL language embodiment) CCU List value can be assigned to the WAMI global CCU variable by execution of this command, where n is the CCU value location within the CCU List. Upon execution, the CCU number within a script is referenced as CCUVARn from that point forward.

Like standard WAMI VARn variable assignment commands, the execution of this command also enables an association with the WAMI global CCU variable. Therefore, until the WAMI global CCU variable association is transferred to a WAMI VAR variable, or disabled, all (in this embodiment of the WAMIL language) references to the WAMI global CCU variable will use the CCUVARn variable value.

For script syntax, until actual CCU List values are passed as an argument, when a CCUVARn command is used the CCU number within a script shall be referenced as CCU-VARn from that point forward.

OUTPUT: The following is an example of the output generated to the WAMIL report file upon execution of a CCU-VARn command, when a CCU List of 3 was previously declared, and the CCU List numbers passed as an argument are 1 2 3:

Set CCU To CCUVAR2 Value Of 2

SCRIPTOR: If a CCUVARn command is deleted from the current script, the Scriptor will prompt the user for a CCU number and then insert a WAM:CCU value command in place of the CCUVARn command deleted.

ERRORS: An invalid CCUVARn command used within a script, where n refers to a CCU List index outside the list range, will generate an error. Script execution will then be aborted.

If a CCUVARn command is used within a script in which no CCU List has been declared, the WAM Interpreter will generate an error and terminate execution of the script.

ALTERS: CCU

DEFAULT VALUE: None (in this WAMIL language embodiment).

SEE ALSO: WAM:CCU value, WAM:CCULIST value

EXAMPLE: The following script sets the WAMI VARn CCU List length to 2, and executes a TI command for each CCU number in the list:

WAM:MSC 5
WAM:CELL 49
WAM:CCULIST 2
WAM:CONNECT TI
WAM:CCUVAR1
TI:op:cell 49, ccc 1, ccu CCUVAR1
WAM:CCUVAR2
TI:op:cell 49, ccc 1, ccu CCUVAR2
WAM:DISCONNECT TI
WAM:ENDTEST

CDMADPC

The CDMADPC command can be embedded in the integration construct data structure according to the invention.

PURPOSE: Changes the WAMI global BCR-BIU-ACU power control option number variable, CDMADPC, to the value provided as an argument.

SYNTAX: WAM:CDMADPC value

EXAMPLE CALL: WAM:CDMADPC 150

DESCRIPTION: The CDMADPC command sets the WAMI global BCR-BIU-ACU power control option number variable to the value provided as an argument. After execution of this command, all (in this embodiment of the WAMIL language) subsequent commands which require use of the BCR-BIU-ACU power control option number, and all (in this embodiment of the WAMIL language) IF-construct commands which test the current script BCR-BIU-ACU power control option number, will reference the new value.

Execution of this command also disables any (in this WAMIL language embodiment) association which exists between this WAMI global variable and any WAMI VAR variable.

OUTPUT: The following is an example of the output generated to the WAMIL report file, upon execution a CDMADPC command:

Set BBA Power Control Option To 150

ERRORS: None.

ALTERS: CDMADPC

DEFAULT VALUE: CDMADPC is set to 0 upon initial startup, and is of type integer. The WAM:INITIALIZE command also sets this variable to 0.

SEE ALSO: WAM:INITIALIZE

CE

The CE command can be embedded in the integration construct data structure according to the invention.

PURPOSE: Changes the WAMI global Channel Element number variable, CE, to the value provided as an argument.

SYNTAX: WAM:CE value

EXAMPLE CALL: WAM:CE 2

DESCRIPTION: The WAM:CE command sets the WAMI global Channel Element number variable to the value provided as an argument. After execution of this command, all (in this embodiment of the WAMIL language) subsequent commands which require use of the Channel Element number, and all (in this embodiment of the WAMIL language) IF-construct commands which test the current script Channel Element number, will reference the new value.

Execution of this command also disables any (in this WAMIL language embodiment) association which exists between this WAMI global variable and any WAMI VAR variable.

OUTPUT: The following is an example of the output generated to the WAMIL report file, upon execution a CE command:

Set Channel Element To 2

ERRORS: None.

ALTERS: CE

DEFAULT VALUE: CE is set to 0 upon initial startup, and is of type integer. The WAM:INITIALIZE command also sets this variable to 0.

SEE ALSO: WAM:INITIALIZE

CELL

The CELL command can be embedded in the integration construct data structure according to the invention.
PURPOSE: Changes the WAMI global cell number variable, CELL, to the value provided as an argument.
SYNTAX: WAM:CELL value
EXAMPLE CALL: WAM:CELL 49
DESCRIPTION: The WAM:CELL command sets the WAMI global CELL number variable to the value provided as an argument. After execution of this command, all (in this embodiment of the WAMIL language) subsequent commands which require use of the cell number, and all (in this embodiment of the WAMIL language) IF-construct commands which test the current script cell number, will reference the new value.

Execution of this command also disables any (in this WAMIL language embodiment) association which exists between this WAMI global variable and any WAMI VAR variable.
SCRIPTOR: If the LOOPCELL, LOOPCELLVARS, or CELLVAR commands already exist in a script, the Scriptor will not allow a user to add any (in this WAMIL language embodiment) CELL commands.

If the last CELL command is deleted from the current script, the Scriptor will display an error message notifying the user that no CELL number has been defined for the script.
OUTPUT: The following is an example of the output generated to the WAMIL report file, upon execution an CELL command:

Start Test Cell: 49
ERRORS: None.
ALTERS: CELL
DEFAULT VALUE: CELL is set to 0 upon initial startup, and is of type integer. The WAM:INITIALIZE command also sets this variable to 0.
SEE ALSO: WAM:CELLVAR, WAM:LOOPCELL cells . . . , WAM:LOOPCELLVARS, WAM:INITIALIZE
EXAMPLE: The following script will set the WAMIL script CELL variable to 49 and then execute a TI interface command:

WAM:MSC 5
WAM:CELL 49
WAM:CONNECT TI
TI:op:cell 49
WAM:DISCONNECT TI
WAM:ENDTEST

CELLVAR

The CELLVAR command can be embedded in the integration construct data structure according to the invention.
PURPOSE: Declares to the WAM Interpreter, that a value for the WAMI VAR variable CELLVAR will be supplied to the script.
SYNTAX: WAM:CELLVAR
EXAMPLE CALL: WAM:CELLVAR
DESCRIPTION: The WAM:CELLVAR command is a WAMIL declaration command which executes an assignment function. Upon detection of this command, the WAM Interpreter will search the command line arguments for a value to assign to the WAMI VAR variable CELLVAR.

Like standard WAMI VAR variable declaration commands, the execution of this command also enables an association with the WAMI global CELL variable. Therefore, until the WAMI global CELL variable association is transferred to another WAMI VAR variable, or disabled, all (in this embodiment of the WAMIL language) references to the WAMI global CELL variable will use the CELLVAR variable value.

For script syntax, until an actual CELL number is passed as an argument, when a CELLVAR command is used the CELL number within a script shall be referenced as CELL-VAR from that point forward.
NOTE: For backwards compatibility purposes, CELLVAR can be referenced within TI and SDP interface commands as X. Thus a TI interface command would be written as TI:op:cell X instead of as follows, TI:op:cell CELLVAR This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:CELLVAR is encountered the WAMI GUI platform will prompt the user for the script CELLVAR value.
Subsequent WAM:CELLVAR commands encountered will not cause additional prompting.
SCRIPTOR: If a CELLVAR command is deleted from the current script, the Scriptor will prompt the user for a CELL number and then insert a WAM:CELL value command in place of the CELLVAR command deleted.

Upon insertion of this command, the Scriptor will remove all (in this embodiment of the WAMIL language) CELL commands, if any, from the script and any cell looping commands, and set the default cell number to the value CELLVAR.

The Scriptor automatically places this command below any (in this WAMIL language embodiment) existing WAM:DISPLAY or WAM:MSCVAR command.

The CELLVAR command upon insertion automatically replaces any (in this WAMIL language embodiment) LOOPCELL, or LOOPCELLVARS command in the script, if any.

The Scriptor will only (in this embodiment of the WAMIL language) allow one CELLVAR command to be inserted into the current script.
OUTPUT: The following is an example of the output generated to the WAMIL report file upon execution of a CELL-VAR command, when cell 49 is passed as an argument:

Set CELL To Argument Value of 49
Start Test Cell: 49
ERRORS: If no command line value has been provided, the WAM Interpreter will generate an error and script execution will be aborted.

If CELLVAR is included in a script with the LOOPCELL or LOOPCELLVARS command, unpredictable errors may result.
ALTERS: CELLVAR
DEFAULT VALUE: CELLVAR is set to an unknown state upon initial startup, and is of type integer. The WAM:INITIALIZE command does not reset this WAMI VAR variable.
SEE ALSO: WAM:CELL value, WAM:LOOPCELL cells . . . , WAM:LOOPCELLVARS
EXAMPLE: The following script executes a TI command for the CELL number supplied:

WAM:MSC 5
WAM:CELLVAR
WAM:CONNECT TI
TI:op:cell CELLVAR

WAM:DISCONNECT TI
WAM:ENDTEST

CGSA

The CGSA command can be embedded in the integration construct data structure according to the invention.
PURPOSE: Changes the WAMI global cellular geographic service area number variable, CGSA, to the value provided as an argument.
SYNTAX: WAM:CGSA value
EXAMPLE CALL: WAM:CGSA 2
DESCRIPTION: The CGSA command sets the WAMI global cellular geographic service area number variable to the value provided as an argument. After execution of this command, all (in this embodiment of the WAM IL language) subsequent commands which require use of the cellular geographic service area number, and all (in this embodiment of the WAMIL language) IF-construct commands which test the current script cellular geographic service area number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution a CGSA command:

Set Cellular Geographic Service Area To 2

ERRORS: None.
ALTERS: CGSA
DEFAULT VALUE: CGSA is set to 0 upon initial startup, and is of type integer. The WAM:INITIALIZE command also sets this variable to 0.
SEE ALSO: WAM:INITIALIZE

CLOSE

The CLOSE command can be embedded in the integration construct data structure according to the invention.
PURPOSE: Causes the WAM Interpreter to stop saving OutBuff to the filename provided as an argument, and close the file.
SYNTAX: WAM:CLOSE filename
EXAMPLE CALL: WAM:CLOSE BuffStore
DESCRIPTION: The CLOSE command closes a file opened with the OPEN command. After execution of this command, the WAM Interpreter OutBuff will no longer be appended to the filename provided as an argument.
OUTPUT: The following is an example of the output generated to the WAMIL report file upon execution of a CLOSE command:

Close the WAMI OutBuff Redirection File: BuffStore

ERRORS: If an error is encountered in execution of the CLOSE command, the error message will be output to the WAMIL report file.

If the argument filename is for a file which has not been opened, or is already closed, the WAM Interpreter will generate an error message.
ALTERS: None (in this WAMIL language embodiment).
DEFAULT VALUE: None (in this WAMIL language embodiment).
SEE ALSO: WAM:OPEN filename
EXAMPLE: The following script lines will open an OutBuff Redirection file and save the output of a TI command prior to closing the file:

WAM:OPEN buffstore
TI:opcell 49, ccc 2, ccu 1
WAM:OUTPUT buffstore
WAM:CLOSE buffstore

COMMENT

The COMMENT command can be embedded in the integration construct data structure according to the invention.
PURPOSE: Adds a comment line to the WAMIL script.
SYNTAX: WAM:COMMENT string
EXAMPLE CALL: WAM:COMMENT This is test case jt1234
DESCRIPTION: The COMMENT command adds a comment line to the WAMIL script. The string given is ignored by the WAM Interpreter and not printed in the WAMIL log file. Alternatively, "#:" can be used in the same manner place of "WAM:COMMENT", but it is less intuitive.
OUTPUT: None (in this WAMIL language embodiment).
ERRORS: None.
ALTERS: None (in this WAMIL language embodiment).
DEFAULT VALUE: None (in this WAMIL language embodiment).
SEE ALSO: WAM:PRINT string

CONFIG

The CONFIG command can be embedded in the integration construct data structure according to the invention.
PURPOSE: Changes the WAMI global cell configuration option number variable, CONFIG, to the value provided as an argument.
SYNTAX: WAM:CONFIG value
EXAMPLE CALL: WAM:CONFIG 350
DESCRIPTION: The WAM:CONFIG command sets the WAMI global CONFIG number variable to the value provided as an argument. After execution of this command, all (in this embodiment of the WAMIL language) subsequent commands which require use of the cell configuration option number, and all (in this embodiment of the WAMIL language) IF-construct commands which test the current script cell configuration option number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution an CONFIG command:

Set Cell Configuration Option To 350

ERRORS: None.
ALTERS: CONFIG
DEFAULT VALUE: CONFIG is set to 0 upon initial startup, and is of type integer. The WAM:INITIALIZE command also sets this variable to 0.
SEE ALSO: WAM:INITIALIZE
EXAMPLE: The following script lines will set the script CONFIG option number to 350 and then execute a TI interface command:

WAM:CELL 49
WAM:BBA 4
WAM:CONFIG 350
TI:cfr:cell 49, multi bba 4; config 350

CONNECT

The CONFIG command can be embedded in the integration construct data structure according to the invention.

PURPOSE: Instructs the WAM Interpreter to initiate a connection to the interface specified as an argument.
SYNTAX: WAM:CONNECT interface
EXAMPLE CALL: WAM:CONNECT TI
DESCRIPTION: The CONNECT command instructs the WAM Interpreter to initiate a connection between the WAM Interpreter and the interface specified as an argument. The argument provided can (in this embodiment of the WAMIL language) be a valid interface supported by WAMIL.

After successful execution of the CONNECT command, the WAM Interpreter will open an xterm window for the interface specified as an argument. From that point forward until a DISCONNECT command for the same interface is executed, all (in this embodiment of the WAMIL language) corresponding interface commands when executed will be echoed to this window. The output or results of such execution will also be echoed to this window, and printed in the WAMIL report file.

Upon successful execution of the CONNECT command, the WAMI Interface flag will be set for the interface provided as an argument.
INTERFACES: The following interfaces are supported by the CONNECT command:

| INTERFACE | DESCRIPTION |
| --- | --- |
| TI | TIpdunix |
| SDP | Status Display Page |

SCRIPTOR: A CONNECT command can (in this embodiment of the WAMIL language) exist in a WAMIL script prior to any interface command or a syntax error will occur.
OUTPUT: The following is an example of the output generated to the WAMIL report file upon execution of a CONNECT command for a TI interface:

Connect To TIpdunix on MSC 5

The following is an example of the output generated to the WAMIL report file upon execution of a CONNECT command for an SDP interface:

Connect To SDP on MSC 5

ERRORS: If the connection attempt fails due to lack of system or server response, the WAM Interpreter LFAIL flag will be set. The WAM Interpreter will then, for example, generate the following output to the WAMIL report file:

WAMI TIpdunix Connection Login Attempt Failed!

A user can test the LFAIL flag within a WAMIL script to check if a login attempt was successful prior to the execution of any (in this WAMIL language embodiment) interface commands for such interface.

Once a connection is established, if during the login attempt, or the execution of any (in this WAMIL language embodiment) WAMIL interface commands for such interface, the connection is lost, the WAM Interpreter will set the CFAIL flag. The WAM Interpreter will then, for example, generate the following output to the WAMIL report file:

WAMI TIpdunix Connection Lost!

A user can test the CFAIL flag within a WAMIL script to check if a connection was lost prior to the execution of any (in this WAMIL language embodiment) interface commands for such interface.

After successful execution of the CONNECT command, if the connection times out at any point during the execution of any (in this WAMIL language embodiment) interface commands for such interface, meaning no response is received from the interface within the time specified by the WAM Interpreter TimeOut variable, the WAM Interpreter TFAIL flag will be set. The WAM Interpreter will then, for example, generate the following output to the WAMIL report file:

TI Command Time Out!

A user can test the TFAIL flag at any (in this WAMIL language embodiment) time within a WAMIL script to check if an attempt did time out prior to the execution of any subsequent interface commands for such interface.

If a CONNECT command is executed for an SDP interface, and after a successful login attempt to the system or server no SDP port is available during the connection process, the WAM Interpreter SDPPORT flag will be set. The WAM Interpreter will then generate the following output to the WAMIL report file:

No SDP VTTY Ports! Try Again Later!

A user can test the SDPPORT flag within a WAMIL script to check if a port is available upon a login attempt, prior to the execution of any (in this WAMIL language embodiment) interface commands for the SDP interface.

If during an SDP connection attempt, or the execution of an SDP interface command, the WAM Interpreter detects an error on transmission or a page capture. The WAM Interpreter will then generate the following output to the WAMIL report file:

SDP Page Capture Error.

Redundant CONNECT commands for the same interface executed within a WAMIL script will generate an error if the interface is already connected to the WAM, unless the LOOPCELL command has been integrated into the script, and the script being executed is a Linker script.
ALTERS: WAM Interpreter interface flag for specified interface.
DEFAULT VALUE: The corresponding WAM Interpreter interface flag is always disabled upon initial startup and remains set after successful execution of a CONNECT command until a DISCONNECT or ENDTEST command is executed, or an unexpected disconnect occurs.
SEE ALSO: IF:SDPPORT, IF:CFAIL, IF:LFAIL, IF:TFAIL, WAM:DISCONNECT interface, WAM:ENDTEST, WAM:LOOPCELL cells . . . , WAM:LOOPCELLVARS
EXAMPLE: The following script will login to a TI interface, execute a TI command, and then log out:

WAM:MSC 5
WAM:CELL 49
WAM:CONFIG 150
WAM:CONNECT TI
IF:LFAIL
THENDO:
   WAM:PRINT TI Connection Failed!
   WAM:ENDTEST
ELSEDO:
   TI:cfr:cell 49, multi bba 4; config 150
ENDIF:
WAM:DISCONNECT TI
WAM:ENDTEST

CREATEVAR

The CRATEVAR command can be embedded in the integration construct data structure according to the invention.
PURPOSE: Instructs the WAM Interpreter to create a new VAR variable provided by the argument new_var_name.

SYNTAX: WAM:CREATEVAR new_var_name
EXAMPLE CALL: WAM:CREATEVAR TEMPVAR
DESCRIPTION: The CREATEVAR command causes the WAMI to create a new interpreter VAR variable with the name new_var_name. The new VAR variable created will be of type integer. The new VAR variable can then be associated with any (in this WAMIL language embodiment) WAMI global variable by use of the SET command. The new VAR variable can then be referenced and operated upon like any (in this
WAMIL language embodiment) WAMI VAR variable. The new VAR variable name can (in this embodiment of the WAMIL language) have the suffix VAR. An auxiliary/complimentary non-key global variable is also created automatically.
OUTPUT: The following is an example of the output generated to the WAMIL report file upon execution a CREATEVAR command:
 Created VAR variable TEMPVAR
ERRORS: If the VAR variable already exists an error is generated and script execution is terminated.
 If an illegal VAR variable name is provided an error is generated and script execution is terminated.
ALTERS: None (in this WAMIL language embodiment)
DEFAULT VALUE: None (in this WAMIL language embodiment).
EXAMPLE: The following script will create a new VAR variable to hold the old generic name of the current cell:
 WAM:MSCVAR
 WAM:CELLVAR
 WAM:GETAPXFLD cell2 Icelver
 WAM:CREATEVAR OLD_GENVAR
 WAM:SETVAR OLD_GENVAR APXVAR
 WAM:ENDTEST

CSC

The CSC command can be embedded in the integration construct data structure according to the invention.
PURPOSE: Changes the WAMI global cell site controller variable, CSC, to the value provided as an argument.
SYNTAX: WAM:CSC value
EXAMPLE CALL: WAM:CSC 1
DESCRIPTION: The WAM:CSC command sets the WAMI global CSC number variable to the value provided as an argument. After execution of this command, all (in this embodiment of the WAMIL language) subsequent commands which require use of the cell site controller number, and all (in this embodiment of the WAMIL language) IF-construct commands which test the current script cell site controller number, will reference the new value.
 Execution of this command also disables any (in this WAMIL language embodiment) association which exists between this WAMI global variable and any WAMI VAR variable.
OUTPUT: The following is an example of the output generated to the WAMIL report file, upon execution a CSC command:
 Set Cell Site Controller 1
ERRORS: None.
ALTERS: CSC
DEFAULT VALUE: CSC is set to 0 upon initial startup, and is of type integer. The WAM:INITIALIZE command also sets this variable to 0.
SEE ALSO: WAM:INITIALIZE
EXAMPLE: The following script will set the WAMIL script CSC variable to 1 and then execute a TI interface command:
 WAM:CELL 49
 WAM:CSC 1
 TI:op:cell 49, csc 1

CSCVAR

The CSCVAR command can be embedded in the integration construct data structure according to the invention.
PURPOSE: Declares to the WAM Interpreter, that a value for the WAMI VAR variable CSCVAR will be supplied to the script.
SYNTAX: WAM:CSCVAR
EXAMPLE CALL: WAM:CSCVAR
DESCRIPTION: The WAM:CSCVAR command is a WAMIL declaration command which executes an assignment function. Upon detection of this command, the WAM Interpreter will search the command line arguments for a value to assign to the WAMI VAR variable CSCVAR.
 Like standard WAMI VAR variable declaration commands, the execution of this command also enables an association with the WAMI global CSC variable. Therefore, until the WAMI global CSC variable association is transferred to another WAMI VAR variable, or disabled, all (in this embodiment of the WAMIL language) references to the WAMI global CSC variable will use the CSCVAR variable value.
 For script syntax, until an actual CSC number is passed as an argument, when a CSCVAR command is used the CSC number within a script shall be referenced as CSCVAR from that point forward.
 This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:CSCVAR is encountered the WAMI GUI platform will prompt the user for the script CSCVAR value. Subsequent WAM:CSCVAR commands encountered will not cause additional prompting.
SCRIPTOR: If a CSCVAR command is deleted from the current script, the Scriptor will prompt the user for a CSC number and then insert a WAM:CSC value command in place of the CSCVAR command deleted.
OUTPUT: The following is an example of the output generated to the WAMIL report file, upon execution a CSCVAR command:
 Set CSC To Argument Value of 1
ERRORS: If no command line value has been provided, the WAM Interpreter will generate an error and script execution will be aborted.
ALTERS: CSCVAR
DEFAULT VALUE: CSCVAR is set to an unknown state upon initial startup, and is of type integer. The WAM:INITIALIZE command does not reset this WAMI VAR variable.
SEE ALSO: WAM:CSC value
EXAMPLE: The following script executes a TI command for the CSC number supplied:
 WAM:MSC 5
 WAM:CELL 49
 WAM:CSCVAR
 WAM:CONNECT TI
 TI:op:cell 49, csc CSCVAR
 WAM:DISCONNECT TI
 WAM:ENDTEST

DATE

The DATE command can be embedded in the integration construct data structure according to the invention.
PURPOSE: Prints the current system date in the WAMIL report file.
SYNTAX: WAM:DATE
EXAMPLE CALL: WAM:DATE
DESCRIPTION: The DATE command prints the current system date to the WAMIL report file.
OUTPUT: The following is an example of the output generated to the WAMIL report file upon execution of a DATE command:

Date: 08/12/98

ERRORS: Any system errors generated during execution of the DATE command are printed to the WAMIL report file.
ALTERS: None (in this WAMIL language embodiment)
DEFAULT VALUE: None (in this WAMIL language embodiment).
SEE ALSO: WAM:TIME

DCCH

The DCCH command can be embedded in the integration construct data structure according to the invention.
PURPOSE: Changes the WAMI global dedicated/digital control channel number variable, DCCH, to the value provided as an argument.
SYNTAX: WAM:DCCH value
EXAMPLE CALL: WAM:DCCH 1
DESCRIPTION: The WAM:DCCH command sets the WAMI global dedicated/digital control channel number variable to the value provided as an argument. After execution of this command, all (in this embodiment of the WAMIL language) subsequent commands which require use of a dedicated/digital control channel number, and all (in this embodiment of the WAMIL language) IF-construct commands which test the current script dedicated/digital control channel number, will reference the new value. Execution of this command also disables any (in this WAMIL language embodiment) association which exists between this WAMI global variable and any WAMI VAR variable.
OUTPUT: The following is an example of the output generated to the WAMIL report file, upon execution of a DCCH command:

Set Dedicated/Digital Control Channel To 1

ERRORS: None.
ALTERS: DCCH
DEFAULT VALUE: DCCH is set to 0 upon initial startup, and is of type integer. The WAM:INITIALIZE command also sets this variable to 0.
SEE ALSO: WAM:INITIALIZE
EXAMPLE: The following will set the WAMIL script DCCH variable to 1 and then execute a TI interface command:

WAM:CELL 49
WAM:DCCH 1
TI:op:cell 49, dcch 1

DCS

The DCS command can be embedded in the integration construct data structure according to the invention.
PURPOSE: Changes the WAMI global digital cellular switch number variable, DCS, to the value provided as an argument.
SYNTAX: WAM:DCS value
EXAMPLE CALL: WAM:DCS 1
DESCRIPTION: The WAM:DCS command sets the WAMI global digital cellular switch number variable to the value provided as an argument. After execution of this command, all (in this embodiment of the WAMIL language) subsequent commands which require use of a digital cellular switch number, and all (in this embodiment of the WAMIL language) IF-construct commands which test the current script digital cellular switch number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution of a DCS command:

Set Digital Cellular Switch To 1

ERRORS: None.
ALTERS: DCS
DEFAULT VALUE: DCS is set to 0 upon initial startup, and is of type integer. The WAM:INITIALIZE command also sets this variable to 0.
SEE ALSO: WAM:INITIALIZE
EXAMPLE: The following script lines set the WAMIL script DCS variable to 1 and then execute a TI interface command:

WAM:CELL 49
WAM:DCS 1
TI:rmv:dcs 1, dl 0

DECR

The DECR command can be embedded in the integration construct data structure according to the invention.
PURPOSE: Instructs the WAM Interpreter to decrement the WAMI global variable provided, by the value given.
SYNTAX: WAM:DECR global_variable value
EXAMPLE CALL: WAM:DECR BBA 2
DESCRIPTION: The DECR command decrements the current value of the WAMI global variable provided by the argument global_variable, by the value given. This command performs a straightforward subtraction. The WAMI global variable can (in this embodiment of the WAMIL language) be of type integer. The value given can (in this embodiment of the WAMIL language) be a valid integer number.

This command only (in this embodiment of the WAMIL language) operates on WAMI global variables. To decrement the value of a WAMI VAR variable use the DECRVAR command.
OUTPUT: The following is an example of the output generated to the WAMIL report file, upon execution an DECR command:

Decrement BBA from 4 to 2

ERRORS: None.
ALTERS: WAMI global variable provided.
DEFAULT VALUE: None (in this WAMIL language embodiment).
SEE ALSO: WAM:INCR global_variable value
EXAMPLE: The following script decrements BBA by two and then executes a TI command using the new BBA value.

WAM:CELL 49
WAM:BBA 4
TI:op:cell 49, bba 4
WAM:DECR BBA 2
TI:op:cell 49, bba 2

DECRVAR

The DECRVAR command can be embedded in the integration construct data structure according to the invention.
PURPOSE: The DECRVAR command instructs the WAM Interpreter to decrement the WAMI VAR variable provided as an argument by the value given.
SYNTAX: WAM:DECRVAR var_variable value
EXAMPLE CALL: WAM:DECRVAR BBAVAR 1
DESCRIPTION: The DECRVAR command decrements the current value of the WAMI VAR variable provided by the argument var_variable, by the value given. This command performs a straightforward subtraction. The WAMI VAR variable can (in this embodiment of the WAMIL language) be of type integer. The value given can (in this embodiment of the WAMIL language) be a valid integer number.

This command only (in this embodiment of the WAMIL language) operates on WAMI VAR variables. To decrement the value of a WAMI global variable use the DECR command.
OUTPUT: The following is an example of the output generated to the WAMIL report file, upon execution an DECRVAR command:

Decrement BBAVAR by 1
ERRORS: None.
ALTERS: WAMI VAR variable provided.
DEFAULT VALUE: None (in this WAMIL language embodiment).
SEE ALSO: WAM:INCRVAR var_variable value
EXAMPLE: The following script decrements BBAVAR by two and then executes a TI command using the new BBAVAR value.

WAM:CELL 49
WAM:BBAVAR
TI:op:cell 49, bba BBAVAR
WAM:DECRVAR BBAVAR 2
TI:op:cell 49, bba BBAVAR

DELCE

The DELCE command can be embedded in the integration construct data structure according to the invention.
PURPOSE: Changes the WAMI global number of channel elements to delete variable, DELCE, to the value provided as an argument.
SYNTAX: WAM:DELCE value
EXAMPLE CALL: WAM:DELCE 1
DESCRIPTION: The DELCE command sets the WAMI global number of channel elements to delete variable to the value provided as an argument. After execution of this command, all (in this embodiment of the WAMIL language) subsequent commands which require use the number of channel elements to delete variable, and all (in this embodiment of the WAMIL language) IF-construct commands which test the current script number of channel elements to delete variable, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution of a DELCE command:

Set Number Of Channel Elements To Delete To 1
ERRORS: None.
ALTERS: DELCE
DEFAULT VALUE: DELCE is set to 0 upon initial startup, and is of type integer. The WAM:INITIALIZE command also sets this variable to 0.
SEE ALSO: WAM:INITIALIZE

DISCONNECT

The DISCONNECT command can be embedded in the integration construct data structure according to the invention.
PURPOSE: Instructs the WAM Interpreter to disconnect from the interface given, and terminate all (in this embodiment of the WAMIL language) its associated processes.
SYNTAX: WAM:DISCONNECT interface
EXAMPLE CALL: WAM:DISCONNECT TI
DESCRIPTION: The DISCONNECT command instructs the WAM Interpreter to disconnect from the interface specified as an argument. The argument provided can (in this embodiment of the WAMIL language) be a valid interface supported by WAMIL.

After successful execution of the DISCONNECT command, the WAM Interpreter will close the interface xterm window.

Upon execution of the DISCONNECT command, the WAMI interface flag will be reset for the interface provided as an argument.

If the WAMIL script is looping through multiple cells, meaning the LOOPCELL or LOOPCELLVARS command has been executed in the script, the DISCONNECT command is not executed until the script has been executed for the last cell.
INTERFACES: The following interfaces are supported by the DISCONNECT command:

| INTERFACE | DESCRIPTION |
| --- | --- |
| TI | TIpdunix |
| SDP | Status Display Page |

OUTPUT: The following is an example of the output generated to the WAMIL report file upon execution of a DISCONNECT command for a TI interface:

Disconnect From TIpdunix on MSC 5
ERRORS: If a DISCONNECT command is executed for an interface which is not active, the WAM Interpreter will generate an error.

If during the execution of a DISCONNECT command an associated process cannot be terminated, the WAM Interpreter will generate an error and terminate the WAMIL script.

If a DISCONNECT or ENDTEST command is not executed for an interface which is active, and the WAMIL script is terminated, the associated processes and xterm window will not be recognized by any (in this WAMIL language embodiment) subsequent WAMIL script execution, and the connection will exist indefinitely. Thus, it is always good practice to terminate any (in this WAMIL language embodiment) WAM Interpreter connections prior to termination of any script.

Errors which cause a WAMIL script execution to be terminated, close all (in this embodiment of the WAMIL language) xterm windows and terminate all (in this embodiment of the WAMIL language) active processes for all (in this embodiment of the WAMIL language) interfaces prior to termination of the WAMIL script.
ALTERS: WAM Interpreter interface flag for specified interface.
DEFAULT VALUE: The corresponding WAM Interpreter interface flag is always disabled upon initial startup and remains set after successful execution of a CONNECT command until a DISCONNECT or ENDTEST command is executed, or an unexpected disconnect occurs.
SEE ALSO: WAM:CONNECT interface, WAM:ENDTEST, WAM:LOOPCELL cells . . .
EXAMPLE: The following script will login to a TI interface, execute a TI command, and then log out:
```
WAM:MSC 5
WAM:CELL 49
WAM:CONFIG 150
WAM:CONNECT TI
TI:cfr:cell 49, multi bba 4; config 150
WAM:DISCONNECT TI
WAM:ENDTEST
```

DISPLAY

The DISPLAY command can be embedded in the integration construct data structure according to the invention.
PURPOSE: Instructs the WAM Interpreter to open an xterm window which allows a user to monitor the WAMIL script progress.
SYNTAX: WAM:DISPLAY seconds
EXAMPLE CALL: WAM:DISPLAY 2
DESCRIPTION: Execution of the DISPLAY command automatically opens an xterm window in which the output for each WAMIL command for the current script is printed. This output mimics the WAMIL report file.

The argument seconds allows the user to slow down the script execution to allow the viewing of progress. Thus an argument of 2 is interpreted as follows: execute a WAMIL command every 2 seconds.

The DISPLAY command is used as a debugging command. It is not recommended for a final script since each script line execution is slowed down by the number of seconds provided as an argument. Thus, an argument of 2 seconds for a script which has 100 commands, will add 200 seconds to the script total execution time.

Placement of the DISPLAY command can be in any (in this WAMIL language embodiment) location of a WAMIL script. The execution of the command itself generates no output to the WAMIL report file. Upon execution of a script, the WAM Interpreter first loads the entire script and checks each command for syntax errors prior to initiating execution. At this point, detection of the DISPLAY command causes the WAM Interpreter to immediately open a display xterm window. Thus, for clarity the DISPLAY command should be placed at the top of the script because the window is always opened prior to execution of the first script command.

Inclusion of a DISPLAY command in a linker script causes the WAM Interpreter Linker to open a display window to allow viewing of the execution of the linker script. This window is independent of any (in this WAMIL language embodiment) display windows opened by execution of linked WAMIL scripts which include the DISPLAY command. For differentiating purposes, the WAM Interpreter Linker display window color is green with yellow text, as opposed to the standard display window of an executed WAMIL script.
OUTPUT: Execution of the DISPLAY command does not generate any (in this WAMIL language embodiment) output to the WAMIL report file.
SCRIPTOR: The Scriptor automatically places this command at the top of the script. If the command already exists the current seconds is replaced with the new seconds, even if the command is edited or re-inserted.
ERRORS: If any (in this WAMIL language embodiment) system errors occur which do not permit a display window to be opened, the WAMIL script execution will continue nonetheless.

More than one DISPLAY command in a WAMIL script has no effect. However, the last DISPLAY command executed changes the display seconds if the argument is different.
ALTERS: DISPLAY command delay.
DEFAULT VALUE: The DISPLAY command delay is set to 1 upon initial startup. The WAM:INITIALIZE command also sets this variable to 1.
SEE ALSO: WAM:INITLALIZE
EXAMPLE: The following script opens a display window:
```
WAM:DISPLAY 1
WAM:MSC 5
WAM:CELL 49
WAM:CONNECT TI
TI:op:cell 49
WAM:DISCONNECT TI
WAM:ENDTEST
```
The DL command can be embedded in the integration construct data structure according to the invention.
PURPOSE: Changes the WAMI global cell site data link number variable, DL, to the value provided as an argument.
SYNTAX: WAM:DL value
EXAMPLE CALL: WAM:DL 1
DESCRIPTION: The WAM:DL command sets the WAMI global cell site data link number variable to the value provided as an argument. After execution of this command, all (in this embodiment of the WAMIL language) subsequent commands which require use of a cell site data link number, and all (in this embodiment of the WAMIL language) IF-construct commands which test the current script cell site data link number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution of a DL command:
Set Cell Site Data Link To 1
ERRORS: None.
ALTERS: DL
DEFAULT VALUE: DL is set to 0 upon initial startup, and is of type integer. The WAM:INITIALIZE command also sets this variable to 0.
SEE ALSO: WAM:INITIALIZE
EXAMPLE: The following script lines set the WAMIL script DL variable to 1 and then execute a TI interface command:
```
WAM:CELL 49
WAM:DCS 1
WAM:DL 1
TI:rmv:dcs 1, dl 1
```

DS1

The DS 1 command can be embedded in the integration construct data structure according to the invention.
PURPOSE: Changes the WAMI global digital service 1 variable, DS1, to the value provided as an argument.
SYNTAX: WAM:DS1 value
EXAMPLE CALL: WAM:DS1 1
DESCRIPTION: The WAM:DS1 command sets the WAMI global digital service 1 variable to the value provided as an argument. After execution of this command, all (in this embodiment of the WAMIL language) subsequent commands which require use of a digital service 1 number, and all (in this embodiment of the WAMIL language) IF-construct commands which test the current script digital service 1 number, will reference the new value.

Execution of this command also disables any (in this WAMIL language embodiment) association which exists between this WAMI global variable and any WAMI VAR variable.

OUTPUT: The following is an example of the output generated to the WAMIL report file, upon execution of a DS1 command:

Set DS1 (Digital Service 1) To 1

ERRORS: None.

ALTERS: DS1

DEFAULT VALUE: DS1 is set to 0 upon initial startup, and is of type integer. The WAM:INITIALIZE command also sets this variable to 0.

SEE ALSO: WAM:INITIALIZE

EXAMPLE: The following script lines set the WAMIL script DS1 variable to 1 and then execute a TI interface command:

WAM:CELL 49
WAM:DS1 1
TI:op:cell 49, ds1 1

ECP

The ECP command can be embedded in the integration construct data structure according to the invention.

PURPOSE: Changes the WAMI global executive cellular processor number variable, ECP, to the value provided as an argument.

SYNTAX: WAM:ECP value

EXAMPLE CALL: WAM:ECP 1

DESCRIPTION: The WAM:ECP command sets the WAMI global executive cellular processor number variable to the value provided as an argument. After execution of this command, all (in this embodiment of the WAMIL language) subsequent commands which require use of a executive cellular processor number, and all (in this embodiment of the WAMIL language) IF-construct commands which test the current script executive cellular processor number, will reference the new value.

Execution of this command also disables any (in this WAMIL language embodiment) association which exists between this WAMI global variable and any WAMI VAR variable.

OUTPUT: The following is an example of the output generated to the WAMIL report file, upon execution of a ECP command:

Set Executive Cellular Processor To 1

ERRORS: None.

ALTERS: ECP

DEFAULT VALUE: ECP is set to 0 upon initial startup, and is of type integer. The WAM:INITIALIZE command also sets this variable to 0.

SEE ALSO: WAM:INITIALIZE

EXAMPLE: The following script lines set the WAMIL script ECP variable to 1 and then performs a backup of the ecp translation form:

WAM:CELL 49
WAM:ECP 1
WAM:GETAPX ecp ECPBACKUP

EMAILME

The EMAILME command can be embedded in the integration construct data structure according to the invention.

PURPOSE: Instructs the WAM Interpreter to email the string provided as an argument to the user.

SYNTAX: WAM:EMAILME string

EXAMPLE CALL: WAM:EMAILME Test Has Completed!

DESCRIPTION: Execution of the EMAILME command automatically emails the string provided to the user. The subject matter in the email message is always the script name.

The string provided can include references to WAMI global variables, or WAMI VARn variables. To reference a WAMI global variable the suffix VAR is simply added to the WAMI global variable name. For example, the following string, CCC CCCVAR is OOS, will be interpreted and emailed as follows for a WAMI global CCC variable with a value of 4:

CCC 4 is OOS

This is not to be mistaken with WAMI VAR variables. Although when referencing WAMI global variables within strings to be printed the names resemble WAMI VAR variables, this naming convention was chosen to allow references to WAMI global variables and still be able to print the variable name. In the above example the WAMI global name CCC was printed along with the value of the WAMI global variable. To print the value of a WAMI VAR variable, a WAMI global variable can (in this embodiment of the WAMIL language) first be associated. Then references to the WAMI global variable will yield the value of the WAMI VAR variable it is associated with.

OUTPUT: Execution of the EMAILME command does not generate any (in this WAMIL language embodiment) output to the WAMIL report file.

ERRORS: If any (in this WAMIL language embodiment) system errors occur which do not permit a string to be emailed to a user, the string will simply not be emailed.

ALTERS: None (in this WAMIL language embodiment).

DEFAULT VALUE: None (in this WAMIL language embodiment).

SEE ALSO: WAM:EMAILRPT

EXAMPLE: The following script will email messages to a user during execution of the script:

WAM:MSC 5
WAM:CELL 49
WAM:CONNECT TI
IF:LFAIL
THENDO:
    WAM:EMAILRPT
    WAM:ENDTEST
ELSEDO:
    WAM:EMAILME TI Connection Initiated! Test Started.
ENDIF:
TI:op:cell 49
WAM:DISCONNECT TI
WAM:EMAILME SCRIPT_NAME Execution Completed!
WAM:ENDTEST

EMAILRPT

The EMAILRPT command can be embedded in the integration construct data structure according to the invention.
PURPOSE: Instructs the WAM Interpreter to email the entire WAMIL report file to the user after the script execution has been completed or terminated.
SYNTAX: WAM:EMAILRPT
EXAMPLE CALL: WAM:EMAILRPT
DESCRIPTION: Execution of the EMAILRPT command automatically sets a flag which instructs the WAM Interpreter to email the user the entire WAMIL report file upon completion of the script execution, or its termination. The subject matter in the email is always the script name.

Placement of the EMAILRPT command can be in any (in this WAMIL language embodiment) location of a WAMIL script. Therefore execution of the command can occur as needed. If the command is executed the email flag is set and upon completion of the script the WAM Interpreter will email the entire WAMIL report file to the user.
OUTPUT: Execution of the EMAILRPT command does not generate any (in this WAMIL language embodiment) output to the WAMIL report file.
ERRORS: If any (in this WAMIL language embodiment) system errors occur which do not permit a WAMIL report file to be emailed to a user, the WAMIL report file will simply not be emailed.

Multiple EMAILRPT commands in a WAMIL script have no effect.
ALTERS: WAM Interpreter email flag.
DEFAULT VALUE: The WAM Interpreter email flag is always disabled upon startup.
SEE ALSO: WAM:EMAILME string
EXAMPLE: The following script will email the WAMIL report file to the user if a TI connection attempt fails:
   WAM:MSC 5
   WAM:CELL 49
   WAM:CONNECT TI
   IF:LFAIL
   THENDO:
      WAM:PRINT Cannot Connect To TI!!!!
      WAM:EMAILRPT
      WAM:ENDTEST
   ELSEDO:
      TI:op:cell 49
   ENDIF:
   WAM:DISCONNECT TI
   WAM:ENDTEST

ENDTEST

The ENDTEST command can be embedded in the integration construct data structure according to the invention.
PURPOSE: Instructs the WAM Interpreter to terminate the WAMIL script.
SYNTAX: WAM:ENDTEST
EXAMPLE CALL: WAM:ENDTEST
DESCRIPTION: The ENDTEST command instructs the WAM Interpreter to immediately terminate the current WAMIL script in execution.

Upon execution, the ENDTEST command will close all (in this embodiment of the WAMIL language) active WAM Interpreter xterm windows and terminate all (in this embodiment of the WAMIL language) associated processes. The WAMIL report file will then be closed and saved and the WAMIL script will be terminated, along with the script status display window.

If the WAMIL script is looping through multiple cells, meaning the LOOPCELL or LOOPCELLVARS command has been executed in the script, the ENDTEST command is not executed until the script has been executed for the last cell.
OUTPUT: The following is an example of the output generated to the WAMIL report file upon execution of an ENDTEST command:
   ENDTEST MSC 5 CELL 49
   END OF TEST SCRIPT EXECUTION
SCRIPTOR: The Scriptor will generate a syntax error if no ENDTEST command is inserted at the end of a script.
ERRORS: See DISCONNECT.

If no ENDTEST command is included at the end of a WAMIL script, the script will still terminate but connections established will remain nailed up, and associated processes will not be terminated.
ALTERS: None (in this WAMIL language embodiment).
DEFAULT VALUE: None (in this WAMIL language embodiment).
SEE ALSO: THEN:ENDTEST, WAM:DISCONNECT interface, WAM:LOOPCELL cells, WAM:LOOPCELL-VARS
EXAMPLE: The following script will execute a TI command and then end:
   WAM:MSC 5
   WAM:CELL 49
   WAM:BBA 4
   WAM:CONFIG 150
   WAM:CONNECT TI
   TI:cfr:cell 49, multi bba 4; config 150
   WAM:DISCONNECT TI
   WAM:ENDTEST

EXEC

The EXEC command can be embedded in the integration construct data structure according to the invention.
PURPOSE: Instructs the WAM Interpreter to execute the WAMIL script provided as an argument.
SYNTAX: WAM:EXEC path wamil_script
EXAMPLE CALL: WAM:EXEC HOME jt1234
DESCRIPTION: The EXEC command instructs the WAM Interpreter to execute the WAMIL script, provided by the argument wamil_script, located at path.

Upon execution of this command the WAM Interpreter will load the sub-WAMIL script, and additional interface sessions if necessary will be established. Interface sessions already existing from the calling WAMIL script will not be re-opened but used during the execution of the called sub-WAMIL script, if needed.

Once the sub-WAMIL script starts execution, the calling script will halt in progress. The calling script will not continue to be executed until the sub-WAMIL script has completed, or been terminated. Once the sub-WAMIL script has completed, execution in the calling script will resume at the next line after the EXEC command which was executed.

All WAMI global and WAMI VAR variables can be altered by a sub-WAMIL script since all (in this embodiment of the WAMIL language) these variables are visible to all (in this embodiment of the WAMIL language) sub-WAMIL scripts. To avoid inadvertent altering of WAMI global and WAMI VAR variables, a user can execute the SAVEWAMI command prior to any (in this WAMIL language embodiment) EXEC command execution, and then return the WAMI global and WAMI VAR variables to their initial states by executing the RESTOREWAMI command after the EXEC command.

The argument path can be any (in this WAMIL language embodiment) valid, complete UNIX pathname. The EXEC command supports WAM Interpreter path keywords which can be used for the path argument.
OUTPUT: All output from a sub-WAMIL script is printed in the calling script WAMIL report file. The following is an example of the output generated to the WAMIL report file upon execution of an EXEC command:

Execute sub-WAMILjt1234 From HOME.

Upon completion of the sub-WAMIL script, the following is an example of the output generated to the WAMIL report file.

Sub-WAMIL jt1234 Execution Completed.
ERRORS: If an invalid path is provided as an argument, the WAM Interpreter will generate an error and the sub-WAMIL script will not be executed.

If an invalid WAMIL script name is provided as an argument, the WAM Interpreter will generate an error and no sub-WAMIL script will be executed.
ALTERS: All WAMI global and WAMI VAR variables which are altered in the sub-WAMIL script executed.
DEFAULT VALUE: All WAMI global and WAMI VAR variables values prior to the sub-WAMIL script execution.
SEE ALSO: WAM:LAUNCH path wamil_script -options . . .
EXAMPLE: The following script will execute a sub-WAMIL script:

WAM:MSC 5
WAM:CELL 49
WAM:CONNECT TI
TI:init:cell 49: boot; sw
WAM:DISCONNECT TI
WAM:EXEC SHARE jt1234_wrapup
WAM:ENDTEST

FLUSHBUFF

The FLUSHBUFF command can be embedded in the integration construct data structure according to the invention.
PURPOSE: Instructs the WAM Interpreter to flush OutBuff.
SYNTAX: WAM:FLUSHBUFF
EXAMPLE CALL: WAM:FLUSHBUFF
DESCRIPTION: The FLUSHBUFF command instructs the WAM Interpreter to immediately flush the contents of the internal main buffer OutBuff. Upon execution of this command, OutBuff will be empty.
OUTPUT: The following is an example of the output generated to the WAMIL report file upon execution of a FLUSHBUFF command:

Flush WAMI Buffer
ERRORS: None.
ALTERS: OutBuff.
DEFAULT VALUE: None (in this WAMIL language embodiment).
SEE ALSO: FLUSHIP
EXAMPLE: The following script lines will execute a TI command and then flush OutBuff:

WAM:CELL 49
WAM:BBA 4
WAM:CONFIG 150
TI:cfr:cell 49, multi bba 4; config 150
WAM:FLUSHBUFF

FLUSHIP

The FLUSHIP command can be embedded in the integration construct data structure according to the invention.
PURPOSE: Instructs the WAM Interpreter to flush OutBuff up to the next incoming IP output message of the TI interface messages.
SYNTAX: WAM:FLUSHIP
EXAMPLE CALL: WAM:FLUSHIP
DESCRIPTION: The FLUSHIP command exists as a means of removing unwanted messages from OutBuff which may have been generated from any (in this WAMIL language embodiment) previously executed TI command. This command can (in this embodiment of the WAMIL language) be executed prior to execution of the desired TI interface command from which output messages from any previously executed TI command need to be removed from.

The FLUSHIP command when executed sets a flag. After execution of the next TI interface command, this flag setting instructs the WAM Interpreter to remove messages in OutBuff up to but not including the first IP message in OutBuff. If no IP message is encountered nothing is removed from OutBuff. After the removal of any or no messages the flag is reset.
OUTPUT: The following is an example of the output generated to the WAMIL report file upon execution of a FLUSHIP command:

Flush WAMI Buffer To Next IP Message Upon Input
ERRORS: None.
ALTERS: OutBuff.
DEFAULT VALUE: None (in this WAMIL language embodiment).
SEE ALSO: FLUSHBUFF
EXAMPLE: The following script lines execute a TI command, and then flushes OutBuff up to the next IP message after execution of a second TI command:

WAM:CELL 49
WAM:BBA 4
TI:init:cell 49: boot; sw
WAM:FLUSHIP
TI:op:cell 49

FLUSHTAGS

The FLUSHTAGS command can be embedded in the integration construct data structure according to the invention.
PURPOSE: Instructs the WAM Interpreter to flush the internal TAGS FIFO buffer.
SYNTAX: WAM:FLUSHTAGS
EXAMPLE CALL: WAM:FLUSHTAGS
DESCRIPTION: The FLUSHTAGS command instructs the WAM Interpreter to immediately flush the contents of the internal TAGS FIFO buffer. Upon execution of this command the TAGS FIFO buffer will be empty.

The TAGS FIFO buffer holds unique tag numbers for each TI command executed in the script. These tag numbers are included in output messages generated by TI commands, and are unique for each message. The TAGS FIFO buffer is a First-In-First-Out buffer. Therefore the order of the tag numbers in the buffer is the same order as the TI commands executed within the script.

The TAGS FIFO buffer is used by the GETROP command. To retrieve ROP information refer to the GETROP command.

OUTPUT: The following is an example of the output generated to the WAMIL report file upon execution of a FLUSHTAGS command:

Flush TAGS FIFO Buffer
ERRORS: None.
ALTERS: TAGS FIFO buffer.
DEFAULT VALUE: None (in this WAMIL language embodiment).
SEE ALSO: GETROP get_rop_keyword range pattern

GEN

The GEN command can be embedded in the integration construct data structure according to the invention.
PURPOSE: Changes the WAMI global generic load number variable, GEN, to the value provided as an argument.
SYNTAX: WAM:GEN value
EXAMPLE CALL: WAM:GEN a34Y012t
DESCRIPTION: The WAM:GEN command sets the WAMI global generic load number variable to the value provided as an argument. After execution of this command, all (in this embodiment of the WAMIL language) subsequent commands which require use of a generic load number, and all (in this embodiment of the WAMIL language) IF-construct commands which test the current script generic load number, will reference the new value.
OUTPUT: The following is an example of the output generated to the WAMIL report file, upon execution of a GEN command:

Set Generic To a34Y012t
ERRORS: None.
ALTERS: GEN
DEFAULT VALUE: GEN is set to 0 upon initial startup, and is of type string. The WAM:INITIALIZE command also sets this variable to 0.
SEE ALSO: WAM:GETGEN, WAM:INITIALIZE
EXAMPLE: The following script lines set the WAMIL script GEN variable to a34Y012t and then executes TI command:

WAM:CELL 49
WAM:GEN a34Y012t
TI:upd:cell, generic a34Y012t, dlt; uc1

GENVAR

The GENVAR command can be embedded in the integration construct data structure according to the invention.
PURPOSE: Declares to the WAM Interpreter, that a value for the WAMI VAR variable GENVAR will be supplied to the script.
SYNTAX: WAM:GENVAR
EXAMPLE CALL: WAM:GENVAR
DESCRIPTION: The WAM:GENVAR command is a WAMIL declaration command which executes an assignment function. Upon detection of this command, the WAM Interpreter will search the command line arguments for a value to assign to the WAMI VAR variable GENVAR.

Like standard WAMI VAR variable declaration commands, the execution of this command also enables an association with the WAMI global GEN variable. Therefore, until the WAMI global GEN variable association is transferred to another WAMI VAR variable, or disabled, all (in this embodiment of the WAMIL language) references to the WAMI global GEN variable will use the GENVAR variable value.

For script syntax, until an actual GEN number is passed as an argument, when a GENVAR command is used the GEN number within a script shall be referenced as GENVAR from that point forward.

This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:GENVAR is encountered the WAMI GUI platform will prompt the user for the script GENVAR value. Subsequent WAM:GENVAR commands encountered will not cause additional prompting.
SCRIPTOR: If a GENVAR command is deleted from the current script, the Scriptor will prompt the user for a GEN number and then insert a WAM:GEN value command in place of the GENVAR command deleted.
OUTPUT: The following is an example of the output generated to the WAMIL report file, upon execution a GENVAR command:

Set Generic To Argument Value of a3412Y.0T
ERRORS: If no command line value has been provided, the WAM Interpreter will generate an error and script execution will be aborted.
ALTERS: GENVAR
DEFAULT VALUE: GENVAR is set to an unknown state upon initial startup, and is of type integer. The WAM:INITIALIZE command does not reset this WAMI VAR variable.
SEE ALSO: WAM:GEN value
EXAMPLE: The following script verifies if the generic for the current cell is equal to a generic number supplied by the user:

WAM:MSCVAR
WAM:CELLVAR
WAM:GENVAR
WAM:CONNECT TI
TI:op:cell, generic
WAM:DISCONNECT TI
IF:GENERIC GENVAR
THEN:PRINT Generic is valid.
ELSE:PRINT Generic is NOT valid.
WAM:ENDTEST

GETAPX

The GETAPX command can be embedded in the integration construct data structure according to the invention.
PURPOSE: Instructs the WAM Interpreter to save the APXRCV DB form provided as an argument.
SYNTAX: WAM:GETAPX db_form_name db_file_name
EXAMPLE CALL: WAM:GETAPX fci FCIBACKUP
DESCRIPTION: The GETAPX command is a special WAMI functional command which instructs the WAM Interpreter (WAMI) to save the APXRCV DB form, provided by the argument db_form_name, in the current script output directory under the name db_file_name.

The current script output directory is set through the WAMI GUI platform via the user configuration options, or by command line execution of the WAM Interpreter with the -rpt switch, and defaults to Scripts.dir if no sub-directory is specified.

The DB form filename is automatically given the extension .dbf

The APXRCV DB form saved will depend on the current values of the WAMI global variables prior to execution of the GETAPX command. For example, if the WAMI global variable CELL is set to 49, and SG is set to 1, and ANT is set to 1, and the following command is executed:

WAM:GETAPX fci FCIBACKUP

The fci translation DB form for cell 49, server group 1, antenna face 1 will be saved in the filename FCIBACKUP.

If the filename provided as an argument already exists when the GETAPX command is executed, the pre-existing file will be overwritten.

DB FORMS: The following is a list of APXRCV DB forms supported by the GETAPX command:

| DB FORM NAME |
| --- |
| cdhf1 |
| cell2 |
| ceqccu |
| ceqcom2 |
| ceqface |
| ceqsu2 |
| cgsa |
| cmpptm |
| crcseq |
| ctm |
| dcch |
| dhfl |
| ecp |
| fci |
| pptg |
| pptm |
| rcslink |
| resel |
| tpptm |

OUTPUT: The following is an example of the output generated to the WAMIL report file upon execution of a GETAPX command:

Get APXRCV DB Form fci and Save in FCIBACKUP File.

Upon completion of the GETAPX command, the following is an example of the output generated to the WAMIL report file:

WAMI AXPRCV fci Data Retrieved.

ERRORS: If during the initial login attempt the connection attempt fails due to lack of system response, the WAM Interpreter LFAIL flag will be set. The WAM Interpreter will then, for example, generate the following output to the WAMIL report file:

WAMI OMP 5 Timeout. Login Attempt Failed!

A user can test the LFAIL flag within a WAMIL script to check if a login attempt was successful prior to the execution of any (in this WAMIL language embodiment) subsequent WAMIL commands.

If during the initial login attempt the connection once established is lost, the WAM Interpreter CFAIL flag will be set. The WAM Interpreter will then, for example, generate the following output to the WAMIL report file:

WAMI OMP 5 Connection Lost!

A user can test the CFAIL flag within a WAMIL script to check if a connection was lost prior to the execution of any (in this WAMIL language embodiment) subsequent WAMIL commands.

Once a connection is established, if during the APXRCV session the connection is lost, the WAM Interpreter will set the CFAIL flag also. The WAM Interpreter will then, for example, generate the following output to the WAMIL report file:

WAMI APXRCV Session Connection Lost!

If the connection times out at any (in this WAMIL language embodiment) point during the retrieval of data from the APXRCV, meaning no response is received from the APXRCV within the time specified by the WAMI global TimeOut variable, the WAM Interpreter TFAIL flag will be set. The WAM Interpreter will then, for example, generate the following output to the WAMIL report file:

WAMI APXRCV Timeout!

A user can test the TFAIL flag within a WAMIL script to check if the data retrieval did not time out prior to the execution of any (in this WAMIL language embodiment) subsequent WAMIL commands.

If an invalid, or not supported, DB form is provided as an argument, the WAM Interpreter will generate an error.

If an error occurs in saving the APXRCV DB form file, the WAM Interpreter will generate an error and the form will not be saved.

During execution of the GETAPX command, all (in this embodiment of the WAMIL language) APXRCV errors and messages will be printed to the WAMIL report file.

ALTERS: None (in this WAMIL language embodiment).

DEFAULT VALUE: None (in this WAMIL language embodiment).

SEE ALSO: WAM:GETAPXFLD db_form_name db_field_name, WAM:PUTAPX db_form_name db_file_name EXAMPLE: The following script will save the fci DB form for all antenna faces, for cell 49, server group 1:

WAM:MSC 5
WAM:CELL 49
WAM:SG 1
WAM:ANT 1
WAM:GETAPX fci FCIBACKUP1
WAM:ANT 2
WAM:GETAPX fci FCIBACKUP2
WAM:ANT 3
WAM:GETAPX fci FCIBACKUP3
WAM:ENDTEST

GETAPXFLD

The GETAPXFLD command can be embedded in the integration construct data structure according to the invention.

PURPOSE: Instructs the WAM Interpreter to get the APXRCV DB form field name, provided as an argument, and set the WAMI VAR variable APXVAR to the field value.

SYNTAX: WAM:GETAPXFLD db_form_name db_field_name

EXAMPLE CALL: WAM:GETAPXFLD ceqsu2 rmi_thresh

DESCRIPTION: The GETAPXFLD command instructs the WAM Interpreter to get the APXRCV DB form field name, provided by the argument db_field_name, located in the DB form db_form_name, and set the WAMI VAR variable APXVAR to the field value.

The APXRCV DB form field retrieved will depend on the current value of the WAMI global variables prior to execution of the GETAPXFLD command. For example, if the WAMI global variable CELL is set to 49, and ANT is set to 1, and the following command is executed:

WAM:GETAPXFLD ceqsu2 rmi_thresh

The WAMI VAR variable APXVAR will be set to the ceqsu2 DB form rmi_thresh field value, for cell 49, antenna face 1.

If the DB form field name provided as an argument does not exist, the APXVAR variable will be set to INVALID.

DB FORMS: For a list of APXRCV DB forms supported by this command refer to the GETAPX command.
OUTPUT: The GETAPXFLD command automatically executes a GETAPX command, in the process creating a default DB filename. Therefore the initial output generated by this command is the same as execution of the GETAPX command to retrieve an entire DB form. Once the entire DB form has been retrieved, the GETAPXFLD command will search through the file and locate the desired field. The output generated upon completion of this process will then be the following:

Get APXRCV DB Form ceqsu2 Field rmi_thresh:
Field rmi_thresh=0

The DB form filename is given the name GET_db_form_name.dbf. For example, the command, WAM:GETAPXFLD cell2 vssw, will create a default DB file called GET_cell2.dbf in the script output directory. If this default file already exists in the script output directory, the GETAPXFLD command will simply search the file for the desired db_field_name.
ERRORS: See GETAPX command.

If an error occurs in retrieving the APXRCV DB form field value, the WAM Interpreter will generate an error and the field will not be retrieved. The APXVAR variable will then be set to ERROR.
ALTERS: APXVAR.
DEFAULT VALUE: APXVAR is set to NULL upon initial startup, and is of type string. The WAM:INITIALIZE command does not alter this variable.
SEE ALSO: WAM:GETAPX db_form_name db_file_name, WAM:PUTAPXFLD db_form_name db_field_name
EXAMPLE: The following script will retrieve a field value from an APXRCV DB form, set the value to zero, and at the end restore the DB form to its original state:

WAM:MSC 5
WAM:CELL 49
WAM:ANT 1
WAM:GETAPXFLD ceqsu2 rmi_thresh
IF:APXVAR NE 0
THENDO:
  WAM:SETVAR APXVAR 0
  WAM:PUTAPXFLD ceqsu2 rmi_thresh
ELSEDO:
ENDIF:
WAM:PUTAPX ceqsu2 GET_ceqsu2
WAM:ENDTEST

GETCELLS

The GETCELLS command can be embedded in the integration construct data structure according to the invention.
PURPOSE: Instructs the WAM Interpreter to retrieve all (in this embodiment of the WAMIL language) the cell numbers for the current MSC.
SYNTAX: WAM:GETCELLS
EXAMPLE CALL: WAM:GETCELLS
DESCRIPTION: The GETCELLS command is a special function command. When executed it automatically loads all (in this embodiment of the WAMIL language) the cell numbers for the current MSC into the WAMI VARn CELL List. Upon successful execution the GETCELLS command will set the WAMI VAR variable WAMVAR to the total number of cells on the current MSC.

This command is only (in this embodiment of the WAMIL language) effective if the previously executed TI interface command was the TI:op:cell, generic command, and Out-Buff holds the output of such command. Otherwise, WAMVAR will be set to 0, and the WAMI VARn List will remain unchanged.

The GETCELLS command is a multi-operational command. Upon successful execution, the CELL numbers retrieved are assigned to the WAMI VARn CELL List, meaning a CELL List is automatically declared within the script. The CELL numbers within the CELL List can then be referenced within the script as WAMI VARn variables, according to their index position in the list. For example, CELLVAR2 refers to the second CELL number in the CELL List. The GETCELLS command assigns the CELL numbers in numerical order.

Also, like standard WAMI VARn variable assignment commands, the execution of this command also enables an association with the WAMI global CELL variable. Therefore, until the WAMI global CELL variable association is transferred to a WAMI VAR variable, or disabled, all (in this embodiment of the WAMIL language) references to the WAMI global CELL variable will use the CELLVAR1 value. Thus upon successful execution of the GETCELLS command the WAMI global CELL variable is immediately associated with CELLVAR1, as if a WAM:CELLVAR1 command had also been executed. Therefore this command not only (in this embodiment of the WAMIL language) retrieves cell numbers but acts as if a WAM:CELLLIST and WAM:CELLVAR1 command had been executed sequentially.

For script syntax, upon successful execution of the GETCELLS command, the CELL number within a script shall be referenced as CELLVAR1 from that point forward.

If more than one GETCELLS command is used in a WAMIL script, the new cell numbers retrieved will overwrite the pre-existing cell numbers in the CELL List.
OUTPUT: The following is an example of the output generated to the WAMIL report file upon execution of a GETCELLS command:

Total Number Of Cells on MSC 5 is 4
CELL List Values: 2 49 101 160

ERRORS: If the GETCELLS command is executed, and the previous TI interface command executed was not TI:op:cell, generic the WAM Interpreter will print the following warning message to the WAMIL report file:

WARNING:
Current MSC Cell Numbers Not Retrieved.
Must Execute TI:op:cell, generic Command First!

Any references within a script to a WAMI VARn CELL List variable prior to the declaration of the CELL List, in this case the successful execution of the GETCELLS command, will generate a syntax error.
ALTERS: WAMI VARn CELL List, WAMVAR
DEFAULT VALUE: The WAMI VARn CELL List variable is set to 0 upon initial startup, and is of type integer, meaning only (in this embodiment of the WAMIL language) CELLVAR1 has a value of zero. The WAM:INITIALIZE command does not reset this list.
SEE ALSO: WAM:GETGEN
EXAMPLE: The following script executes a TI command on all the MSC cells:

WAM:MSC 5
WAM:CONNECT TI
TI:op:cell, generic
WAM:GETCELLS
IF:WAMVAR NE 0

```
THENDO:
    WAM:SET WAMI 1
    WAM:SET CELL CELLVAR
    WHILE:TEST_EXPR WAMI LTE WAMVAR
        WAM:GETLISTVAR CELLVAR CELLLIST WAM
        TI:op:cell CELLVAR
        IF:OMSG COMPLETED
        THEN:CONTINUE
        ELSE:WAITQUERY 10 TI 2
        INCR WAMI 1
    ENDWHILE:
ELSEDO:
    WAM:PRINT No Cells on MSC MSCVAR
ENDIF:
WAM:DISCONNECT TI
WAM:ENDTEST
```

GETGEN

The GETGEN command can be embedded in the integration construct data structure according to the invention.
PURPOSE: Instructs the WAM Interpreter to retrieve the generic value for the current cell number and set the WAMI global variable GEN to that value.
SYNTAX: WAM:GETGEN
EXAMPLE CALL: WAM:GETGEN
DESCRIPTION: The GETGEN command when executed automatically sets the WAMI global variable GEN to the generic value for the current cell number defined by the WAMI global variable CELL.

Successful execution of this command also disables any (in this WAMIL language embodiment) association which exists between this WAMI global variable and any WAMI VAR variable.

This command is only (in this embodiment of the WAMIL language) effective if the previously executed TI interface command was the TI:op:cell, generic command, and Out-Buff holds the output of such command. Otherwise, the WAMI global variable GEN will remain unchanged.
OUTPUT: The following is an example of the output generated to the WAMIL report file upon execution of a GETGEN command:

Current Cell 49 Generic: a34Y012t
ERRORS: If the GETGEN command is executed, and the previous TI interface command executed was not TI:op:cell, generic the WAM Interpreter will print the following warning message to the WAMIL report file:

WARNING:
    Current Cell Generic Not Retrieved.
    Must Execute TI:op:cell, generic Command First!
ALTERS: GEN.
DEFAULT VALUE: None (in this WAMIL language embodiment).
SEE ALSO: WAM:GEN value
EXAMPLE: The following script will execute a sub-WAMIL script on all cells with the generic value specified by the user:

```
WAM:MSC 5
WAM:WAMLIST Enter Generic Value For Cells To Be Tested
WAM:CONNECT TI
TI:op:cell, generic
WAM:GETCELLS
IF:WAMVAR NE 0
THENDO:
    WAM:SET WAMI 1
    WAM:SET CELL CELLVAR
    WHILE:TEST EXPR_WAMVAR NE 0
        WAM:GETLISTVAR CELLVAR CELLLIST WAM
        WAM:GETGEN
        IF:GENERIC WAMVAR1
        THENDO:
            WAM:EXEC CERT jt1234
        ELSEDO
        ENDIF:
        WAM:INCR WAMI 1
        WAM:DECRVAR WAMVAR 1
    ENDWHILE:
ELSEDO:
    WAM:PRINT No Cells on MSC MSCVAR Tested
ENDIF:
WAM:DISCONNECT TI
WAM:ENDTEST
```

GETLISTVAR

The GETLISTVAR command can be embedded in the integration construct data structure according to the invention.
PURPOSE: Instructs the WAM Interpreter to assign the WAMI VARn List, var_list_name, variable value, in the position indicated by the argument index, to the WAMI VAR variable var_variable.
SYNTAX: WAM:GETLISTVAR var_variable var_list_name index
EXAMPLE CALL: WAM:GETLISTVAR CELLVAR CELLLIST 2
DESCRIPTION: GETLISTVAR is an assignment command which automatically assigns the var_list_name variable value in the position indicated by the argument index to the WAMI VAR variable var_variable. This command can only (in this embodiment of the WAMIL language) be executed if the WAMI VARn List has been declared in the script. Upon execution, this command performs a straightforward assignment of the WAMI VARn List variable value to the WAMI VAR variable var_variable.

The index argument can (in this embodiment of the WAMIL language) be a valid index into the WAMI VARn List. Any List value can be assigned to any (in this WAMIL language embodiment) WAMI VAR variable by execution of this command, where index is the variable value location within the WAMI VARn List.

The index argument can also reference to a WAMI global variable, WAMI VAR variable, or WAMI VARn List variable name. In such a case the current value of the referenced variable is used as the index position.
OUTPUT: The following is an example of the output generated to the WAMIL report file upon execution of a GETLISTVAR command, when a CCC List of 3 was previously declared, and the CCC List numbers passed as an argument are 2 4 6:

Set CCCVAR To CCCVAR2 Value Of 4
ERRORS: An invalid index argument, where the index refers to a VARn List index outside the list range, will generate an error. Script execution will then be aborted.

If a GETLISTVAR command is used within a script in which no corresponding WAMI VARn List has been declared, the WAM Interpreter will generate an error and terminate execution of the script.
ALTERS: WAMI VAR variable given.
DEFAULT VALUE: None (in this WAMIL language embodiment).

SEE ALSO: WAM:SETVAR var_variable value
EXAMPLE: The following script executes a TI command for each CCU number in a list:
  WAM:MSC 5
  WAM:CELL 49
  WAM:WAMLIST Enter Two CCU Numbers
  WAM:SET CCU CCUVAR
  WAM:CONNECT TI
  WAM:GETLISTVAR CCUVAR WAMLIST 1
  TI:op:cell 49, ccc 1, ccu CCUVAR
  WAM:GETLISTVAR CCUVAR WAMLIST 2
  TI:op:cell 49, ccc 1, ccu CCUVAR
  WAM:DISCONNECT TI
  WAM:ENDTEST

GETROP

The GETROP command can be embedded in the integration construct data structure according to the invention.
PURPOSE: Instructs the WAM Interpreter to retrieve all (in this embodiment of the WAMIL language) the ROP information specified by the arguments.
SYNTAX: WAM:GETROP range pattern
EXAMPLE CALL: WAM:GETROP 0 *
DESCRIPTION: The GETROP command is a special function command. When executed the WAM Interpreter automatically retrieves all (in this embodiment of the WAMIL language) the ROP information specified by the arguments for the current MSC.

The GETROP commands acts per the contents of the TAGS FIFO buffer. The TAGS FIFO buffer holds unique tag numbers for each TI command executed in the script. These tag numbers are included in output messages generated by TI commands, and are unique for each message. The TAGS FIFO buffer is a First-In-First-Out buffer. Therefore the order of the tag numbers in the buffer is the same order as the TI commands executed within the script. The TAGS FIFO buffer is never flushed unless a FLUSHTAGS command is executed, and is continuously appended to with the execution of TI commands.

Upon execution, GETROP retrieves all (in this embodiment of the WAMIL language) messages within the ROP which correspond to the tag numbers stored in the TAGS FIFO buffer. If the range argument is 0, and the pattern argument is *, then all (in this embodiment of the WAMIL language) the ROP messages from the first tag number in the TAGS FIFO buffer, up to and including the messages with the last tag number in the TAGS FIFO buffer, will be retrieved and printed in the script WAMIL report file.

The pattern argument can be any (in this WAMIL language embodiment) string and include glob-style matching characters. For example, if the pattern REPT* is used, with a range of 0, then only (in this embodiment of the WAMIL language) messages between the tag numbers in the TAGS FIFO buffer which include the string REPT will be printed in the script output file.

The range argument can be used to specify a range within or outside the tag numbers held in the TAGS FIFO buffer. For example, a range of +100, will print all (in this embodiment of the WAMIL language) ROP messages which start 100 numbers before the first tag number in the TAGS FIFO buffer, and up to and including 100 numbers after the last tag number in the TAGS FIFO buffer. A range argument of −100 will do the opposite. That is print ROP messages from 100 numbers after the first message in the TAGS FIFO buffer, up to and including 100 numbers before the last tag number in the TAGS FIFO buffer.

The GETROP pattern argument also supports keywords. These keywords are translated into specific actions. For example, when the WAM Interpreter starts execution of a test the start and end of the test is stamped on the ROP. Therefore to retrieve all (in this embodiment of the WAMIL language) the output messages from the ROP which pertain to the execution of a script a user can use the ALLWAMI keyword. Below is a list of GETROP keywords. This list will grow as needed:

| GETROP KEYWORD | DESCRIPTION |
| --- | --- |
| ALLWAM | All ROP output from the start of script execution until the end. |
| ALLDAY | All ROP messages which pertain to the same day as script execution start date. |
| ALLHOUR | ALL ROP messages which pertain to the same hour as script execution start hour. |

OUTPUT: The following is an example of the output generated to the WAMIL report file upon execution of a GETROP command:
  ROP Output Retrieved:
  11/16/98 08:33:45 #106612
  M 33 OP:CELL 1 LC 20, UCL, VERSION
  MAIN NVM 231198
  MAIN ROM 082294
  ANGEL 11
  ENC ROM 010491
  DEC NVM 040790
  DEC ROM 090193
  BASEBAND 0827942
  ROP Output End:
ERRORS: If the GETROP command is executed, and the TAGS FIFO buffer is empty. Nothing will be printed to the script output file.
If an error is generated during retrieval of information from the ROP, such errors will be printed in the script output file.
ALTERS: None (in this WAMIL language embodiment).
DEFAULT VALUE: None (in this WAMIL language embodiment).
EXAMPLE: The following script executes two TI commands and then retrieves all the corresponding ROP information prior to terminating:
  WAM:MSC 5
  WAM:CELL 49
  WAM:CONNECT TI
  TI:op:cell 49, ccc 1, ccu 1
  WAM:CCU 2
  TI:op:cell 49, ccc 1, ccu 2
  WAM:DISCONNECT TI
  WAM:GETROP 0 ALLWAM
  WAM:ENDTEST

GETSDP

The GETSDP command can be embedded in the integration construct data structure according to the invention.
PURPOSE: Retrieves an indicator STATE, COLOR, and VALUE from the current SDP in the WAMI OutBuff for the WAMI global variable associated with the indicator name, SDPVAR, provided as an argument.

SYNTAX: WAM:GETSDP indicator_name
EXAMPLE CALL: WAM:GETSDP CCCOOS
DESCRIPTION: The GETSDP command is a special function command which sets the WAMI variables SDPVAR_STATE, SDPVAR_COLOR, and SDPVAR_VALUE to the respective STATE, COLOR, and VALUE of the indicator name, SDPVAR, provided as an argument. The STATE, COLOR, and VALUE is retrieved from the current SDP held in the WAMI OutBuff. The specific indicator for which the STATE, COLOR, and VALUE is retrieved is determined by using the indicator name provided in conjunction with the numerical value of its associated WAMI global variable, if any.

Almost all (in this embodiment of the WAMIL language) supported indicator names have an associated WAMI global variable. For example, indicator name CCCOOS is associated with the WAMI global variable CCC, and indicator name CHANL is associated with the WAMI global variable BBA, on SDP 2138.

Upon execution of the GETSDP command, SDPVAR_VALUE can be set to any (in this WAMIL language embodiment) text, numerical, or alphanumerical string retrieved from the current SDP which represents the desired indicator. This is usually the alphanumeric string displayed with the indicator. SDPVAR_STATE and SDPVAR_COLOR are fixed pre-defined states and colors. The list of pre-defined states is extensive and SDP dependent. These indicator states which are mapped to a color are described in the Operations, Administration, and Maintenance Guide, Vol. 1, 401–610–160, Issue 9, manual and will not be explained here. Colors are mapped to a state by the GETSDP command depending on the SDP, per the above mentioned document.

A list of valid STATE words which SDPVAR_STATE can be set to is given in the GETSDP States Table provided below. A list of all (in this embodiment of the WAMIL language) valid GETSDP indicator names supported by the GETSDP command, along with their respective SDP and associated WAMI global variable, if any, and WAMI version in which they are supported is given in the GETSDP Indicator Names Table below.

Below is a list of valid COLOR words which SDPVAR_COLOR can be set to:

| COLOR |
| --- |
| BLACK_ON_GREEN |
| BLACK_ON_RED |
| BLACK_ON_WHITE |
| BLACK_ON_YELLOW |
| BLUE_ON_YELLOW |
| MAGENTA_ON_BLACK |
| RED_ON_GREEN |
| RED_ON_WHITE |
| RED_ON_YELLOW |
| WHITE_ON_BLACK |
| WHITE_ON_BLUE |
| WHITE_ON_MAGENTA |
| WHITE_ON_RED |
| WHITE_ON_RED_FLASH |

Since an SDP can be cell site equipment dependent, the WAMI global variable CELL_TYPE can (in this embodiment of the WAMIL language) first be set to the correct type prior to the execution of the GETSDP command. The default value for CELL_TYPE is SERIESII.
OUTPUT: The following is an example of the output generated to the WAMIL report file for the PAF indicator name, upon execution of a WAM:GETSDP PAF command for SDP 2138:

SDP Page 2138 Query results:
BBA 19 Physical Antenna Face
NOPAGE BLACK_ON_YELLOW 1

Where SDPVAR_STATE has been set to NOPAGE, SDPVAR_COLOR has been set to BLACK_ON_YELLOW, and SDPVAR_VALUE has been set to 1.

Since there is an extensive list of possible indicator names example outputs will not be shown here for each indicator. all (in this embodiment of the WAMIL language) indicator outputs follow the same format as above, the second line being a description of the indicator. After the execution of the GETSDP command, the variables SDPVAR_STATE, SDPVAR_COLOR, and SDPVAR_VALUE can then be tested.
ERRORS: An SDP interface command can (in this embodiment of the WAMIL language) be executed prior to the execution of the GETSDP command or the SDPVAR_STATE, SDPVAR_COLOR, and SDPVAR_VALUE variables will each be set to INVALID, and an error will be generated.

The SDPVAR_STATE for the corresponding SDPVAR_COLOR retrieved is release dependent. Therefore, the WAMI global variable REL can (in this embodiment of the WAMIL language) first be set to the correct software release value prior to the execution of the GETSDP command or invalid results may be returned. The default value for the REL variable is 8.0.

The SDPVAR_STATE, SDPVAR_COLOR, and SDPVAR_VALUE variables remain unchanged within a script until the execution of a subsequent GETSDP command.

Using indicator names not valid for the current SDP will also set the SDPVAR_STATE, SDPVAR_COLOR, and SDPVAR_VALUE variables each to INVALID, and generate an error.

If a valid indicator name is used for the current SDP, and the indicator name is not currently displayed, the SDPVAR_STATE, SDPVAR_COLOR, and SDPVAR_VALUE variables will each be set to NOTSHOWN.

If a new, or undefined, STATE or COLOR are retrieved for the indicator name, the GETSDP command will set SDPVAR_COLOR and SDPVAR_STATE to UNDEFINED.

Execution of the GETSDP command after the execution of any (in this WAMIL language embodiment) other SDP command will set the SDPVAR_STATE, SDPVAR_COLOR, and SDPVAR_VALUE variables to INVALID, and generate an error.
ALTERS: SDPVAR, SDPVAR_STATE, SDPVAR_COLOR, SDPVAR_VALUE
DEFAULT VALUE: SDPVAR_STATE, SDPVAR_COLOR, and SDPVAR_VALUE, are all (in this embodiment of the WAMIL language) set to INVALID upon initial startup. SDPVAR is set to NULL. The WAM:INITIALIZE command does not alter these variables.
EXAMPLE: The following script will set the variables SDPVAR_STATE, SDPVAR_COLOR, and SDPVAR_VALUE to the respective STATE, COLOR, and VALUE of the CCC 19 indicator on SDP 2138, and then test if the SDPVAR_STATE variable is ACT:

WAM:MSC 5
WAM:CELL 49
WAM:CCC 19
WAM:CONNECT SDP
SDP:2138,49
WAM:DISCONNECT SDP

WAM:GETSDP CCC
IF:TEST_EXPR SDPVAR_STATE EQ ACT
THENDO:
    WAM:PRINT CCC CCCVAR is Active!
ELSEDO:
    WAM:PRINT CCC CCCVAR is NOT Active!
ENDIF:
WAM:ENDTEST Although the VALUE of the CCC 19 indicator is in fact the number 19, SDPVAR_VALUE is more useful when a GETSDP command is executed to retrieve the number of CE's OOS for a specific CCC, or a specific BBA frequency. For example, the following script tests to see if any Channel Elements are OOS for CCC 19, and then sets SDPVAR_VALUE to the VALUE of the BBA 19 channel frequency indicator and tests if the frequency is 150. If no CEs are OOS, and the frequency is correct, the script then executes another WAMIL script:

WAM:MSC 5
    WAM:CELL 49
    WAM:BBA 19
    WAM:CCC 19
    WAM:OUTPUTOFF
    WAM:CONNECT SDP
    SDP:2138,49
    WAM:DISCONNECT SDP
    WAM:GETSDP CCCOOS
    IF:TEST_EXPR SDPVAR_VALUE NE NOTSHOWN
    THENDO:
        WAM:PRINT CCC CCCVAR CEs OOS, /w
            a total of SDPVAR_VALUE
        WAM:ENDTEST
    ELSEDO:
    ENDIF:
    WAM:GETSDP CHANL
    IF:TEST_EXPR SDPVAR_VALUE EQ 150
    THENDO:
    ELSEDO:
        WAM:PRINT Channel Frequency is Not Correct, /w
            it is SDPVAR_VALUE
        WAM:ENDTEST
    ENDIF:
    WAM:UNIX WAMI30jt1234 -msc MSCVAR -cell CELLVAR
    WAM:ENDTEST Below is an example of an SDP 2138 query for FLEX-ENT cell site equipment:

WAM:MSC 5
    WAM:CELL 38
    WAM:SET MICROCELL 1
    WAM:SET CELL_TYPE MICRO
    WAM:CONNECT SDP
    SDP:2138,38
    WAM:DISCONNECT SDP
    WAM:GETSDP CRCSTAT
    WAM:ENDTEST

Below is an example of an SDP 2121 query for the status of every cell on an MSC:

WAM:OUTPUTOFF
    WAM:MSC 5

WAM:CONNECT SDP
    SDP:2121
    WAM:DISCONNECT SDP
    WAM:SET CELL CELLVAR
    WAM:SETVAR CELLVAR 1
    WHILE:TEST_EXPR CELLVAR LT 223
        WAM:GETSDP CELL
        WAM:INCRVAR CELLVAR 1
    ENDWHILE:
    WAM:ENDTEST

GETSDP Support Commands Table:

| SDP COMMAND | CELL_TYPE |
|---|---|
| 2121 | SERIESII |
| 2132 | SERIESII |
| 2134 | SERIESII |
| 2138 | SERIESII |
| 2138 | MICRO 3.0 |
| 2139 | SERIESII |
| 2140 | SERIESII |
| 2141 | SERIESII |

GETSDP States Table:

| STATE | DESCRIPTION |
|---|---|
| ACT | Active |
| ALARM | Alarm |
| ALLOWED | Allowed |
| ARR_ACTIVE | Automatic radio reconfiguration active |
| BLKD | Blocked |
| BUSY_ACTIVE | Traffic, active state |
| CAMP_ON | Camp on |
| CE_FAIL | Overhead CE failed pilot level FT |
| CP_I | Call processing inhibited |
| GROW | Growth |
| IDLE | Traffic |
| INDETMNT | Indeterminate |
| INH | Inhibited |
| INHIBITED | Inhibited |
| INIT | Transient clear, stable clear, or boot initialization phase |
| LIMIT_EX | Limit Exceeded |
| MAJOR | Major Alarm |
| MINOR | Minor Alarm |
| NONE | No State |
| NOPAGE | No Page |
| NORMAL | Normal |
| OFF | Off |
| ON | On |
| OOS | Out Of Service |
| OOS_EX | Out Of Service EX |
| OVLD | Processor Overload |
| PILOTDG | Pilot DG |
| PSA_ALARM | PSA Alarm |
| STBY | Standby |
| TRBL | Trouble |

| STATE | DESCRIPTION |
|---|---|
| UNDEFINED | GETSDP TOOL Undefined State |
| UNEQ | Unequipped |
| UNKNOWN | Unknown State |
| WARNING | Warning |

GETSDP Indicator Names Table:

| INDICATOR | CELL_TYPE | SDP | GLOBAL | DESCRIPTION |
|---|---|---|---|---|
| 5EDCS_CRITICAL | SERIESII | 2141 | | 5E DCS Critical Alarm State |
| 5EDCS_MAJOR | SERIESII | 2141 | | 5E DCS Major Alarm State |
| 5EDCS_MINOR | SERIESII | 2141 | | 5E DCS Minor Alarm State |
| 5EDCS_STATUS | SERIESII | 2141 | | 5E DCS Status |
| AFAC | SERIESII | 2141 | | DCS AUTOPLEX Facility Status |
| AUDITS | SERIESII | 2132 | | Cell Site Audits Status |
| AUDIT_HEH_OUT | SERIESII | 2132 | | Audits Output/HEH Messages State |
| BBA | SERIESII | 2138 | BBA | BBA |
| BDTYPE | SERIESII | 2134 | DS1 | DS1 Trunk Signaling Board Type |
| BFC | SERIESII | 2139 | | Blocked From Cell Bit |
| BFD | SERIESII | 2139 | | Blocked From DCS Bit |
| BFM | SERIESII | 2139 | | Blocked From MSC Bit |
| BLK_RSN1 | SERIESII | 2139 | | Sector 1 Blocked Reason |
| BLK_RSN2 | SERIESII | 2139 | | Sector 2 Blocked Reason |
| BLK_RSN3 | SERIESII | 2139 | | Sector 3 Blocked Reason |
| BOOT | SERIESII | 2132 | | Cell Site Automatic Boot State |
| CALL_PROCESSING | SERIESII | 2132 | | Call Processing State |
| CBRSTAT | MICRO | 2138 | MICRO-CELL | MICRO-CELL CBR Status |
| CC0 | SERIESII | 2140 | DCS | DCS Common Controller 0 Status |
| CC1 | SERIESII | 2140 | DCS | DCS Common Controller 1 Status |
| CCC | SERIESII | 2138 | CCC | CCC |
| CCCOOS | SERIESII | 2138 | CCC | CCC OOS CEs |
| CCURSN | SERIESII | 2139 | CCU | CCU State Reason |
| CCUSRC | SERIESII | 2139 | CCU | CCU State Source |
| CCUCEPAF | SERIESII | 2139 | CCU, CE | CCU CE Antenna Face |
| CCUCESTAT | SERIESII | 2139 | CCU, CE | CCU CE Status |
| CDMA_INV_CTL | SERIESII | 2132 | | CDMA Inventory Control State |
| CDMACNUM | SERIESII | 2139 | | CDMA Carrier Number |
| CDN | SERIESII | 2121 | CDN | CDN Status Block |
| CELL | SERIESII | 2121 | CELL | CELL Site Status |
| CEOOS | MICRO | 2138 | MICRO-CELL | MICRO-CELL OOS CEs |
| CHANL | MICRO | 2138 | MICRO-CELL | MICRO-CELL Channel Frequency |
| CHANL | SERIESII | 2138 | BBA | BBA Channel Frequency |
| COMM | SERIESII | 2141 | | DCS Communications Status |
| CRCSTAT | MICRO | 2138 | MICRO-CELL | MICRO-CELL CRC Status |
| CTRMSTAT | MICRO | 2138 | MICRO-CELL | MICRO-CELL CTRM Status |
| DCS | MICRO | 2138 | | MICRO-CELL DCS Serving |
| DCS | SERIESII | 2121 | DCS | DCS Status |
| DCS | SERIESII | 2140 | DCS | DCS Status |
| DCSTG | SERIESII | 2121 | DCS | DCS Trunk Group |
| DIVERR_OUT | SERIESII | 2132 | | Diversity Error Imbalance Output State |
| DL0 | SERIESII | 2140 | DCS | DCS Data Link 0 Status |
| DL1 | SERIESII | 2140 | DCS | DCS Data Link 1 Status |
| DLN1 | SERIESII | 2121 | | Direct Link Node 1 |
| DLN2 | SERIESII | 2121 | | Direct Link Node 2 |
| DIVALRM | MICRO | 2138 | MICRO-CELL | MICRO-CELL DIV ALRM |
| DS1 | SERIESII | 2134 | DS1 | DS1 |
| ECP_AUD | SERIESII | 2121 | | ECP Audits State |
| ECP_OVLD | SERIESII | 2121 | | ECP Overload Indicator State |
| EQP | SERIESII | 2140 | DCS | DCS Equipment Status |
| FWD_SET-UP_CHANL | SERIESII | 2132 | | Forward Set-up channel Control State |
| FUNC_TESTS | SERIESII | 2132 | | Cell Site Routine Functional Tests State |

-continued

| INDICATOR | CELL_TYPE | SDP | GLOBAL | DESCRIPTION |
|---|---|---|---|---|
| GPSSTAT | MICRO | 2138 | MICRO-CELL | MICRO-CELL GPS Status |
| IMS | SERIESII | 2121 | | IMS Status |
| INCMDS1 | MICRO | 2138 | MICRO-CELL | MICRO-CELL In-Coming DS1 |
| INTERRUPTS | SERIESII | 2132 | | Cell Site Hardware Interrupts State |
| LINERATE | SERIESII | 2134 | DS1 | DS1 Facility |
| MICROCELL | MICRO | 2138 | MICRO-CELL | MICRO-CELL |
| MSC | SERIESII | 2121 | MSC | Direct Networked MSC State |
| OFD_CAP | SERIESII | 2132 | | OFD-CAP State |
| OFD_MS | SERIESII | 2132 | | OFD-MS State |
| OFD_PG | SERIESII | 2132 | | OFD-PG State |
| OMP | SERIESII | 2121 | | OMP and FLA_OMP State |
| OMP_COM | SERIESII | 2121 | | DCI Link, Interprocessor Communications State |
| OMPLK0 | SERIESII | 2121 | | DCI Link 0 State |
| OMPLK1 | SERIESII | 2121 | | DCI Link 1 State |
| OPMSG | SERIESII | 2121 | | Output Message Direction Status |
| OUTGDS1 | MICRO | 2138 | MICRO-CELL | MICRO CELL Out-Going DS1 |
| PAF | SERIESII | 2138 | BBA | BBA Physical Antenna Face |
| PAFSTATE | MICRO | 2138 | MICRO-CELL | MICRO-CELL Physical Antenna Face State |
| PAFSTATENUM | MICRO | 2138 | MICRO-CELL | MICRO-CELL Physical Antenna Face Number |
| PRASE_MONITOR | SERIESII | 2132 | | Automatic Cell Site Removal on Repeated Phasing |
| PPG | MICRO | 2138 | MICRO-CELL | Packet Pipe Group |
| PPTGMEMNUM | SERIESII | 2139 | | Packet Pipe Trunk Group Member |
| PPW | MICRO | 2138 | MICRO-CELL | MICRO-CELL Packet Pipe Width |
| PPW | SERIESII | 2138 | CCC | CCC Packet Pipe Width |
| RECVAMP | MICRO | 2138 | MICRO-CELL | MICRO-CELL RECV AMP |
| RTDIAG | SERIESII | 2132 | | Cell Site Routine Hardware Diagnostics |
| SECTNUM1 | SERIESII | 2139 | | Sector Item 1 Number |
| SECTNUM2 | SERIESII | 2139 | | Sector Item 2 Number |
| SECTNUM3 | SERIESII | 2139 | | Sector Item 3 Number |
| STATE | SERIESII | 2134 | DS1 | DS1 State |
| SUMMARY | SERIESII | 2141 | | DCS Communications Status Summary |
| TFUSTAT | MICRO | 2138 | MICRO-CELL | MICRO-CELL TFU Status |
| TRKGRP | SERIESII | 2140 | DCS | DCS Trunk Group Status |
| XMITAMP | MICRO | 2138 | MICRO-CELL | MICRO-CELL XMIT AMP |

GET_TI

The GET_TI command can be embedded in the integration construct data structure according to the invention.

PURPOSE: Instructs the WAM Interpreter to assign to var_variable the value located in position index relative to the string provided.

SYNTAX: WAM:GET_TI var_variable index string

EXAMPLE CALL: WAM:GET_TI MCRVAR 1 MCR

DESCRIPTION: The GET_TI command is a special function command which allows a user to retrieve a specific value from any (in this WAMIL language embodiment) TI output message, and assign that value to a specific WAMI VAR variable.

Execution of this command causes the WAM Interpreter to search the WAMI buffer for the first occurrence which matches the argument string. The index argument then specifies the location of the desired value relative to the string matched. The WAMI VAR variable specified by the argument var_variable is then set to that value.

For example, consider the following TI output message:

M 28 REPT:CP, DN 2019567291 MIN 2019567291

MOBILE SERIAL NUMBER X198e13b

DCS 5

CGSA 1

CDN 2

MCR 647

ISR NONE

Execution of the command WAM:GET_TI MCRVAR 1 MCR, will set the WAMI VAR variable MCRVAR to the value of 647, and execution of the command WAM:GET_TI MOBILEVAR 1 DN will set the WAMI VAR variable MOBILEVAR to the value of 2019567291. Execution of either of the following commands will set the VAR variable WAMVAR to the value of X198e13b:

WAM:GET_TI WAMVAR 1 MOBILE SERIAL NUMBER

WAM:GET_TI WAMVAR 2 SERIAL

Execution of this command causes a direct assignment to the WAMI VAR variable specified. It does not establish an association between the WAMI VAR variable specified and its complementary WAMI global variable.

If the string provided is not matched, the WAMI VAR variable specified by the argument var_variable will remain unchanged.

If the index position provided yields no value, the WAMI VAR variable specified by the argument var_variable will remain unchanged.

The string argument can also include references to WAMI global variables, or WAMI VARn variables. To reference a WAMI global variable the suffix VAR is simply added to the WAMI global variable name. This is not to be mistaken with WAMI VAR variables. Although when referencing WAMI global variables within strings the names resemble WAMI VAR variables, this naming convention was chosen to allow references to WAMI global variables and still be able to print the variable name. To include the value of a WAMI VAR variable, a WAMI global variable can (in this embodiment of the WAMIL language) first be associated. Then references to the WAMI global variable will yield the value of the WAMI VAR variable it is associated with.

OUTPUT: The following is an example of the output generated to the WAMIL report file upon execution an GET_TI command:

Set MCRVAR to 647 per TI output message.

ERRORS:. The argument var_variable can (in this embodiment of the WAMIL language) be a valid WAMI VAR variable name or a syntax error will be generated and script execution will be aborted.

The argument index can (in this embodiment of the WAMIL language) be a valid positive integer number or a syntax error will be generated and script execution will be aborted.

If this command is executed and the WAMI buffer does not contain any (in this WAMIL language embodiment) TI output message, an error will be generated during execution of the script. Such error will be printed in the script output file. The WAMI VAR variable specified by the argument var_variable will remain unchanged.

If the value retrieved is not of the same type as the WAMI VAR variable specified, an error will be generated, the error message printed in the script output file, and the WAMI VAR variable specified by the argument var_variable will remain unchanged.

ALTERS: WAMI global variable provided.

DEFAULT VALUE: None (in this WAMIL language embodiment).

EXAMPLE: The following WAMIL script determines the CCC, CCU and CE a mobile call is on:

WAM:MSCVAR
WAM:CELLVAR
WAM:WAMLIST Enter A Mobile Phone Number
WAM:SET MOBILE WAMVAR1
WAM:SET MCR MCRVAR
WAM:SETVAR MCRVAR 0
WAM:CONNECT TI
TI:op:dn "WAMVAR1"
WAM:GET_TI MCRVAR 1 MCR
IF:TEST_EXPR MCRVAR EQ 0
THENDO:
  WAM:PRINT Call on MOBILE WAMVAR1 is Not Up!
  WAM:ENDTEST
ELSEDO:
ENDIF:
WAM:SET CDN CDNVAR
WAM:GET_TI CDNVAR 1 CDN
TI:op:mcr MCRVAR, cdn CDNVAR
WAM:DISCONNECT TI
WAM:SET CCC CCCVAR
WAM:SET CCU CCUVAR
WAM:SET CE CEVAR
WAM:GET_TI CCCVAR 1 CELL CELLVAR CCC
WAM:GET_TI CCUVAR 1 CELL CELLVAR CCC CCCVAR, CCU
WAM:GET_TI CEVAR 1 CELL CELLVAR CCC CCCVAR, CCU
CCUVAR, CE
WAM:PRINT Mobile Call is on CCC CCCVAR, CCU CCUVAR, CE
CEVAR.
WAM:ENDTEST

INCR

The INCR command can be embedded in the integration construct data structure according to the invention.

PURPOSE: Instructs the WAM Interpreter to increment the WAMI global variable provided, by the value given.

SYNTAX: WAM:INCR global_variable value

EXAMPLE CALL: WAM:INCR BBA 2

DESCRIPTION: The INCR command increments the current value of the WAMI global variable provided by the argument global_variable, by the value given. This command performs a straightforward addition. The WAMI global variable can (in this embodiment of the WAMIL language) be of type integer. The value given can (in this embodiment of the WAMIL language) be a valid integer number.

This command only (in this embodiment of the WAMIL language) operates on WAMI global variables. To increment the value of a WAMI VAR variable use the INCRVAR command.

OUTPUT: The following is an example of the output generated to the WAMIL report file, upon execution an INCR command:

Increment BBA from 2 to 4

ERRORS: None.

ALTERS: WAMI global variable provided.

DEFAULT VALUE: None (in this WAMIL language embodiment).

SEE ALSO: WAM:DECR global variable value

EXAMPLE: The following script increments BBA by two and then executes a TI command using the new BBA value.

WAM:CELL 49
WAM:BBA 4
TI:op:cell 49, bba 4
WAM:INCR BBA 2
TI:op:cell 49, bba 6

INCRVAR

The INCRVAR command can be embedded in the integration construct data structure according to the invention.

PURPOSE: The INCRVAR command instructs the WAM Interpreter to increment the WAMI VAR variable provided as an argument by the value given.

SYNTAX: WAM:INCRVAR var_variable value

EXAMPLE CALL: WAM:INCRVAR BBAVAR 1

DESCRIPTION: The INCRVAR command increments the current value of the WAMI VAR variable provided by the argument var_variable, by the value given. This command performs a straightforward addition. The WAMI VAR variable can (in this embodiment of the WAMIL language) be of type integer. The value given can (in this embodiment of the WAMIL language) be a valid integer number.

This command only (in this embodiment of the WAMIL language) operates on WAMI VAR variables. To increment the value of a WAMI global variable use the INCR command.
OUTPUT: The following is an example of the output generated to the WAMIL report file, upon execution an INCRVAR command:

Increment BBAVAR by 1
ERRORS: None.
ALTERS: WAMI VAR variable provided.
DEFAULT VALUE: None (in this WAMIL language embodiment).
SEE ALSO: WAM:DECRVAR var variable value
EXAMPLE: The following script increments BBAVAR by two and then executes a TI command using the new BBAVAR value.

WAM:CELL 49

WAM:BBAVAR

TI:op:cell 49, bba BBAVAR

WAM:INCRVAR BBAVAR 2

TI:op:cell 49, bba BBAVAR

INITIALIZE

The INITIALIZE command can be embedded in the integration construct data structure according to the invention.
PURPOSE: Sets all (in this embodiment of the WAMIL language) WAMI global variables to an initial state.
SYNTAX: WAM:INITIALIZE
EXAMPLE CALL: WAM:INITIALIZE
DESCRIPTION: The INITIALIZE command sets all (in this embodiment of the WAMIL language) WAMI global variables to an initial default state.
GLOBALS: The following is a complete list all (in this embodiment of the WAMIL language) the WAMI global variables set by the INITIALIZE command, and the default value they are set to upon execution of such command:

| WAMI VARIABLE | VALUE | TYPE |
|---|---|---|
| ADDCE | 0 | Integer |
| ADRS | NULL | String |
| ANT | 0 | Integer |
| AU | 1 | Integer |
| BBA | 1 | Integer |
| CAT | 0 | Integer |
| CCC | 1 | Integer |
| CCU | 1 | Integer |
| CDMADPC | 0 | Integer |
| CELL | 0 | Integer |
| CFAIL | 0 | Integer |
| CGSA | 0 | Integer |
| CONFIG | 0 | Integer |
| CSC | 0 | Integer |
| DCCH | 0 | Integer |
| DCS | 0 | Integer |
| DisplayDelay | 1 | Integer |
| DL | 0 | Integer |
| DS1 | 0 | Integer |
| ECP | 0 | Integer |
| GEN | 0 | String |

-continued

| WAMI VARIABLE | VALUE | TYPE |
|---|---|---|
| INACT | 60 | Integer |
| LAC | 0 | Integer |
| LC | 0 | Integer |
| LFAIL | 0 | Integer |
| LMT | 0 | Integer |
| MICROCELL | 0 | Integer |
| MSC | 0 | Integer |
| OC | 0 | Integer |
| PH | 0 | String |
| PL | 0 | Integer |
| RA | 0 | Integer |
| RG | 0 | Integer |
| RPT | 0 | Integer |
| RptName | None | String |
| SG | 0 | Integer |
| SPOOL | 10 | Integer |
| SU | 0 | Integer |
| SW | 0 | Integer |
| TFAIL | 0 | Integer |
| TimeOut | 30 | Integer |
| TP | 0 | Integer |
| TRACE | 0 | Integer |
| TRKGRP | 0 | Integer |
| TRKMBR | 0 | Integer |
| VRADPC | 0 | Integer |
| VRN | 0 | Integer |
| Wait | 10 | Integer |
| XMITC | 0 | Integer |

OUTPUT: The following is an example of the output generated to the WAMIL report file upon execution of a INITIALIZE command:

Initialize All WAMI Variables.
ERRORS: None.
ALTERS: All WAMI global variables.
DEFAULT VALUE: None (in this WAMIL language embodiment).
SEE ALSO: All WAMIL commands which modify WAMI variables.

INPUT

The INPUT command can be embedded in the integration construct data structure according to the invention.
PURPOSE: Replaces the WAM Interpreter OutBuff with the contents of filename.
SYNTAX: WAM:INPUT filename
EXAMPLE CALL: WAM:INPUT RESULTS.txt
DESCRIPTION: The INPUT command instructs the WAM Interpreter to load the contents of the file specified by filename into OutBuff. If OutBuff contains any (in this WAMIL language embodiment) previous data, the data will be overwritten and lost.

The argument filename can (in this embodiment of the WAMIL language) include the complete path to the file. If no path is given, the WAM Interpreter will assume the file is located in the current script output directory.

The INPUT command filename argument can include references to WAMI global variables, or WAMI VARn variables. To reference a WAMI global variable the suffix VAR is simply added to the WAMI global variable name. For example, the following filename, CELLVAR.txt, will be interpreted as, 101.txt, if the script cell number is 101 upon execution of the INPUT command.
OUTPUT: The following is an example of the output generated to the script WAMIL report file upon execution of an INPUT command:

Load File RESULTS.txt
ERRORS: If any (in this WAMIL language embodiment) errors occur in opening or locating the filename specified, such errors will be printed in the WAMIL report file.
If the file to be loaded is too large, unpredictable errors may result.
ALTERS: OutBuff.
DEFAULT VALUE: None (in this WAMIL language embodiment).
SEE ALSO: All OutBuff related WAMIL commands.

LAC

The LAC command can be embedded in the integration construct data structure according to the invention.
PURPOSE: Changes the WAMI global linear amplifier circuit number variable, LAC, to the value provided as an argument.
SYNTAX: WAM:LAC value
EXAMPLE CALL: WAM:LAC 1
DESCRIPTION: The WAM:LAC command sets the WAMI global linear amplifier circuit number variable to the value provided as an argument. After execution of this command, all (in this embodiment of the WAMIL language) subsequent commands which require use of a linear amplifier circuit number, and all (in this embodiment of the WAMIL language) IF-construct commands which test the current script linear amplifier circuit number, will reference the new value.
Execution of this command also disables any (in this WAMIL language embodiment) association which exists between this WAMI global variable and any WAMI VAR variable.
OUTPUT: The following is an example of the output generated to the WAMIL report file, upon execution of a LAC command:
   Set Linear Amplifier Circuit To 1
ERRORS: None.
ALTERS: LAC
DEFAULT VALUE: LAC is set to 0 upon initial startup, and is of type integer. The WAM:INITIALIZE command also sets this variable to 0.
SEE ALSO: WAM:INITIALIZE
EXAMPLE: The following script lines set the WAMIL script LAC variable to 1 and then executes a TI command:
   WAM:CELL 49
   WAM:LAC 1
   TI:op:cell 49, lac 1

LAUNCH

The LAUNCH command can be embedded in the integration construct data structure according to the invention.
PURPOSE: Instructs the WAM Interpreter to launch the WAMIL script provided as argument.
SYNTAX: WAM:LAUNCH path wamil_script -switch . . .
EXAMPLE CALL: WAM:LAUNCH HOME jt1234 -msc 5 -cell 101
DESCRIPTION: The LAUNCH command instructs the WAM Interpreter to launch the WAMIL script, provided by the argument wamil script, located at path.
The launched WAMIL script will be executed independently from the launching script, and not alter any (in this WAMIL language embodiment) WAMI global variables or flags of such script The launched script will generate its own status display window, associated interface sessions, and WAMIL report file. The launching script will continue with execution of the next script line and not wait for the launched script to be completed.

The argument path can be any (in this WAMIL language embodiment) valid, complete UNIX pathname. The LAUNCH command allows supports WAM Interpreter path keywords which can be used for the path argument.
The -switch arguments can be any (in this WAMIL language embodiment) valid WAM Interpreter command line switch.
The -switch arguments can also include references to WAMI global variables, or WAMI VARn variables. To reference a WAMI global variable the suffix VAR is simply added to the WAMI global variable name. This is not to be mistaken with WAMI VAR variables. Although when referencing WAMI global variables within strings the names resemble WAMI VAR variables, this naming convention was chosen to allow references to WAMI global variables and still be able to print the variable name. To include the value of a WAMI VAR variable, a WAMI global variable can (in this embodiment of the WAMIL language) first be associated. Then references to the WAMI global variable will yield the value of the WAMI VAR variable it is associated with.
OUTPUT: The following is an example of the output generated to the WAMIL report file upon execution of a LAUNCH command:
   Launch Script jt1234
ERRORS: If an invalid path is provided as an argument, the WAM Interpreter will generate an error and the WAMIL script will not be launched.
If an invalid WAMIL script name is provided as an argument, the WAM Interpreter will generate an error and no WAMIL script will be launched.
ALTERS: None (in this WAMIL language embodiment).
DEFAULT VALUE: None (in this WAMIL language embodiment).
SEE ALSO: WAM:EXEC path wamil_script
EXAMPLE: The following script will launch a WAMIL script:
   WAM:MSC 5
   WAM:CELL 49
   WAM:BBA 4
   WAM:CONFIG 150
   WAM:LAUNCH SHARE jt1234
   WAM:CONNECT TI
   TI:cfr:cell 49, multi bba 4; config 150
   WAM:DISCONNECT TI
   WAM:ENDTEST

LC

The LC command can be embedded in the integration construct data structure according to the invention.
PURPOSE: Changes the WAMI global locate radio number variable, LC, to the value provided as an argument.
SYNTAX: WAM:LC value
EXAMPLE CALL: WAM:LC 1
DESCRIPTION: The WAM:LC command sets the WAMI global locate radio number variable to the value provided as an argument. After execution of this command, all (in this embodiment of the WAMIL language) subsequent commands which require use of a locate radio number, and all (in this embodiment of the WAMIL language) IF-construct commands which test the current script locate radio number, will reference the new value.
Execution of this command also disables any (in this WAMIL language embodiment) association which exists between this WAMI global variable and any WAMI VAR variable.

OUTPUT: The following is an example of the output generated to the WAMIL report file, upon execution of a LC command:

Set Locate Radio To 1
ERRORS: None.
ALTERS: LC
DEFAULT VALUE: LC is set to 0 upon initial startup, and is of type integer. The WAM:INITIALIZE command also sets this variable to 0.
SEE ALSO: WAM:INITIALIZE
EXAMPLE: The following script lines set the WAMIL script LC variable to 1 and then execute a TI command:

WAM:CELL 49
WAM:LC 1
TI:op:cell 49, lc 1

LMT

The LMT command can be embedded in the integration construct data structure according to the invention.
PURPOSE: Changes the WAMI global lightwave microcell transceiver number variable, LMT, to the value provided as an argument.
SYNTAX: WAM:LMT value
EXAMPLE CALL: WAM:LMT 1
DESCRIPTION: The WAM:LMT command sets the WAMI global lightwave microcell transceiver number variable to the value provided as an argument. After execution of this command, all (in this embodiment of the WAMIL language) subsequent commands which require use of a lightwave microcell transceiver number, and all (in this embodiment of the WAMIL language) IF-construct commands which test the current script lightwave microcell transceiver number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution of a LMT command:

Set Lightwave Microcell Transceiver To 1
ERRORS: None.
ALTERS: LMT
DEFAULT VALUE: LMT is set to 0 upon initial startup, and is of type integer. The WAM:INITIALIZE command also sets this variable to 0.
SEE ALSO: WAM:INITIALIZE
EXAMPLE: The following script lines set the WAMIL script LMT variable to 1 and then execute a TI command:

WAM:CELL 49
WAM:LMT 1
TI:op:cell 49, lmt 1

LOOPCELL

The LOOPCELL command can be embedded in the integration construct data structure according to the invention.
PURPOSE: Instructs the WAM Interpreter to execute the entire WAMIL script once per cell number provided in the command arguments.
SYNTAX: WAM:LOOPCELL cells . . .
EXAMPLE CALL: WAM:LOOPCELL 85 49 160
DESCRIPTION: The LOOPCELL command is a special function looping command. LOOPCELL instructs the WAM Interpreter to execute the entire WAMIL script once for each cell number listed in the argument cells, in effect creating a script looping effect. The first cell number given in the LOOPCELL command list becomes the default cell number for the script.

The list of cells provided as an argument can (in this embodiment of the WAMIL language) have the following format:

cell1 cell2 cell3 . . .

Where each cell number is separated by a blank space. The cell numbers will be executed in the order listed in the argument.

Upon execution of a script, the WAM Interpreter first loads the entire script and checks each command for syntax errors prior to initiating execution. At this point, detection of the LOOPCELL command causes the WAM Interpreter to automatically enable script looping. The WAM Interpreter also at this point determines how many times the script will be looped by counting the number of cells in the list.

For script syntax, when a LOOPCELL command is inserted the script CELL number shall be the first cell number in the list of cells provided.

The list of cells provided by the LOOPCELL command can only (in this embodiment of the WAMIL language) be altered by execution of the GETCELLS command. In such a case, the next cell number executed will depend on which loop the script execution is currently in.

If the list of cells provided is greater than one cell number, the WAM Interpreter will ignore all (in this embodiment of the WAMIL language) DISCONNECT commands, and the last script ENDTEST command, until the script has been executed for the last cell. In this manner all (in this embodiment of the WAMIL language) interface sessions will remain nailed up until the script has been looped the correct number of times, to avoid login failures during the execution of any cell. The THEN:ENDTEST command, and any (in this WAMIL language embodiment) embedded WAM:ENDTEST commands, will however not be ignored.

Execution of a WAM:CELL command within a script with LOOPCELL will cause the WAM Interpreter to stop looping the script.
SCRIPTOR: Upon insertion of this command, the Scriptor will remove all (in this embodiment of the WAMIL language) CELL commands, if any, from the script and any cell looping commands, and set the default cell number to the first cell number provided in the cells list. The Scriptor will then regenerate the script using the first cell number as the default cell number.

The Scriptor automatically places this command below any (in this WAMIL language embodiment) existing DISPLAY or MSCVAR command. If these commands do not exist, LOOPCELL with be placed at the top of the script.

If a CELLVAR or a LOOPCELLVARS command exists in the script, upon insertion of the LOOPCELL command they are automatically removed from the script.

A syntax error will occur if this command is placed after any (in this WAMIL language embodiment) CONNECT command.

If the LOOPCELL command is deleted from the script, the first cell number in the list takes precedence for the entire script. The Scriptor will then insert a CELL command in place of the LOOPCELL command. The argument for the CELL command will be the first cell number in the LOOPCELL cells list.

If the LOOPCELL command already exists in a script, insertion of any (in this WAMIL language embodiment) additional LOOPCELL commands causes the existing cell numbers to be replaced with the new list of cell numbers.

The Scriptor will only (in this embodiment of the WAMIL language) allow one LOOPCELL command to be inserted into a script.
OUTPUT: Execution of the LOOPCELL command generates the following output to the script WAMIL report file:
  Cell Loop: 1
  Start Test Cell: 49
ERRORS: If more than one LOOPCELL command is used in a WAMIL script, the cells list from the last LOOPCELL command will take precedence. Thus all (in this embodiment of the WAMIL language) preceding LOOPCELL commands have no effect.
If LOOPCELL is included in a script with the CELLVAR or LOOPCELLVARS command, unpredictable errors may result.
ALTERS: CELL
DEFAULT VALUE: None (in this WAMIL language embodiment).
SEE ALSO: WAM:CELL value, WAM:GETCELLS, WAM:LOOPCELLVARS
EXAMPLE: The following script will loop three times, once for each cell number provided
  WAM:LOOPCELL 85 49 160
  WAM:MSC 5
  WAM:CONNECT TI
  TI:op:cell 85
  WAM:DISCONNECT TI
  WAM:ENDTEST

LOOPCELLVARS

The LOOPCELLVARS command can be embedded in the integration construct data structure according to the invention.
PURPOSE: Instructs the WAM Interpreter to execute the entire WAMIL script once per cell number supplied to the script.
SYNTAX: WAM:LOOPCELLVARS
EXAMPLE CALL: WAM:LOOPCELLVARS
DESCRIPTION: The LOOPCELLVARS command is a special function looping command which instructs the WAM Interpreter that the list of cells for the script will be supplied as a command line argument. Upon detection of this command, the WAM Interpreter will search the command line arguments for the script cell numbers. The WAM Interpreter also at this point determines how many times the script will be looped by counting the number of cells in the list. The WAMIL script will then be executed once for each cell number passed as an argument, in effect creating a WAMIL script looping effect. The cell numbers will be executed in the order listed in the argument.
Since the first cell number given in the argument is undetermined prior to execution of a WAMIL script, the first cell number can (in this embodiment of the WAMIL language) be referenced as X. Thus for script syntax, when a LOOPCELLVARS command is used the CELL number within a script shall be referenced as X from that point forward.
NOTE:
For backwards compatibility CELLVAR can be referenced within TI and SDP interface commands as X. Thus a TI interface command would be written as TI:op:cell X instead of as follows, TI:op:cell CELLVAR
The list of cells can only (in this embodiment of the WAMIL language) be altered by execution of the GETCELLS command. In such a case, the next cell number executed will depend on which loop the script execution is currently in.

If the list of cells provided is greater than one cell number, the WAM Interpreter will ignore all (in this embodiment of the WAMIL language) DISCONNECT and ENDTEST commands, until the script has been executed for the last cell. In this manner all (in this embodiment of the WAMIL language) interface sessions will remain nailed up until the script has been looped the correct number of times, to avoid login failures during the execution of any cell.
Execution of a WAM:CELL command within a script with LOOPCELLVARS command will cause the WAM Interpreter to stop looping the script.
This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:LOOPCELLVARS command is encountered the WAMI GUI platform will prompt the user for the script cell numbers. Subsequent WAM:LOOPCELLVARS commands encountered will not cause additional prompting.
SCRIPTOR: Upon insertion of this command, the Scriptor will remove all (in this embodiment of the WAMIL language) CELL commands, if any, from the script and any cell looping commands, and set the default cell number to the value X. The Scriptor will then regenerate the script using the value X as the default cell number.
The Scriptor automatically places this command below any (in this WAMIL language embodiment) existing DISPLAY or MSCVAR command. If these commands do not exist, LOOPCELLVARS with be placed at the top of the script.
If a CELLVAR or a LOOPCELL command exists in the script, upon insertion of the LOOPCELLVARS command they are automatically removed from the script.
If the LOOPCELLVARS command is deleted from the script, the Scriptor will prompt the user for a cell number and then insert a WAM:CELL command in place of the LOOPCELLVARS command.
The Scriptor will only (in this embodiment of the WAMIL language) allow one LOOPCELLVARS command to be inserted into a script.
A syntax error will occur if this command is placed after any (in this WAMIL language embodiment) CONNECT command.
OUTPUT: Execution of the LOOPCELLVARS command generates the following output to the script WAMIL report file:
  Cell Loop: 1
  Start Test Cell: 49
ERRORS: Multiple LOOPCELLVARS commands in a script have no additional effects.
If LOOPCELLVARS is included in a script with the CELLVAR or LOOPCELL command, unpredictable errors may result.
ALTERS: CELL
DEFAULT VALUE: None (in this WAMIL language embodiment).
SEE ALSO: WAM:CELL value, WAM:GETCELLS, WAM:LOOPCELL cells . . .
EXAMPLE: The following script will loop once for each cell number supplied to the script:
  WAM:MSC 5
  WAM:LOOPCELLVARS
  WAM:CONNECT TI TI:op:cell X
WAM:DISCONNECT TI
WAM:ENDTEST
MATHVAR

MATHVAR

The MATHVAR command can be embedded in the integration construct data structure according to the invention.
PURPOSE: Causes the WAM Interpreter to perform simple mathematics, per the type of operator provided, on the WAMI VAR variable provided by the argument var_ variable.
SYNTAX: WAM:MATHVAR var_variable operator value
EXAMPLE CALL: WAM:MATHVAR CELLVAR +500
DESCRIPTION: The MATHVAR command instructs the WAMI to perform the mathematical operation, provided by the argument operator, on the VAR variable name given by the argument var_variable. The argument value can be any (in this WAMIL language embodiment) positive or negative integer value, or reference any (in this WAMIL language embodiment) existing WAMI VAR variable.

Valid operators are + for addition, − for subtraction, * for multiplication, and / for division.

After the execution of this command, all (in this embodiment of the WAMIL language) subsequent commands which require use of a var_variable number will reference the new value.
OUTPUT: The following is an example of the output generated to the WAMIL report file upon execution of a MATHVAR command:

CELLVAR is equal to 38+500

ERRORS: If the argument var_variable is an invalid VAR variable name an error will be generated and script execution will be aborted.

If an invalid operator is provided an error will be generated and script execution will be aborted.

If the argument value references an invalid VAR variable name an error will be generated and script execution will be aborted.

If the argument value is an invalid integer number an error will be generated and script execution will be aborted.
ALTERS: VAR variable provided by argument var_ variable.
DEFAULT VALUE: None (in this WAMIL language embodiment).
EXAMPLE: The following script performs an OP CELL on all the even numbered cells on an MSC:

WAM:MSCVAR
WAM:SET CELL CELLVAR
WAM:SETVAR CELLVAR 2
WAM:CONNECT TI
WHILE:TEST_EXPR CELLVAR LT 223
  TI:opcell CELLVAR
  WAM:MATHVAR CELLVAR +2
ENDWHILE:
WAM:DISCONNECT TI
WAM:ENDTEST

MICROCELL

The MICROCELL command can be embedded in the integration construct data structure according to the invention.
PURPOSE: Changes the WAMI global rcs number variable, MICROCELL, to the value provided as an argument.
SYNTAX: WAM:MICROCELL value
EXAMPLE CALL: WAM:MICROCELL 38
DESCRIPTION: The MICROCELL command sets the WAMI global rcs number variable to the value provided as an argument. After execution of this command, all (in this embodiment of the WAMIL language) subsequent commands which require use of a rcs number, and all (in this embodiment of the WAMIL language) IF-construct commands which test the current script rcs number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution of a MICROCELL command:

Set RCS To 38

ERRORS: None.
ALTERS: MICROCELL
DEFAULT VALUE: MICROCELL is set to 0 upon initial startup, and is of type integer. The WAM:INITIALIZE command also sets this variable to 0.
SEE ALSO: WAM:INITIALIZE

MSC

The MSC command can be embedded in the integration construct data structure according to the invention.
PURPOSE: Changes the WAM Interpreter global mobile switching center number variable, MSC, to the value provided as an argument.
SYNTAX: WAM:MSC value
EXAMPLE CALL: WAM:MSC 5
DESCRIPTION: The MSC command sets the WAMI global mobile switching center number variable to the value provided as an argument. After execution of this command, all (in this embodiment of the WAMIL language) subsequent commands which require use of the mobile switching center number, and all (in this embodiment of the WAMIL language) IF-construct commands which test the current script mobile switching center number, will reference the new value.

Execution of this command also disables any (in this WAMIL language embodiment) association which exists between this WAMI global variable and any WAMI VAR variable.
SCRIPTOR: If the last MSC command is deleted from the current script, the Scriptor will display an error message notifying the user that no MSC number has been defined for the script.

If an MSCVAR command is included in the script, the Scriptor will not add an MSC command to the script.
OUTPUT: The following is an example of the output generated to the WAMIL report file upon execution of an MSC command:

Test On MSC 5

ERRORS: None.
ALTERS: MSC
DEFAULT VALUE: MSC is set to 0 upon initial startup, and is of type integer. The WAM:INITIALIZE command also sets this variable to 0.
SEE ALSO: WAM:MSCVAR, WAM:INITIALIZE
EXAMPLE: The following script performs an OP CELL on two cells on different mobile switching centers:

WAM:MSC 5
WAM:CELL 49

WAM:CONNECT TI
TI:opcell 49
WAM:DISCONNECT TI
WAM:MSC 1
WAM:CELL 72
WAM:CONNECT TI
TI:opcell 72
WAM:DISCONNECT TI
WAM:ENDTEST

MSCVAR

The MSCVAR command can be embedded in the integration construct data structure according to the invention.
PURPOSE: Declares to the WAM Interpreter, that a value for the WAMI VAR variable MSCVAR will be supplied to the script.
SYNTAX: WAM:MSCVAR
EXAMPLE CALL: WAM:MSCVAR
DESCRIPTION: The WAM:MSCVAR command is a WAMIL declaration command which executes an assignment function. Upon detection of this command, the WAM Interpreter will search the command line arguments for a value to assign to the WAMI VAR variable MSCVAR.

Like standard WAMI VAR variable declaration commands, the execution of this command also enables an association with the WAMI global MSC variable. Therefore, until the WAMI global MSC variable association is transferred to another WAMI VAR variable, or disabled, all references to the WAMI global MSC variable will use the MSCVAR variable value.

For script syntax, until an actual MSC number is passed as an argument, when a MSCVAR command is used the MSC number within a script shall be referenced as MSCVAR from that point forward.
NOTE: For backwards compatibility MSCVAR can be referenced as Y.

This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:MSCVAR is encountered the WAMI GUI platform will prompt the user for the script MSCVAR value. Subsequent WAM:MSCVAR commands encountered will not cause additional prompting.
SCRIPTOR: If a MSCVAR command is deleted from the current script, the Scriptor will prompt the user for an MSC number and then insert a WAM:MSC value command in place of the MSCVAR command deleted.

Upon insertion of this command, the Scriptor will remove all (in this embodiment of the WAMIL language) MSC commands, if any, from the script land any cell looping commands, and set the default msc number to the value MSCVAR.

The Scriptor automatically places this command below any (in this WAMIL language embodiment) existing WAM:DISPLAY command.

The Scriptor will only (in this embodiment of the WAMIL language) allow one MSCVAR command to be inserted into the current script.
OUTPUT: The following is an example of the output generated to the WAMIL report file upon execution of a MSCVAR command, when msc 5 is passed as an argument:
Set MSC To Argument Value of 5
Start On MSC 5

ERRORS: If no command line value has been provided, the WAM Interpreter will generate an error and script execution will be aborted.
ALTERS: MSCVAR
DEFAULT VALUE: MSCVAR is set to an unknown state upon initial startup, and is of type integer. The WAM:INITIALIZE command does not reset this WAMI VAR variable.
SEE ALSO: WAM:MSC value
EXAMPLE: The following executes a TI command on the msc number supplied:
WAM:MSCVAR
WAM:CELL 49
WAM:CONNECT TI
TI:op:cell 49
WAM:DISCONNECT TI
WAM:ENDTEST

OC

The OC command can be embedded in the integration construct data structure according to the invention.
PURPOSE: Changes the WAMI global overhead channel number variable, OC, to the value provided as an argument.
SYNTAX: WAM:OC value
EXAMPLE CALL: WAM:OC 1
DESCRIPTION: The WAM:OC command sets the WAMI global overhead channel number variable to the value provided as an argument. After execution of this command, all (in this embodiment of the WAMIL language) subsequent commands which require use of a overhead channel number, and all (in this embodiment of the WAMIL language) IF-construct commands which test the current script overhead channel number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution of a OC command:
Set Overhead Channel To 1
ERRORS: None.
ALTERS: OC
DEFAULT VALUE: OC is set to 0 upon initial startup, and is of type integer. The WAM:INITIALIZE command also sets this variable to 0.
SEE ALSO: WAM:INITIALIZE
EXAMPLE: The following script lines set the WAMIL script OC variable to 1 and then execute a TI command:
WAM:CELL 49
WAM:OC 1
TI:exc:cell 49, ft oc 1

OPEN

The OPEN command can be embedded in the integration construct data structure according to the invention.
PURPOSE: Instructs the WAM Interpreter to open a file to which OutBuff will be saved.
SYNTAX: WAM:OPEN filename
EXAMPLE CALL: WAM:OPEN BuffStore
DESCRIPTION: The OPEN command opens a file, provided by the filename argument, to which OutBuff will continually be appended to until the file is closed with the CLOSE command. If the filename already exists upon initial opening it is overwritten. The file specified by filename is created in the scripts current output directory.

OutBuff will still continue to be printed in the script WAMIL report file, along with other data, in addition to the filename provided by this command.

A maximum of only (in this embodiment of the WAMIL language) six OutBuff redirection files can exist at one time within a script.

The execution of subsequent OPEN commands using the same filename, prior to the execution of a CLOSE command for such filename, causes the file to be closed, overwritten and then re-opened.

OUTPUT: The following is an example of the output generated to the script WAMIL report file upon execution of an OPEN command:

Open the WAMI OutBuff Redirection File: BuffStore
ERRORS: If an error is encountered in execution of the OPEN command, the error message will be output to the WAMIL report file.

If more than six OutBuff redirection files are opened in a script, the WAM Interpreter will generate an error.
ALTERS: None (in this WAMIL language embodiment).
DEFAULT VALUE: None (in this WAMIL language embodiment).
SEE ALSO: WAM:CLOSE filename
EXAMPLE: The following script lines will open an OutBuff Redirection file and save the output of a TI command prior to closing the file:

WAM:OPEN buffstore

TI:opcell 49, ccc 1, ccu 1

WAM:OUTPUT buffstore

WAM:CLOSE buffstore

OUTPUT

The OUTPUT command can be embedded in the integration construct data structure according to the invention.
PURPOSE: Instructs the WAM Interpreter to append OutBuff to the file specified.
SYNTAX: WAM:OUTPUT filename
EXAMPLE CALL: WAM:OUTPUT BuffStore
DESCRIPTION: Upon execution of the OUTPUT command the contents of the WAM Interpreter OutBuff will be appended to the filename specified. The file can (in this embodiment of the WAMIL language) have been previously opened using the OPEN command.
OUTPUT: Execution of the OUTPUT command generates no output messages to the script WAMIL report file.
ERRORS: If an error is encountered in execution of the OUTPUT command, the error message will be output to the script WAMIL report file.

If OUTPUT is executed for a filename which has not been previously opened, or has been closed, or does not exist, the WAM Interpreter will generate an error.
ALTERS: None (in this WAMIL language embodiment)
DEFAULT VALUE: None (in this WAMIL language embodiment).
SEE ALSO: WAM:CLOSE filename, WAM:OPEN filename
EXAMPLE: The following script lines will open an OutBuff Redirection file and save the output of a TI command prior to closing the file:

WAM:OPEN buffstore

TI:opcell 49, ccc 1, ccu 1

WAM:OUTPUT buffstore

WAM:CLOSE buffstore

OUTPUTOFF

The OUTPUTOFF command can be embedded in the integration construct data structure according to the invention.
PURPOSE: Causes the WAM Interpreter to not generate any output messages to the script WAMIL report file for all (in this embodiment of the WAMIL language) general WAM Interpreter commands executed within the script.
SYNTAX: WAM:OUTPUTOFF
EXAMPLE CALL: WAM:OUTPUTOFF
DESCRIPTION: The OUTPUTOFF command provides a means of disabling WAM Interpreter command output messages. Almost all (in this embodiment of the WAMIL language) WAM Interpreter commands generate output messages to the script output file. Execution of the OUTPUTOFF command will disable the generation of these output messages. The only (in this embodiment of the WAMIL language) remaining messages in the script output file will then be those generated by special function WAM Interpreter commands, and messages returned from interface commands.

Below is a list of WAM Interpreter (WAMI) commands whose output messages are not disabled by execution of the OUTPUTOFF command:

| WAMI COMMAND |
| --- |
| DATE |
| ENDTEST |
| GETCELLS |
| GETROP |
| GETSDP |
| PRINT |
| TIME |

OUTPUT: Execution of the OUTPUTOFF command generates no output.
ERRORS: None.
ALTERS: None (in this WAMIL language embodiment).
DEFAULT VALUE: None (in this WAMIL language embodiment).
SEE ALSO: WAM:OUTPUTON

OUTPUTON

The OUTPUTON command can be embedded in the integration construct data structure according to the invention.
PURPOSE: Causes the WAM Interpreter to generate all (in this embodiment of the WAMIL language) output messages to the script WAMIL report file for all (in this embodiment of the WAMIL language) WAM Interpreter commands executed within the script.
SYNTAX: WAM:OUTPUTON
EXAMPLE CALL: WAM:OUTPUTON
DESCRIPTION: The OUTPUTON command enables WAM Interpreter command output messages. Almost all (in this embodiment of the WAMIL language) WAM Interpreter commands generate output messages to the script output file. Execution of the OUTPUTON command will enable the generation of these output messages.

WAM Interpreter output messages are enabled as default, upon the start of script execution. To disable these output messages the OUTPUTOFF display command can (in this embodiment of the WAMIL language) be executed.
OUTPUT: Execution of the OUTPUTON command generates no output.

ERRORS: None.
ALTERS: None (in this WAMIL language embodiment).
DEFAULT VALUE: None (in this WAMIL language embodiment).
SEE ALSO: WAM:OUTPUTOFF

PAUSE

The PAUSE command can be embedded in the integration construct data structure according to the invention.
PURPOSE: Instructs the WAM Interpreter to stop execution of the WAMIL script and prompt the user for continuation or termination.
SYNTAX: WAM:PAUSE string
EXAMPLE CALL: WAM:PAUSE Go Pull Board
DESCRIPTION: The PAUSE command instructs the WAM Interpreter to stop execution of the WAMIL script and display a message to the user. The message displayed is provided by the argument string, and is displayed in a WAMI PAUSE window which allows the user to either continue with execution of the WAMIL script, or abort the script. As many PAUSE commands as desired can be included in a WAMIL script.

To abort the WAMIL script execution, the user simply selects the "ABORT" command button displayed in the WAMI PAUSE window. To continue execution of the WAMIL script, the user simply selects the "CONTINUE" command button displayed in the WAMI PAUSE window.

If the user aborts the script, the script will be terminated and the WAMI Status Display window will show the status "Aborted". The WAMI Status Display window, will however, not be destroyed.
OUTPUT: The following is an example of the output generated to the WAMIL report file upon execution of a PAUSE command with the string "Go Pull Board" provided as an argument:

Manual Pause: Go Pull Board

If a user selects the ABORT command button, the following message will be printed in the WAMIL report file:

SCRIPT ABORTED!

WAMI WINDOW: Below is an example of a WAMI PAUSE window generated upon execution of a PAUSE command with the string "Go Pull Board" provided as an argument:
ERRORS: None.
ALTERS: None (in this WAMIL language embodiment).
DEFAULT VALUE: None (in this WAMIL language embodiment).
EXAMPLE: The following script prompts the user for continuation:

WAM:MSC 5
WAM:CELL 49
WAM:PAUSE IF CELL IS DOWN ABORT SCRIPT!!!
WAM:CONNECT TI
TI:op:cell, generic
WAM:DISCONNECT TI
WAM:ENDTEST

PH

The PH command can be embedded in the integration construct data structure according to the invention.
PURPOSE: Changes the WAMI global phase number variable, PH, to the value provided as an argument.
SYNTAX: WAM:PH value
EXAMPLE CALL: WAM:PH 5
DESCRIPTION: The PH command sets the WAMI global phase number variable to the value provided as an argument. After execution of this command, all (in this embodiment of the WAMIL language) subsequent commands which require use of a phase number, and all (in this embodiment of the WAMIL language) IF-construct commands which test the current script phase number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution of a PH command:

Set Phase Number To 1

ERRORS: None.
ALTERS: PH
DEFAULT VALUE: PH is set to 0 upon initial startup, and is of type string. The WAM:INITIALIZE command also sets this variable to 0.
SEE ALSO: WAM:INITIALIZE
EXAMPLE: The following script lines set the WAMIL script PH variable to 16 and then execute a TI command:

WAM:CELL 49
WAM:CSC 1
WAM:RPT 3
WAM:PH 16
TI:dgn:cell 49, csc 1; rpt 3, raw, uc1: ph 16

PL

The PL command can be embedded in the integration construct data structure according to the invention.
PURPOSE: Changes the WAMI global pilot level number variable, PL, to the value provided as an argument.
SYNTAX: WAM:PL value
EXAMPLE CALL: WAM:PL 6
DESCRIPTION: The PL command sets the WAMI global pilot level number variable to the value provided as an argument. After execution of this command, all (in this embodiment of the WAMIL language) subsequent commands which require use of a pilot level number, and all (in this embodiment of the WAMIL language) IF-construct commands which test the current script pilot level number, will reference the new value.

Execution of this command also disables any (in this WAMIL language embodiment) association which exists between this WAMI global variable and any WAMI VAR variable.
OUTPUT: The following is an example of the output generated to the WAMIL report file, upon execution of a PL command:

Set Pilot Level To 1

ERRORS: None.
ALTERS: PL
DEFAULT VALUE: PL is set to 0 upon initial startup, and is of type integer. The WAM:INITIALIZE command also sets this variable to 0.
SEE ALSO: WAM:INITIALIZE
EXAMPLE: The following script lines will change the WAMIL script PH variable to 6 and then execute a TI command:

WAM:CELL 49
WAM:PL 6
TI:exc:cell 49, ft pl 6

PRINT

The PRINT command can be embedded in the integration construct data structure according to the invention.
PURPOSE: Instructs the WAM Interpreter to print the string provided in the script WAMIL report file.
SYNTAX: WAM:PRINT string
EXAMPLE CALL: WAM:PRINT This is test case jt1234
DESCRIPTION: The PRINT command prints the string provided as an argument in the script WAMIL report file.

The string provided can include references to WAMI global variables, or WAMI VARn variables. To reference a WAMI global variable the suffix VAR is simply added to the WAMI global variable name. For example, the following string, CCC CCCVAR is OOS, will be interpreted and printed as follows for a WAMI global CCC variable with a value of 4:

CCC 4 is OOS

This is not to be mistaken with WAMI VAR variables. Although when referencing WAMI global variables within strings to be printed the names resemble WAMI VAR variables, this naming convention was chosen to allow references to WAMI global variables and still be able to print the variable name. In the above example the WAMI global name CCC was printed along with the value of the WAMI global variable. To print the value of a WAMI VAR variable, a WAMI global variable can (in this embodiment of the WAMIL language) first be associated. Then references to the WAMI global variable will yield the value of the WAMI VAR variable it is associated with.
OUTPUT: The string provided is printed in the script WAMIL report file as given. Variable substitution is performed if WAMI global variables are referenced within the string provided.

The following is an example of the output generated to the WAMIL report file upon execution of a PRINT command which includes reference to a WAMI global variable:

This test Is For Antenna Face 1.
ERRORS: None.
ALTERS: None (in this WAMIL language embodiment).
DEFAULT VALUE: None (in this WAMIL language embodiment).
EXAMPLE: The following script lines print the antenna face and cell number to the script WAMIL report file:

WAM:CELL 49
WAM:ANT 1
WAM:PRINT Test Antenna Face ANTVAR, on Cell CELLVAR.

PUTAPX

The PUTAPX command can be embedded in the integration construct data structure according to the invention.
PURPOSE: Instructs the WAM Interpreter to replace the APXRCV DB form, provided as an argument, with the DB filename provided.
SYNTAX: WAM:PUTAPX db_form_name db_file_name
EXAMPLE CALL: WAM:PUTAPX fci FCIBACKUP
DESCRIPTION: The PUTAPX command is a special WAMI functional command which instructs the WAM Interpreter to replace the APXRCV DB form, provided by the argument db_form_name, with the db_file_name located in the current script output directory.

The current script output directory is set through the WAMI GUI platform via the user configuration options, or by command line execution of the WAM Interpreter with the -rpt switch, and defaults to Scripts.dir if no sub-directory is specified.

The DB form filename is automatically assumed the extension .dbf The APXRCV DB form replaced will depend on the current values of the WAMI global variables prior to execution of the PUTAPX command. For example, if the WAMI global variable CELL is set to 49, and SG is set to 1, and ANT is set to 1, and the following command is executed:

WAM:PUTAPX fci FCIBACKUP

The fci translation DB form for cell 49, server group 1, antenna face 1 will be replaced by the filename FCIBACKUP located in the current script output directory.
DB FORMS: For a list of APXRCV DB forms supported by this command refer to the GETAPX command.
OUTPUT: The following is an example of the output generated to the WAMIL report file upon execution of a PUTAPX command:

Replace APXRCV DB Form fci With DB File FCI-BACKUP
ERRORS: If during the initial login attempt the connection attempt fails due to lack of system response, the WAM Interpreter LFAIL flag will be set. The WAM Interpreter will then, for example, generate the following output to the WAMIL report file:

WAMI OMP 5 Timeout. Login Attempt Failed!

A user can test the LFAIL flag within a WAMIL script to check if a login attempt was successful prior to the execution of any (in this WAMIL language embodiment) subsequent WAMIL commands.

If during the initial login attempt the connection once established is lost, the WAM Interpreter CFAIL flag will be set. The WAM Interpreter will then, for example, generate the following output to the WAMIL report file:

WAMI OMP 5 Connection Lost!

A user can test the CFAIL flag within a WAMIL script to check if a connection was lost prior to the execution of any (in this WAMIL language embodiment) subsequent WAMIL commands.

Once a connection is established, if during the APXRCV session the connection is lost, the WAM Interpreter will set the CFAIL flag also. The WAM Interpreter will then, for example, generate the following output to the WAMIL report file:

WAMI APXRCV Session Connection Lost!

If the connection times out at any (in this WAMIL language embodiment) point during the update of data to the APXRCV, meaning no response is received from the APXRCV within the time specified by the WAMI global TimeOut variable, the WAM Interpreter TFAIL flag will be set. The WAM Interpreter will then, for example, generate the following output to the WAMIL report file:

WAMI APXRCV Timeout!

A user can test the TFAIL flag within a WAMIL script to check if the data update did not time out prior to the execution of any (in this WAMIL language embodiment) subsequent WAMIL commands.

If an invalid, or not supported, DB form is provided as an argument, the WAM Interpreter will generate an error.

If an error occurs in replacing the APXRCV DB form file, the WAM Interpreter will generate an error and the form will not be replaced.

During execution of the PUTAPX command, all (in this embodiment of the WAMIL language) APXRCV errors and messages will be printed to the WAMIL report file.
ALTERS: None (in this WAMIL language embodiment).
DEFAULT VALUE: None (in this WAMIL language embodiment).

SEE ALSO: WAM:GETAPX db_form_name db_file_name, WAM:PUTAPXFLD db_form_name db_field_name EXAMPLE: The following script will replace the fci DB form for all antenna faces for cell 49, server group 1:

WAM:MSC 5
   WAM:CELL 49
   WAM:SG 1
   WAM:ANT 1
   WAM:PUTAPX fci FCIBACKUP1
   WAM:ANT 2
   WAM:PUTAPX fci FCIBACKUP2
   WAM:ANT 3
   WAM:PUTAPX fci FCIBACKUP3
   WAM:ENDTEST

PUTAPXFLD

The PUTAPXFLD command can be embedded in the integration construct data structure according to the invention.

PURPOSE: Instructs the WAM Interpreter to replace the APXRCV DB form field name, provided as an argument, with the current value of the WAMI VAR variable APXVAR.

SYNTAX: WAM:PUTAPXFLD db_form_name db_field_name

EXAMPLE CALL: WAM:PUTAPXFLD ceqsu2 rmi_thresh

DESCRIPTION: The PUTAPXFLD command instructs the WAM Interpreter to replace the APXRCV DB form field name, provided by the argument db_field_name, located in the DB form db_form_name, with the current value of the WAMI VAR variable APXVAR.

The APXRCV DB form field replaced will depend on the current value of the WAMI global variables prior to execution of the PUTAPXFLD command. For example, if the WAMI global variable CELL is set to 49, and ANT is set to 1, and the following command is executed:

WAM:PUTAPXFLD ceqsu2 rmi_thresh

The ceqsu2 DB form rmi_thresh field value, for cell 49, antenna face 1, will be replaced with the current value of the WAMI VAR variable APXVAR.

DB FORMS: For a list of APXRCV DB forms supported by this command, refer to the GETAPX command.

OUTPUT: The PUTAPXFLD command automatically executes a PUTAPX command. Therefore the initial output generated by this command is the same as execution of the PUTAPX command. Once the DB form field has been replaced, the output generated upon completion of this process will then be the following:

Replaced APXRCV DB Form cell2 Field rmi_thresh With Value 0

ERRORS: See PUTAPX command.

If APXVAR is set to INVALID, ERROR, or NULL upon execution of the PUTAPXFLD command, the field value will not be replaced, and the WAM Interpreter will generate an error.

If an error occurs in replacing the APXRCV DB form field value, the WAM Interpreter will generate an error and the field will not be replaced.

During execution of the PUTAPXFLD command, all (in this embodiment of the WAMIL language) APXRCV errors and messages will be printed to the WAMIL report file.

ALTERS: APXVAR.

DEFAULT VALUE: APXVAR is set to NULL upon initial startup, unless altered by execution of the GETAPXFLD command, and is of type string. The WAM:INITIALIZE command does not alter this variable.

SEE ALSO: WAM:GETAPXFLD db_form_name db_field_name, WAM:PUTAPX db_form_name db_file_name EXAMPLE: The following script will replace a field value in an APXRCV DB form, only if the value is not set to zero:

WAM:MSC 5
   WAM:CELL 49
   WAM:ANT 1
   WAM:GETAPXFLD ceqsu2 rmi_thresh
   IF:APXVAR NE 0
   THENDO:
     WAM:SETVAR APXVAR 0
     WAM:PUTAPXFLD ceqsu2 rmi_thresh
   ELSEDO:
   ENDIF:
   WAM:ENDTEST

PUTS

The PUTS command can be embedded in the integration construct data structure according to the invention.

PURPOSE: Instructs the WAM Interpreter to append the string provided to the filename located at path.

SYNTAX: WAM:PUTS path filename string

EXAMPLE CALL: WAM:PUTS HOME TestsResults jt1234 FAIL

DESCRIPTION: The PUTS command instructs the WAM Interpreter to append the string provided to the filename located at path.

The argument path can be any (in this WAMIL language embodiment) valid, complete UNIX pathname. The PUTS command allows the WAM Interpreter path keywords to be used for the path argument. When the SHARE or CERT path keywords are used, the file location will default to the wam.results sub-directory.

If the file does not exist upon execution of the PUTS command it is created. If the file already exists the string given is appended to the end of the file.

The PUTS command filename and string arguments can also include references to WAMI global variables, or WAMI VARn variables. To reference a WAMI global variable the suffix VAR is simply added to the WAMI global variable name. For example, the following string, CCC CCCVAR is OOS, will be interpreted and printed as follows for a WAMI global CCC variable with a value of 4:

CCC 4 is OOS

This is not to be mistaken with WAMI VAR variables. Although when referencing WAMI global variables within strings to be printed the names resemble WAMI VAR variables, this naming convention was chosen to allow references to WAMI global variables and still be able to print the variable name. In the above example the WAMI global name CCC was printed along with the value of the WAMI global variable. To print the value of a WAMI VAR variable, a WAMI global variable can (in this embodiment of the WAMIL language) first be associated. Then references to the WAMI global variable will yield the value of the WAMI VAR variable it is associated with.

The PUTS command also supports WAM Interpreter print keywords which if included in the string argument will be substituted with the corresponding character or information.

If the keyword STDOUT is used as the path argument, the WAM Interpreter will print the remaining arguments as a string to standard output.

OUTPUT: The string provided is printed in the filename given. Variable substitution is performed if WAMI global variables or keywords are referenced within the string provided.
ERRORS: If any (in this WAMIL language embodiment) errors occur in opening the filename specified, such errors will be printed in the WAMIL report file.
ALTERS: None (in this WAMIL language embodiment).
DEFAULT VALUE: None (in this WAMIL language embodiment).
SEE ALSO: WAM:PRINT string
EXAMPLE: The following script generates a DB file which is then used to change a specific cell neighbor list up to Six neighbors cells total:
   WAM:MSCVAR
   WAM:CELLVAR
   WAM:WAMLIST Enter Up To Six Cells For Neighbor List
   WAM:PUTS HOME SIXNEIGH.dbf cdmanbr_list1.ncs_c[1]=WAMVAR1
   WAM:PUTS HOME SIXNEIGH.dbf cdmanbr_list1.ncs_c[2]=WAMVAR2
   WAM:PUTS HOME SIXNEIGH.dbf cdmanbr_list1.ncs_c[3]=WAMVAR3
   WAM:PUTS HOME SIXNEIGH.dbf cdmanbr_list1.ncs_c[4]=WAMVAR4
   WAM:PUTS HOME SIXNEIGH.dbf cdmanbr_list1.ncs_c[5]=WAMVAR5
   WAM:PUTS HOME SIXNEIGH.dbf cdmanbr_list1.ncs_c[6]=WAMVAR6
   WAM:PUTS HOME SIXNEIGH.dbf cdmanbr_list1.ncs_c[7]=WAMVAR7
   WAM:PUTS HOME SIXNEIGH.dbf cdmanbr_list1.ncs_c[8]=WAMVAR8
   WAM:PUTS HOME SIXNEIGH.dbf cdmanbr_list1.ncs_c[9]=WAMVAR9
   WAM:PUTS HOME SIXNEIGH.dbf cdmanbr_list1.ncs_c[10]=WAMVAR10
   WAM:PUTS HOME SLXNEIGH.dbf cdmanbr_list1.ncs_c[11]=WAMVAR11
   WAM:PUTS HOME SIXNEIGH.dbf cdmanbr_list1.ncs_c[12]=WAMVAR12
   WAM:PUTAPX fci SIXNEIGH
   WAM:ENDTEST

RA

The RA command can be embedded in the integration construct data structure according to the invention.
PURPOSE: Changes the WAMI global radio number variable, RA, to the value provided as an argument.
SYNTAX: WAM:RA value
EXAMPLE CALL: WAM:RA 39
DESCRIPTION: The RA command sets the WAMI global radio number variable to the value provided as an argument. After execution of this command, all (in this embodiment of the WAMIL language) subsequent commands which require use of a radio number, and all (in this embodiment of the WAMIL language) IF-construct commands which test the current script radio number, will reference the new value.
Execution of this command also disables any (in this WAMIL language embodiment) association which exists between this WAMI global variable and any WAMI VAR variable.

OUTPUT: The following is an example of the output generated to the WAMIL report file, upon execution of a RA command:
   Set Cell Radio To 1
ERRORS: None.
ALTERS: RA
DEFAULT VALUE: RA is set to 0 upon initial startup, and is of type integer. The WAM:INITIALIZE command also sets this variable to 0.
SEE ALSO: WAM:INITIALIZE
EXAMPLE: The following script lines set the WAMIL script RA variable to 39 and then execute a TI command:
   WAM:CELL 49
   WAM:RA 39
   TI:op:cell 49, ra 39

RALIST

The RALIST command can be embedded in the integration construct data structure according to the invention.
PURPOSE: Declares to the WAM Interpreter, that a list of WAMI VARn RA numbers will be supplied to the script.
SYNTAX: WAM:RALIST value
EXAMPLE CALL: WAM:RALIST 3
DESCRIPTION: The RALIST command is a WAMIL declaration command which instructs the WAM Interpreter that a list of RA numbers will be supplied to the script. This command executes the assignment of the RA numbers provided to the WAMI VARn RA List.

Upon detection of this command, the WAM Interpreter will search the command line arguments for the RA numbers. The total number of RAs to assign is determined by the value argument of the command. This value declares to the WAM Interpreter the exact size of the RA List. The RA numbers within the RA List can then be referenced within the script as WAMI VARn variables, according to their index position in the list. For example, RAVAR2 refers to the second RA number in the RA List. The order of the RA numbers provided determine the order of their placement within the RA List.

Up to 200 RA numbers can be passed as an argument with this command. Therefore, the maximum acceptable size for the RA List is 200. If a value larger than 200 is used the WAM Interpreter will generate an error and script execution will be aborted.

This command has a dual function and will initiate prompting by the WAMI GUI platform if the script is executed via the platform. For WAMI GUI platform information refer to the WAMI GUI PLATFORM section below.
WAMI GUI PLATFORM: Prior to execution of a WAMIL script, the WAMI GUI platform searches the script for special commands. If a WAM:RALIST command is encountered the WAMI GUI platform will prompt the user for the quantity of RA numbers defined by the command argument value. Subsequent WAM:RALIST commands encountered will not cause additional prompting.
SCRIPTOR: If this command is deleted from the current script, the WAMIL Scriptor will delete all (in this embodiment of the WAMIL language) reference RAVARn commands existing in the script also. The script WAMI global RA variable will then be set to the default value of 0.

The Scriptor will only (in this embodiment of the WAMIL language) allow insertion of one RALIST command into the current script.
OUTPUT: The following is an example of the output generated to the WAMIL report file upon execution of a RALIST command:

Total Number of RA List Values Set To 4

RA List Values: 2 4 6 8

ERRORS: If a value larger than 200 is used the WAM Interpreter will generate an error and script execution will be aborted.

Any references within a script to a WAMI VARn variable prior to the declaration of the list will generate a syntax error.

If more than one RALIST command is used in a WAMIL script, only (in this embodiment of the WAMIL language) the first list declaration is used, and therefore takes precedence. Thus subsequent RALIST commands have no effect.

ALTERS: WAMI VARn RA List.

DEFAULT VALUE: The WAMI VARn RA List variable is set to an unknown state upon initial startup, and is of type integer. The WAM:INITIALIZE command does not reset this list.

SEE ALSO: WAM:RAVARn, WAM:INITIALIZE

EXAMPLE: The following script sets the WAMI VARn RA List length to 2, and executes a TI command for each RA number in the list:

WAM:MSC 5
WAM:CELL 49
WAM:RALIST 2
WAM:CONNECT TI
WAM:RAVAR1
TI:op:cell 49, ra RAVAR1
WAM:RAVAR2
TI:op:cell 49, ra RAVAR2
WAM:DISCONNECT TI
WAM:ENDTEST

RAVAR

The RAVAR command can be embedded in the integration construct data structure according to the invention.

PURPOSE: Declares to the WAM Interpreter, that a value for the WAMI VAR variable RAVAR will be supplied to the script.

SYNTAX: WAM:RAVAR

EXAMPLE CALL: WAM:RAVAR

DESCRIPTION: The WAM:RAVAR command is a WAMIL declaration command which executes an assignment function. Upon detection of this command, the WAM Interpreter will search the command line arguments for a value to assign to the WAMI VAR variable RAVAR.

Like standard WAMI VAR variable declaration commands, the execution of this command also enables an association with the WAMI global RA variable. Therefore, until the WAMI global RA variable association is transferred to another WAMI VAR variable, or disabled, all (in this embodiment of the WAMIL language) references to the WAMI global RA variable will use the RAVAR variable value.

For script syntax, until an actual RA number is passed as an argument, when a RAVAR command is used the RA number within a script shall be referenced as RAVAR from that point forward.

This command has a dual function and will initiate prompting by the WAMI GUI platform if the script is executed via the platform. For WAMI GUI platform information refer to the WAMI GUI PLATFORM section below.

WAMI GUI PLATFORM: Prior to execution of a WAMIL script, the WAMI GUI platform searches the script for special commands. If a WAM:RAVAR is encountered the WAMI GUI platform will prompt the user for the script RAVAR value. Subsequent WAM:RAVAR commands encountered will not cause additional prompting.

SCRIPTOR: If a RAVAR command is deleted from the current script, the Scriptor will prompt the user for a RA number and then insert a WAM:RA value command in place of the RAVAR command deleted.

OUTPUT: The following is an example of the output generated to the WAMIL report file, upon execution a RAVAR command:

Set RA To Argument Value of 8

ERRORS: If no command line value has been provided, the WAM Interpreter will generate an error and script execution will be aborted.

ALTERS: RAVAR

DEFAULT VALUE: RAVAR is set to an unknown state upon initial startup, and is of type integer. The WAM:INITIALIZE command does not reset this WAMI VAR variable.

SEE ALSO: WAM:RA value

EXAMPLE: The following script executes a TI command for the RA number supplied:

WAM:MSC 5
WAM:CELL 49
WAM:RAVAR
WAM:CONNECT TI
TI:op:cell 49, ra RAVAR
WAM:DISCONNECT TI
WAM:ENDTEST

RAVARn

The RAVARn command can be embedded in the integration construct data structure according to the invention.

PURPOSE: Instructs the WAM Interpreter to set the WAMI global RA variable to the value of the referenced WAMI VARn RA variable, in position n, of the RA List passed as an argument.

SYNTAX: WAM:RAVARn

EXAMPLE CALL: WAM:RAVAR2

DESCRIPTION: The WAM:RAVARn command is an assignment command. This command can only (in this embodiment of the WAMIL language) be executed if a RA List has been declared in the script. Upon execution, this command assigns a RA List variable value to the WAMI global RA variable.

The value n, can (in this embodiment of the WAMIL language) be a valid index into the RA List. Any RA List value can be assigned to the WAMI global RA variable by execution of this command, where n is the RA value location within the RA List. Upon execution, the RA number within a script is referenced as RAVARn from that point forward.

Like standard WAMI VARn variable assignment commands, the execution of this command also enables an association with the WAMI global RA variable. Therefore, until the WAMI global RA variable association is transferred to a WAMI VAR variable, or disabled, all (in this embodiment of the WAMIL language) references to the WAMI global RA variable will use the RAVARn variable value.

For script syntax, until actual RA List values are passed as an argument, when a RAVARn command is used the RA number within a script shall be referenced as RAVARn from that point forward.

OUTPUT: The following is an example of the output generated to the WAMIL report file upon execution of a RAVARn command, when a RA List of 3 was previously declared, and the RA List numbers passed as an argument are 2 4 6:

Set RA To RAVAR2 Value Of 4

SCRIPTOR: If a RAVARn command is deleted from the current script, the Scriptor will prompt the user for a RA number and then insert a WAM:RA value command in place of the RAVARn command deleted.
ERRORS: An invalid RAVARn command used within a script, where n refers to a RA List index outside the list range, will generate an error. Script execution will then be aborted.

If a RAVARn command is used within a script in which no RA List has been declared, the WAM Interpreter will generate an error and terminate execution of the script.
ALTERS: RA
DEFAULT VALUE: None (in this WAMIL language embodiment).
SEE ALSO: WAM:RA value, WAM:RALIST value
EXAMPLE: The following script sets the WAMI VARn RA List length to 2, and executes a TI command for each RA number in the list:
WAM:MSC 5
WAM:CELL 49
WAM:RALIST 2
WAM:CONNECT TI
WAM:RAVAR1
TI:op:cell 49, ra RAVAR1
WAM:RAVAR2
TI:op:cell 49, ra RAVAR2
WAM:DISCONNECT TI
WAM:ENDTEST

REPORT

The REPORT command can be embedded in the integration construct data structure according to the invention.
PURPOSE: Instructs the WAM Interpreter to name the script WAMIL report file as the string provided as an argument.
SYNTAX: WAM:REPORT string
EXAMPLE CALL: WAM:REPORT jt1234
DESCRIPTION: The REPORT command provides the WAM Interpreter with the script WAMIL report file name. If no REPORT command exists within a script, the script output report name will default to the script name with a .rpt extension. For example, a WAMIL script called jt1234.wamil, will generate a report file called jt1234.rpt, unless a REPORT command with a different report name is included in the WAMIL script. The .rpt extension is automatically added to the file name by the WAM Interpreter.

A WAMIL report file generated by execution of a script is placed in a user specified output directory. This output directory can be set through the WAMI GUI platform via the user configuration options, or by command line arguments by use of the -rpt switch. If no output directory is specified the WAM Interpreter will place the output file in the default HOME Scripts.dir directory.

If the script report name already exists the file is overwritten with the newly generated output, unless the WAM Interpreter append option is specified.
OUTPUT: The WAM Interpreter always prints the WAMIL script report file name in the generated report file, regardless of whether the REPORT command is included in the script or not.
ERRORS: None.

The report name and path are both printed in the WAMIL report file, along with the script name and path.
ALTERS: Report Name
DEFAULT VALUE: The Report Name is set to NONE upon initial startup, and defaults to the script name. The WAM:INITIALIZE command also sets this variable to None.
SEE ALSO: WAM:INITIALIZE
EXAMPLE: The following script includes a report name:
WAM:REPORT jt1234
WAM:MSC 5
WAM:CELL 49
WAM:RA 39
WAM:CONNECT TI
TI:op:cell 49, ra 39
WAM:DISCONNECT TI
WAM:ENDTEST

RESTOREWAM

The RESTOREWAM command can be embedded in the integration construct data structure according to the invention.
PURPOSE: Restores all (in this embodiment of the WAMIL language) WAM Interpreter variables, flags, and states to the values and states saved by the previous execution of the SAVEWAMI command.
SYNTAX: WAM:RESTOREWAM
EXAMPLE CALL: WAM:RESTOREWAM
DESCRIPTION: The RESTOREWAMI command restores all (in this embodiment of the WAMIL language) the WAMI global variables, WAMI VAR variables, WAMI VARn List variables, flags, and states to the values and states which had been saved by the previous SAVEWAMI command executed.
OUTPUT: The following is an example of the output generated to the WAMIL report file upon execution of a RESTOREWAMI command:
Restore All WAMI Variables, Flags, and States.
ERRORS: If the RESTOREWAMI command is executed in a WAMIL script, and a SAVEWAMI command was not previously executed, all (in this embodiment of the WAMIL language) the WAMI variables, flags, and states will be set to initial WAMI values and unpredictable errors may result.
ALTERS: All WAMI variables, flags, and states.
DEFAULT VALUE: Initial WAMI variables, flags, and states values.
SEE ALSO: WAM:INITIALIZE, WAM:SAVEWAM
EXAMPLE: The following script lines will save the WAM Interpreter states, execute a sub-WAMIL script, and then restore the WAM Interpreter states back after completion of the sub-WAMIL script execution:
WAM:SAVEWAM
WAM:EXEC SHARE jt1234_wrapup
WAM:RESTOREWAM

RG

The RG command can be embedded in the integration construct data structure according to the invention.
PURPOSE: Changes the WAMI global reference generator number variable, RG, to the value provided as an argument.
SYNTAX: WAM:RG value
EXAMPLE CALL: WAM:RG 1
DESCRIPTION: The RG command sets the WAMI global reference generator number variable to the value provided as an argument. After execution of this command, all (in this embodiment of the WAMIL language) subsequent commands which require use of a reference generator number, and all (in this embodiment of the WAMIL language) IF-construct commands which test the current script reference generator number, will reference the new value.

Execution of this command also disables any (in this WAMIL language embodiment) association which exists between this WAMI global variable and any WAMI VAR variable.

OUTPUT: The following is an example of the output generated to the WAMIL report file, upon execution of a RG command:

Set Reference Generator To 1
ERRORS: None.
ALTERS: RG
DEFAULT VALUE: RG is set to 0 upon initial startup, and is of type integer. The WAM:INITIALIZE command also sets this variable to 0.
SEE ALSO: WAM:INITLALIZE
EXAMPLE: The following script lines set the WAMIL script RG variable to 1 and then execute a TI command:

WAM:CELL 49
WAM:RG 1
TI:op:cell 49, rg 1

RPT

The RPT command can be embedded in the integration construct data structure according to the invention.
PURPOSE: Changes the WAMI global diagnostics repeat number variable, RPT, to the value provided as an argument.
SYNTAX: WAM:RPT value
EXAMPLE CALL: WAM:RPT 10
DESCRIPTION: The RPT command sets the WAMI global diagnostics repeat number variable to the value provided as an argument. After execution of this command, all (in this embodiment of the WAMIL language) subsequent commands which require use of a diagnostics repeat number, and all (in this embodiment of the WAMIL language) IF-construct commands which test the current script diagnostics repeat number, will reference the new value.

Execution of this command also disables any (in this WAMIL language embodiment) association which exists between this WAMI global variable and any WAMI VAR variable.
OUTPUT: The following is an example of the output generated to the WAMIL report file upon execution of a RPT command:

Set Diagnostics Repeat Number To 1
ERRORS: None.
ALTERS: RPT
DEFAULT VALUE: RPT is set to 0 upon initial startup, and is of type integer. The WAM:INITIALIZE command also sets this variable to 0.
SEE ALSO: WAM:INITIALIZE
EXAMPLE: The following script lines set the WAMIL script RPT variable to and then execute a TI command:

WAM:CELL 49
WAM:RPT 10
TI:dgn:cell 49, bba 2; rpt 10

SAVEWAM

The SAVEWAM command can be embedded in the integration construct data structure according to the invention.
PURPOSE: Saves all (in this embodiment of the WAMIL language) current WAM Interpreter variables, flags, and states.
SYNTAX: WAM:SAVEWAM
EXAMPLE CALL: WAM:SAVEWAM
DESCRIPTION: The SAVEWAMI command saves all (in this embodiment of the WAMIL language) the current WAMI global variables, WAMI VAR variables, WAMI VARn List variables, flags, and states. This command is useful to perform a backup of the current state of your WAMIL script prior to changing any (in this WAMIL language embodiment) variables or executing any (in this WAMIL language embodiment) sub-WAMIL scripts.

Subsequent execution of additional SAVEWAMI commands overwrites the values saved from the previous execution of the command.
OUTPUT: The following is an example of the output generated to the WAMIL report file upon execution of a SAVEWAMI command:

Save All WAMI Variables, Flags, and States.
ERRORS: None.
ALTERS: None (in this WAMIL language embodiment).
DEFAULT VALUE: None (in this WAMIL language embodiment).
SEE ALSO: WAM:RESTOREWAM
EXAMPLE: The following script lines will save the WAM Interpreter values and states, execute a sub-WAMIL script, and then restore the WAM Interpreter values and states back after completion of the sub-WAMIL script execution:

WAM:SAVEWAM
WAM:EXEC SHARE jt1234_wrapup
WAM:RESTOREWAM

SEND

The SEND command can be embedded in the integration construct data structure according to the invention.
PURPOSE: Instructs the WAM Interpreter to send string to the interface provided as an argument.
SYNTAX: WAM:SEND interface string
EXAMPLE CALL: WAM:SEND TI:rst:cell CELLVAR, CCC CCCVAR; ucl
DESCRIPTION: The SEND command instructs the WAM Interpreter to send the command provided by the argument string, to the WAMI interface provided by the argument interface, as a straightforward interface command. The string provided is executed as if it were an acceptable command for the interface. The output of the interface in respect to the string sent is stored in the WAMI buffer upon completion of execution of the command.
WARNING: Execution of the SEND command does not include interface command expansion and syntax checking for verification of variables referenced within the string provided, to confirm if values are equal to the current script values. Straightforward variables substitution is performed and the string provided is sent as an interface command. Caution can (in this embodiment of the WAMIL language) be practiced in the use of this command to ensure the right values are sent to the interface provided.

The SEND command string argument can also include references to WAMI global variables, or WAMI VARn variables. To reference a WAMI global variable the suffix VAR is simply added to the WAMI global variable name. For example, the following string, op:cell CELLVAR, ccc CCCVAR will be interpreted and sent as follows for a WAMI global CELL and CCC variables set to values of 49 and 6:

op:cell 49, ccc 6

INTERFACES: The following interfaces are supported by the SEND command:

| INTERFACE | DESCRIPTION |
|---|---|
| TI | TIpdunix |
| SDP | Status Display Page |

OUTPUT: The output generated by the SEND command is dependant upon the interface to which the command is sent.
ERRORS: If a SEND command is executed and no session has been established for the interface provided, the WAMI will generate a fatal error and execution of the script will be aborted. The error message will be printed in the WAMIL script output file.
ALTERS: WAM Interpreter buffer.
DEFAULT VALUE: None (in this WAMIL language embodiment).
EXAMPLE: The following script lines execute a DGN command on a cell CCC provided by the user:
  WAM:MSC 5
  WAM:CELL 49
  WAM:CCCVAR
  WAM:CONNECT TI
  WAM:SEND TI:dgn:cell 49, ccc CCCVAR
  WAM:DISCONNECT TI
  WAM:ENDTEST

SET

The SET command can be embedded in the integration construct data structure according to the invention.
PURPOSE: Instructs the WAM Interpreter to assign the value given to the WAMI global variable, global_variable, and enable an association if value references a WAMI VAR variable.
SYNTAX: WAM:SET global_variable value
EXAMPLE CALL: WAM:SET BBA 8
DESCRIPTION: The SET command is a multi-functional command. This command not only (in this embodiment of the WAMIL language) performs straightforward assignment, but also allows a user to disable, enable, or transfer a WAMI global variable association.

If the value provided is numerical or a string, a straightforward assignment is performed and if the WAMI global variable given is associated the association is disabled.

If the value provided references a WAMI VAR variable name, for example, WAM:SET BBA BBAVAR, then a WAMI association between the WAMI global variable BBA and the WAMI VAR variable BBAVAR is enabled. With the SET command, an association between any (in this WAMIL language embodiment) WAMI global variable and any (in this WAMIL language embodiment) WAMI VAR variable can be enabled. For script syntax, the global_variable will then be referenced as the WAMI VAR variable from that point forward.

If the value provided references a WAMI VARn List variable name, for example, WAM:SET BBA BBAVAR2, then a straightforward assignment is performed and if the WAMI global variable given is associated the association is disabled. Thus, the SET command can be used to assign any (in this WAMIL language embodiment) WAMI VARn List value to any (in this WAMIL language embodiment) WAMI global variable, but cannot be used to create an association between a WAMI global variable and a WAMI VARn List. To create such an association a user can (in this embodiment of the WAMIL language) execute a specific VARn command.

If the value provided references another WAMI global variable a straightforward assignment is performed. If the WAMI global variable referenced by value is associated, then its association is inherited by global_variable. Thus, both WAMI global variables will be associated to the same WAMI VAR variable. For script syntax then, both WAMI global variables will be referenced as the inherited WAMI VAR variable from that point forward.

The SET command can only (in this embodiment of the WAMIL language) be used to perform the same type assignment, or disable and enable associations between the same type WAMI global variable and WAMI VAR variable. In other words a string cannot be assigned to an integer type WAMI global variable, and a integer type WAMI global variable cannot be associated to a string type WAMI VAR variable. A string type WAMI global variable however can be assigned an integer, or be associated with either an integer or string type WAMI VAR variable.

OUTPUT: The following is an example of the output generated to the WAMIL report file upon execution of a SET command which enables an association between a WAMI global and WAMI VAR variable, in which BBAVAR has been previously set to a value of 4:
  Set BBA to BBAVAR Value Of 4

The following is an example of the output generated to the WAMIL report file upon execution of a SET command in which the value given references a WAMI global variable which is not associated:
  Set BBA to CCC Value Of 4

The following is an example of the output generated to the WAMIL report file upon execution of a SET command in which inheritance is performed between two WAMI global variables:
  Set BBA to CCC Value Of 4 Per BBAVAR The following is an example of the output generated to the WAMIL report file upon execution of a SET command in which a straightforward assignment is executed:
  Set BBA to 4

ERRORS: If an invalid WAMI global variable name is provided as the argument global_variable, the WAM Interpreter will generate a syntax error.

If a type mismatch between a WAMI global and WAMI VAR variable is used, the WAM Interpreter will generate a syntax error.

If value references a WAMI VARn List variable name for a List which has not been declared, the WAM Interpreter will generate a syntax error.
ALTERS: WAMI global variable given and its association status.
DEFAULT VALUE: None (in this WAMIL language embodiment).
SEE ALSO: VARn type commands.
EXAMPLE: The following script will set up an association between the WAMI global CCC and CCU variables, ensuring that they are always equal:
  WAM:MSC 5
  WAM:CELL 49
  WAM:CCCVAR
  WAM:SET CCU CCC
  WAM:CONNECT TI
  TI:op:cell 49, ccc CCCVAR, ccu CCCVAR
  WAM:DISCONNECT TI
  WAM:ENDTEST

SETLISTVAR

The SETLISTVAR command can be embedded in the integration construct data structure according to the invention.
PURPOSE: The SETLISTVAR command instructs the WAM Interpreter to assign the values of varlist2 to varlist1.
SYNTAX: WAM:SETLISTVAR varlist1 varlist2
EXAMPLE CALL: WAM:SETLISTVAR WAMLIST CELLLIST
DESCRIPTION: The SETLISTVAR command instructs the WAM Interpreter to perform a straightforward assignment. If varlist1 or varlist2 are associated with any (in this WAMIL language embodiment) WAMI global variable the association is not changed.

Upon execution of this command, the values of varlist1 will be lost and replaced with the values of varlist2.
OUTPUT: The following is an example of the output generated to the WAMIL report file upon execution of a SETLISTVAR command:

Assign CELL List Values To WAMI List:

New WAMI List Values: 100 49 173
ERRORS: The WAMI VARn List, varlist1, can (in this embodiment of the WAMIL language) be of the same type as varlist2, or a syntax error will be generated. However, if varlist1 is of type string, then varlist2 can be of type integer.

The total number of values in varlist1 can (in this embodiment of the WAMIL language) be less than or equal to the total number of values in varlist2 or the WAM Interpreter will generate an error.
ALTERS: WAMI VARn List varlist1
DEFAULT VALUE: None (in this WAMIL language embodiment).
EXAMPLE: The following script executes a TI command for each MSC cell number:
  WAM:MSC 5
  WAM:CONNECT TI
  TI:op:cell, generic
  WAM:GETCELLS
  WAM:SETLISTVAR WAMLIST CELLLIST
  WAM:SET CELL CELLVAR
  WAM:SET WAMI 1
  WHILE:TEST_EXPR WAMI LTE WAMVAR
    WAM:GETLISTVAR CELLVAR WAMLIST WAM
    TI:op:cell X
  WAM:INCR WAMI 1
  ENDWHILE:
  WAM:DISCONNECT TI
  WAM:ENDTEST

SETVAR

The SETVAR command can be embedded in the integration construct data structure according to the invention.
PURPOSE: The SETVAR command instructs the WAM Interpreter to assign the value provided as an argument to the WAMI VAR variable, var_variable.
SYNTAX: WAM:SETVAR var_variable value
EXAMPLE CALL: WAM:SETVAR BBAVAR 4
DESCRIPTION: The SETVAR command performs a straightforward assignment of a value to a WAMI VAR variable. The value can be any (in this WAMIL language embodiment) numerical or alphanumerical string.
NOTE: SETVAR only (in this embodiment of the WAMIL language) acts upon WAMI VAR variables. For assignment to WAMI global variables use the SET command.

The SETVAR command can only (in this embodiment of the WAMIL language) be used to perform the same type assignment. In other words a string cannot be assigned to an integer type WAMI VAR variable. A string type WAMI VAR variable however can be assigned an integer.

If value references a WAMI global variable which is not associated, the current value of the WAMI global variable is automatically assigned to the given WAMI VAR variable as a straightforward assignment.

If value references a WAMI VAR variable which is not associated, the current value of the WAMI VAR variable referenced is automatically assigned to the given WAMI VAR variable, var_variable, as a straightforward assignment.

The SETVAR command can perform association transfers. It does not enable or disable associations. If value references a WAMI VAR variable, and the complementary WAMI global variable of var_variable is currently associated, then the existing association of the complementary WAMI global variable for var_variable is transferred to the WAMI VAR variable defined by value.

The above means that if var_variable is CCUVAR which is currently associated to CCU, and value references CCCVAR. Then upon execution of the following command:
  WAM:SETVAR CCUVAR CCCVAR
The WAMI global variable CCU will be associated to CCCVAR, in effect transferring its association from CCUVAR to CCCVAR. Thus from that point forward for script syntax CCU will always reference CCCVAR. The only (in this embodiment of the WAMIL language) exception to this rule is the WAMI WAMVAR variable. Although a complementary global variable called WAMI does exist no automatic association transfer occurs in the execution of a SETVAR command, even if it is associated to any (in this WAMIL language embodiment) WAMI global variable. In effect, WAMVAR will always be referenced as WAMVAR, and any (in this WAMIL language embodiment) WAMI global variable associated to WAMVAR will also always be referenced as WAMVAR no matter what WAMVAR is set to. This allows increased flexibility within a script with the effect of WAMVAR acting like a wild card.

The SETVAR value argument can also reference a WAMI VARn List variable name. Thus allowing assignment of the value of any (in this WAMIL language embodiment) WAMI VARn List variable to a WAMI VAR variable. This is a simple straightforward assignment.
OUTPUT: The following is an example of the output generated to the WAMIL report file upon execution of a SETVAR command in which a straightforward assignment is performed from another WAMI VAR variable:

Set BBAVAR to CCCVAR Value Of 4
The following is an example of the output generated to the WAMIL report file upon execution of a SETVAR command in which value references a WAMI global variable which is not associated:

Set BBAVAR to BBA Value Of 4
The following is an example of the output generated to the WAMIL report file upon execution of a SETVAR command in which value references a WAMI global variable which has an association:

Set BBAVAR to BBA Value Of 4 Per CCCVAR
The following is an example of the output generated to the WAMIL report file upon execution of a SETVAR command in which a straightforward assignment is executed:

Set BBA to 4
ERRORS: None.

ALTERS: WAMI VAR variable given.
DEFAULT VALUE: None (in this WAMIL language embodiment).
SEE ALSO: WAM:DECRVAR var_variable value, WAM:INCRVAR var_variable value
EXAMPLE: The following script demonstrates an association transfer between two variables:
  WAM:MSC 5
  WAM:CELL 49
  WAM:CCCVAR
  WAM:SET CCU CCUVAR
  WAM:CONNECT TI
  TI:op:cell 49, ccc CCCVAR, ccu CCUVAR
  WAM:SETVAR CCUVAR CCC
  TI:op:cell 49, ccc CCCVAR, ccu CCCVAR
  WAM:DISCONNECT TI
  WAM:ENDTEST

SG

The SG command can be embedded in the integration construct data structure according to the invention.
PURPOSE: Changes the WAMI global server group number variable, SG, to the value provided as an argument.
SYNTAX: WAM:SG value
EXAMPLE CALL: WAM:SG 1
DESCRIPTION: The SG command sets the WAMI global server group number variable to the value provided as an argument. After execution of this command, all (in this embodiment of the WAMIL language) subsequent commands which require use of a server group number, and all (in this embodiment of the WAMIL language) IF-construct commands which test the current script server group number, will reference the new value.

Execution of this command also disables any (in this WAMIL language embodiment) association which exists between this WAMI global variable and any WAMI VAR variable.
OUTPUT: The following is an example of the output generated to the WAMIL report file upon execution of a SG command:
  Set Server Group To 1
ERRORS: None.
ALTERS: SG
DEFAULT VALUE: SG is set to 0 upon initial startup, and is of type integer. The WAM:INITIALIZE command also sets this variable to 0.
SEE ALSO: WAM:INITIALIZE
EXAMPLE: The following script lines set the WAMIL script SG variable to 1 and then backs up a fci translation form:
  WAM:CELL 49
  WAM:SG 1
  WAM:ANT 1
  WAM:GETAPX fci BACKUP

SPOOL

The SPOOL command can be embedded in the integration construct data structure according to the invention.
PURPOSE: Changes the WAM Interpreter spooler input pause to the time provided, in seconds.
SYNTAX: WAM:SPOOL seconds
EXAMPLE CALL: WAM:SPOOL 12
DESCRIPTION: The SPOOL command causes the WAM Interpreter input spooler courtesy pause to be changed to the argument provided, in seconds. The input spooler pause is the total amount of seconds the WAM Interpreter will wait for additional input, from all (in this embodiment of the WAMIL language) active interface sessions, prior to returning the contents of OutBuff (messages already received) to the script.

It is recommended that this value only (in this embodiment of the WAMIL language) be changed by WAMIL programmers which fully understand the WAM Interpreter interface process. Changes to this value have significant effects on the WAM Interpreter input, message and page captures, and script execution time.
OUTPUT: The following is an example of the output generated to the WAMIL report file upon execution of a SPOOL command:
  Spool Pause Changed To 12 Seconds
ERRORS: If SPOOL is set to a value less than zero, unpredictable errors may result.
  If SPOOL is set to zero, the WAM Interpreter will return immediately, and no input will be captured.
ALTERS: SPOOL
DEFAULT VALUE: SPOOL is set to 10 upon initial startup, and is of type integer. The WAM:INITIALIZE command also sets this variable to 10.

SU

The SU command can be embedded in the integration construct data structure according to the invention.
PURPOSE: Changes the WAMI global setup radio number variable, SU, to the value provided as an argument.
SYNTAX: WAM:SU value
EXAMPLE CALL: WAM:SU 7
DESCRIPTION: The SU command sets the WAMI global setup radio number variable to the value provided as an argument. After execution of this command, all (in this embodiment of the WAMIL language) subsequent commands which require use of a setup radio number, and all (in this embodiment of the WAMIL language) IF-construct commands which test the current script setup radio number, will reference the new value.

Execution of this command also disables any (in this WAMIL language embodiment) association which exists between this WAMI global variable and any WAMI VAR variable.
OUTPUT: The following is an example of the output generated to the WAMIL report file upon execution of a SU command:
  Set Cell Setup Radio To 1
ERRORS: None.
ALTERS: SU
DEFAULT VALUE: SU is set to 0 upon initial startup, and is of type integer. The WAM:INITIALIZE command also sets this variable to 0.
SEE ALSO: WAM:INITIALIZE
EXAMPLE: The following script lines set the WAMIL script SU variable to 7 and then execute a TI command:
  WAM:CELL 49
  WAM:SU 7
  TI:op:cell 49, su 7

SW

The SW command can be embedded in the integration construct data structure according to the invention.
PURPOSE: Changes the WAMI global switch identification number variable, SW, to the value provided as an argument.

SYNTAX: WAM:SW value
EXAMPLE CALL: WAM:SW 1
DESCRIPTION: The SW command sets the WAMI global switch identification number variable to the value provided as an argument. After execution of this command, all (in this embodiment of the WAMIL language) subsequent commands which require use of a switch identification number, and all (in this embodiment of the WAMIL language) IF-construct commands which test the current script switch identification number, will reference the new value.

Execution of this command also disables any (in this WAMIL language embodiment) association which exists between this WAMI global variable and any WAMI VAR variable.
OUTPUT: The following is an example of the output generated to the WAMIL report file upon execution of a SW command:

Set Switch Identification Number To 1
ERRORS: None.
ALTERS: SW
DEFAULT VALUE: SW is set to 0 upon initial startup, and is of type integer. The WAM:INITIALIZE command also sets this variable to 0.
SEE ALSO: WAM:INITIALIZE
EXAMPLE: The following script lines set the WAMIL script SW variable to 5 and then backs up the pptm translation form:

WAM:CELL 49
WAM:SW 5
WAM:GETAPX pptm BACKUP

TIME

The TIME command can be embedded in the integration construct data structure according to the invention.
PURPOSE: Prints the current system time in the script WAMIL report file.
SYNTAX: WAM:TIME
EXAMPLE CALL: WAM:TIME
DESCRIPTION: The TIME command prints the current system time to the script WAMIL report file.
OUTPUT: The following is an example of the output generated to the WAMIL report file upon execution of a TIME command:

Time: 07:35:56
ERRORS: Any system errors generated during execution of the TIME command are printed to the script WAMIL report file.
ALTERS: None (in this WAMIL language embodiment)
DEFAULT VALUE: None (in this WAMIL language embodiment).
SEE ALSO: WAM:DATE

TIMEOUT

The TIMEOUT command can be embedded in the integration construct data structure according to the invention.
PURPOSE: Changes the WAM Interpreter overall time out variable, TimeOut, to the value provided as an argument.
SYNTAX: WAM:TIMEOUT seconds
EXAMPLE CALL: WAM:TIMEOUT 60
DESCRIPTION: The TIMEOUT command sets the WAM Interpreter overall time out variable to the value provided as an argument. After execution of this command, all (in this embodiment of the WAMIL language) subsequent commands which require use the TimeOut variable will reference the new value.

The WAM Interpreter TimeOut variable plays a major role during execution of a CONNECT command. Setting this variable too small will cause frequent time outs if system response is slow.

The TimeOut variable is referenced during input from any (in this WAMIL language embodiment) active interface session. If nothing at all is received within the time specified by the variable, the WAM Interpreter TFAIL flag will be set.
OUTPUT: The following is an example of the output generated to the WAMIL report file upon execution of a TIMEOUT command:

TimeOut Changed To: 60 Seconds
ERRORS: Setting TimeOut to a negative number or zero will cause unpredictable results.
ALTERS: TimeOut
DEFAULT VALUE: TimeOut is set to 30 upon initial startup, and is of type integer. The WAM:INITIALIZE command also sets this variable to 30.
SEE ALSO: IF:TFAIL, WAM:INITIALIZE

TIMER

The TIMER command can be embedded in the integration construct data structure according to the invention.
PURPOSE: Instructs the WAM Interpreter to perform a specified internal timer action, and update the TIMER variable accordingly.
SYNTAX: WAM:TIMER action
EXAMPLE CALL: WAM:TIMER START
DESCRIPTION: The TIMER command instructs the WAM Interpreter to perform the action specified as an argument, an update the TIMER variable accordingly.

The WAMI timer is an internal timer which can be started, stopped, or read at any time during script execution. Below is a list of valid actions which can be used with the TIMER command:

| ACTION | DESCRIPTION |
|---|---|
| START | Start TIMER. |
| STOP | Stop TIMER. |
| READ | Read current elapsed time. |

Upon execution of a START action, the WAMI timer is enabled and the TIMER variable is set to 0. The TIMER variable remains set at 0 until the execution of a READ action.

Upon execution of a STOP action, the WAMI timer is disabled, the TIMER variable is then updated with the final elapsed time, in seconds.

Upon execution of a READ action, the TIMER variable is updated with the currently elapsed time, in seconds, since the execution of a START action.
OUTPUT: The following is an example of the output generated to the WAMIL report file upon execution of a WAM:TIMER START command:

Internal Timer Started at 11:20:38
The following is an example of the output generated to the WAMIL report file upon execution of a WAM:TIMER STOP command:

Internal Timer Stopped At 11:20:58
Elapsed Time is 20 Seconds.
The following is an example of the output generated to the WAMIL report file upon execution of a WAM:TIMER READ command:

Internal Timer Currently At 12 Seconds.
ERRORS: None.
ALTERS: Timer
DEFAULT VALUE: Timer is set to 0 upon initial startup, and is of type integer. The WAM:INITIALIZE command does not reset this variable.
EXAMPLE: The following script lines time how long it takes for a DGN command to complete:

WAM:SPOOL 2
WAM:TIMER START
TI:dgn:cell X, CCC CCCVAR
IF:OMSG DGN:CELL CELLVAR CCC CCCVAR, ATP
THEN:CONTINUE
ELSE:WAITQUERY 2 TI 30
WAM:TIMER STOP
WAM:PRINT Command Execution Took TIMERVAR Seconds.

TP

The TP command can be embedded in the integration construct data structure according to the invention.
PURPOSE: Changes the WAMI global traffic path number variable, TP, to the value provided as an argument.
SYNTAX: WAM:TP value
EXAMPLE CALL: WAM:TP 6
DESCRIPTION: The TP command sets the WAMI global traffic path number variable to the value provided as an argument. After execution of this command, all (in this embodiment of the WAMIL language) subsequent commands which require use of a traffic path number, and all (in this embodiment of the WAMIL language) IF-construct commands which test the current script traffic path number, will reference the new value.

Execution of this command also disables any (in this WAMIL language embodiment) association which exists between this WAMI global variable and any WAMI VAR variable.
OUTPUT: The following is an example of the output generated to the WAMIL report file upon execution of a TP command:

Set Traffic Path Number To 1
ERRORS: None.
ALTERS: TP
DEFAULT VALUE: TP is set to 0 upon initial startup, and is of type integer. The WAM:INITIALIZE command also sets this variable to 0.
SEE ALSO: WAM:INITIALIZE
EXAMPLE: The following script lines set the WAMIL script TP variable to 6 and then execute a TI command:

WAM:CELL 49
WAM:TP 6
TI:exc:cell 49, ft tp 6

TRACE

The TRACE command can be embedded in the integration construct data structure according to the invention.
PURPOSE: Activates the WAM Interpreter TRACE feature specified by the TRACE options.
SYNTAX: WAM:TRACE options
EXAMPLE CALL: WAM:TRACE x
DESCRIPTION: The TRACE command instructs the WAM Interpreter to open a WAMI TRACE xterm window to which TRACE output will be written. The TRACE output written will be dependant upon the TRACE options specified by the argument options.

TRACE output will not be written to the WAMI TRACE xterm window until the TRACEON command is executed. The output to the WAMI TRACE xterm window will stop when either a TRACEOFF command is executed, or the WAMIL script has been terminated.

The TRACE command is a debug tool to monitor all (in this embodiment of the WAMIL language) WAM Interpreter activity during the execution of a WAMIL script. For a detailed definition of all (in this embodiment of the WAMIL language) the TRACE options available, and an explanation of the trace output and features, refer to the WAMI TRACE section of this book.

The TRACE command appends all (in this embodiment of the WAMIL language) TRACE output to the wam.trace-log file located in the WAMI HOME wam.trace subdirectory. If the file does not exist it is created upon execution of this command.
OUTPUT: The following is an example of the output generated to the WAMIL report file upon execution of a TRACE command:

TRACE OPTION: x
ERRORS: None.
ALTERS: TRACE options
DEFAULT VALUE: TRACE is set to NULL upon initial startup, and is of type string. The WAM:INITIALIZE command resets TRACE.
SEE ALSO: WAM:TRACEOFF, WAM:TRACEON

TRACEOFF

The TRACEOFF command can be embedded in the integration construct data structure according to the invention.
PURPOSE: Stops output to the WAMI TRACE xterm window.
SYNTAX: WAM:TRACEOFF
EXAMPLE CALL: WAM:TRACEOFF
DESCRIPTION: The TRACEOFF command instructs the WAM Interpreter to stop output to the WAMI TRACE xterm window. The WAMI TRACE xterm window still remains open after execution of this command.

The TRACE command is a debug tool to monitor all (in this embodiment of the WAMIL language) WAM Interpreter activity during the execution of a WAMIL script. For a detailed definition of TRACE, refer to the WAMI TRACE section of this book.
OUTPUT: The following is an example of the output generated to the WAMIL report file upon execution of a TRACEOFF command:

TRACE OFF:
ERRORS: None.
ALTERS: TRACE flag
DEFAULT VALUE: The TRACE flag is set OFF upon initial startup. The WAM:INITIALIZE command resets this flag.
SEE ALSO: WAM:TRACE, WAM:TRACEON

TRACEON

The TRACEON command can be embedded in the integration construct data structure according to the invention.
PURPOSE: Starts output to the WAMI TRACE xterm window.
SYNTAX: WAM:TRACEON
EXAMPLE CALL: WAM:TRACEON
DESCRIPTION: The TRACEON command instructs the WAM Interpreter to start output to the WAMI TRACE xterm window.

The TRACE command is a debug tool to monitor all (in this embodiment of the WAMIL language) WAM Interpreter activity during the execution of a WAMIL script. For a detailed definition of TRACE, refer to the WAMI TRACE section of this book.
OUTPUT: The following is an example of the output generated to the WAMIL report file upon execution of a TRACEON command:
TRACE ON:
ERRORS: None.
ALTERS: TRACE flag
DEFAULT VALUE: The TRACE flag is set OFF upon initial startup. The WAM:INITIALIZE command resets this flag.
SEE ALSO: WAM:TRACE, WAM:TRACEOFF

TRKGRP

The TRKGRP command can be embedded in the integration construct data structure according to the invention.
PURPOSE: Changes the WAMI global trunk group number variable, TRKGRP, to the value provided as an argument.
SYNTAX: WAM:TRKGRP value
EXAMPLE CALL: WAM:TRKGRP 254
DESCRIPTION: The TRKGRP command sets the WAMI global trunk group number variable to the value provided as an argument. After execution of this command, all (in this embodiment of the WAMIL language) subsequent commands which require use of a trunk group number, and all (in this embodiment of the WAMIL language) IF-construct commands which test the current script trunk group number, will reference the new value.

Execution of this command also disables any (in this WAMIL language embodiment) association which exists between this WAMI global variable and any WAMI VAR variable.
OUTPUT: The following is an example of the output generated to the WAMIL report file upon execution of a TRKGRP command:
Set Trunk Group Number To 1
ERRORS: None.
ALTERS: TRKGRP
DEFAULT VALUE: TRKGRP is set to 0 upon initial startup, and is of type integer. The WAM:INITIALIZE command also sets this variable to 0.
SEE ALSO: WAM:INITIALIZE
EXAMPLE: The following script lines set the WAMIL script TRKGRP variable to 538 and then execute a TI command:
WAM:CELL 49
WAM:DCS 1
WAM:TRKGRP 538
WAM:TRKMBR 38
TI:dgn:dcs 1, trkgrp 538, member 38

TRKMBR

The TRKMBR command can be embedded in the integration construct data structure according to the invention.
PURPOSE: Changes the WAMI global trunk member number variable, TRKMBR, to the value provided as an argument.
SYNTAX: WAM:TRKMBR value
EXAMPLE CALL: WAM:TRKMBR 190
DESCRIPTION: The TRKMBR command sets the WAMI global trunk member number variable to the value provided as an argument. After execution of this command, all (in this embodiment of the WAMIL language) subsequent commands which require use of a trunk member number, and all (in this embodiment of the WAMIL language) IF-construct commands which test the current script trunk member number, will reference the new value.

Execution of this command also disables any (in this WAMIL language embodiment) association which exists between this WAMI global variable and any WAMI VAR variable.
OUTPUT: The following is an example of the output generated to the WAMIL report file upon execution of a TRKMBR command:
Set Trunk Member Number To 1
ERRORS: None.
ALTERS: TRKMBR
DEFAULT VALUE: TRKMBR is set to 0 upon initial startup, and is of type integer. The WAM:INITIALIZE command also sets this variable to 0.
SEE ALSO: WAM:INITIALIZE
EXAMPLE: The following script lines set the WAMIL script TRKMBR variable to 38 and then execute a TI command:
WAM:CELL 49
WAM:DCS 1
WAM:TRKGRP 538
WAM:TRKMBR 38
TI:dgn:dcs 1, trkgrp 538, member 38

UNIX

The UNIX command can be embedded in the integration construct data structure according to the invention.
PURPOSE: Instructs the WAM Interpreter to execute the command provided as a UNIX executable program.
SYNTAX: WAM:UNIX command
EXAMPLE CALL: WAM:UNIX ls
DESCRIPTION: The UNIX command instructs the WAM Interpreter to execute the command given as an argument as a UNIX shell executable. The command can be any (in this WAMIL language embodiment) UNIX command or executable program.

This command allows a user to initiate a UNIX process from within a WAMIL script. Upon completion of execution of this command, the WAM Interpreter will set the WAMI VAR variable, WAMVAR, to the output, if any, of the command executed and also print the output to the script WAMIL report file.

Upon execution of the UNIX command, the WAMIL script will not continue execution until after the command given has completed. If the command given is executed in the background, then the UNIX command will return immediately and WAMVAR will hold the PID value returned by Unix.

The command argument can also include references to WAMI global variables, or WAMI VARn variables. To reference a WAMI global variable the suffix VAR is simply added to the WAMI global variable name. This is not to be mistaken with WAMI VAR variables. Although when referencing WAMI global variables within strings the names resemble WAMI VAR variables, this naming convention was chosen to allow references to WAMI global variables and still be able to print the variable name. To include the value of a WAMI VAR variable, a WAMI global variable can (in this embodiment of the WAMIL language) first be associated. Then references to the WAMI global variable will yield the value of the WAMI VAR variable it is associated with.

OUTPUT: The following is an example of the output generated to the WAMIL report file upon execution of a UNIX command:

Executed UNIX Command: 1s

ERRORS: Any errors generated by Unix upon execution are printed in the script WAMIL report file.

ALTERS: WAMVAR

DEFAULT VALUE: WAMVAR is set to NULL upon initial startup, and is of type string. The WAM:INITIALIZE command also sets this variable to NULL.

SEE ALSO: IF:WAMVAR

VRADPC

The VRADPC command can be embedded in the integration construct data structure according to the invention.

PURPOSE: Changes the WAMI global voice radio power control option number variable, VRADPC, to the value provided as an argument.

SYNTAX: WAM:VRADPC value

EXAMPLE CALL: WAM:VRADPC 150

DESCRIPTION: The VRADPC command sets the WAMI global voice radio power control option number variable to the value provided as an argument. After execution of this command, all (in this embodiment of the WAMIL language) subsequent commands which require use of a voice radio power control option number, and all (in this embodiment of the WAMIL language) IF-construct commands which test the current script voice radio power control option number, will reference the new value.

Execution of this command also disables any (in this WAMIL language embodiment) association which exists between this WAMI global variable and any WAM VAR variable.

OUTPUT: The following is an example of the output generated to the WAMIL report file upon execution of a VRADPC command:

Set Voice Radio Power Control Option To 150

ERRORS: None.

ALTERS: VRADPC

DEFAULT VALUE: VRADPC is set to 0 upon initial startup, and is of type integer. The WAM:INITIALIZE command also sets this variable to 0.

SEE ALSO: WAM:INITIALIZE

VRN

The VRN command can be embedded in the integration construct data structure according to the invention.

PURPOSE: Changes the WAMI global voice radio number variable, VRN, to the value provided as an argument.

SYNTAX: WAM:VRN value

EXAMPLE CALL: WAM:VRN 1

DESCRIPTION: The VRN command sets the WAMI global voice radio number variable to the value provided as an argument. After execution of this command, all (in this embodiment of the WAMIL language) subsequent commands which require use of a voice radio number, and all (in this embodiment of the WAMIL language) IF-construct commands which test the current script voice radio number, will reference the new value.

Execution of this command also disables any (in this WAMIL language embodiment) association which exists between this WAMI global variable and any WAMI VAR variable.

OUTPUT: The following is an example of the output generated to the WAMIL report file upon execution of a VRN command:

Set Voice Radio Number To 1

ERRORS: None.

ALTERS: VRN

DEFAULT VALUE: VRN is set to 0 upon initial startup, and is of type integer. The WAM:INITIALIZE command also sets this variable to 0.

SEE ALSO: WAM:INITIALIZE

EXAMPLE: The following script lines set the WAMIL script VRN variable to 1 and then backs up the dcch translation form:

WAM:CELL 49
    WAM:VRN 1
    WAM:GETAPX dcch BACKUP

WAIT

The WAIT command can be embedded in the integration construct data structure according to the invention.

PURPOSE: Instructs the WAM Interpreter to wait a specified number of seconds before execution of the next WAMIL script command.

SYNTAX: WAM:WAIT seconds

EXAMPLE CALL: WAM:WAIT 10

DESCRIPTION: The WAIT command instructs the WAM Interpreter to wait a specified number of seconds before executing the next WAMIL script command.

OUTPUT: The following is an example of the output generated to the WAMIL report file upon execution of a WAIT command:

WAMIL Wait: 10 Seconds

ERRORS: Setting WAIT to a negative number or zero will have no effect.

ALTERS: Wait

DEFAULT VALUE: Wait is set to 10 upon initial startup, and is of type integer. The WAM:INITIALIZE command also sets this variable to 10.

SEE ALSO: WAM:INITIALIZE

EXAMPLE: The following script lines execute a TI command, and then waits seconds before executing a subsequent TI command:

WAM:CELL 49
    WAM:CAT 1
    TI:rst:cell 49, cat 1
    WAM:WAIT 20
    TI:op:cell 49

The WAM command can be embedded in the integration construct data structure according to the invention.

PURPOSE: Changes the Interpreter global variable WAMI value, WAM, to the value provided as an argument.

SYNTAX: WAM:WAMI string

EXAMPLE CALL: WAM:WAMI 101

DESCRIPTION: The WAMI command sets the Interpreter global variable WAMI value to the value provided as an argument. After execution of this command, all (in this embodiment of the WAMIL language) subsequent commands which require use of the Interpreter global variable WAMI value, and all (in this embodiment of the WAMIL language) IF-construct commands which test the Interpreter global variable WAMI value, will reference the new value.

Execution of this command disables any (in this WAMIL language embodiment) association which exists between this WAMI global variable and any WAMI VAR variable.

OUTPUT: The following is an example of the output generated to the WAMIL report file upon execution of a WAMI command:

Set WAMI Variable 101
ERRORS: None.
ALTERS: WAM
DEFAULT VALUE: WAMI is set to 0 upon initial startup, and is of type integer. The WAM:INITIALIZE command also sets this variable to 0.
SEE ALSO: WAM:INITIALIZE
EXAMPLE: The following script adds a neighbor to cell 49:
  WAM:MSC 5
  WAM:CELL 49
  WAM:ANT 1
  WAM:SG 0
  WAM:WAMI 101
  WAM:PUTAPXFLD fci cdmanbr_list1.ncs_c[1]= WAMVAR
  WAM:ENDTEST

WAMLIST

The WAMLIST command can be embedded in the integration construct data structure according to the invention.
PURPOSE: Declares to the WAM Interpreter that a list of values will be supplied to the script.
SYNTAX: WAM:WAMLIST string
EXAMPLE CALL: WAM:WAMLIST Enter Three Cell Numbers To Test
DESCRIPTION: The WAMLIST command is a WAMIL declaration command which instructs the WAM Interpreter that a list of values will be supplied to the script. This command executes the assignment of the values provided to the WAM Interpreter WAMI List.

Upon detection of this command, the WAM Interpreter will search the command line arguments for the WAMI values. The WAMI List size will depend on the total number of values supplied to the script. Thus the WAMI List can be infinitely long. The WAMI values within the WAMI List can then be referenced within the script as WAMI VARn variables, according to their index position in the list. For example, WAMVAR2 refers to the second WAMI value in the WAMI List. The order of the WAMI values provided determine the order of their placement within the WAMI List.

If a WAMI VARn value outside the range of the WAMI List is referenced within the script, the value returned will be a WAMBLANK. This provides a means of determining when the end of the WAMI List has been reached.

If WAMIL scripts which include WAMLIST commands are included in a Linker script, and one set of variables is chosen for all (in this embodiment of the WAMIL language) the linked scripts, the first WAMLIST command detected by the Linker takes precedence over all (in this embodiment of the WAMIL language) or any subsequent WAMLIST commands in the remaining linked WAMIL scripts.

This command has a dual function. The prompt_string argument, although not used by the WAM Interpreter, will generate a syntax error if omitted. For prompt_string use refer to the WAMI GUI PLATFORM section below.
WAMI GUI PLATFORM: Prior to execution of a WAMIL script, the WAMI GUI platform searches the script for special commands. If a WAMLIST command is encountered the WAMI GUI platform will prompt the user for a quantity of WAMI values. The prompt displayed will be the string argument of the WAMLIST command within the script. Subsequent WAM:WAMLIST commands encountered will not cause additional prompting.
SCRIPTOR: If this command is deleted from the current script, the Scriptor will issue a warning that any (in this WAMIL language embodiment) remaining WAMI List variables referenced within the script will each default to a WAMBLANK value.

The Scriptor will only (in this embodiment of the WAMIL language) allow insertion of one WAMLIST command into the current script.
OUTPUT: The following is an example of the output generated to the WAMIL report file upon execution of a WAMLIST command:
  Total Number of WAMI List Values Set To 4
  WAMI List Values: 2 4 6 8
ERRORS: Any references within a script to a WAMI VARn variable prior to the declaration of the list will generate a WAMBLANK.

If more than one WAMLIST command is used in a WAMIL script, only (in this embodiment of the WAMIL language) the first list declaration is used, and therefore takes precedence. Thus subsequent WAMLIST commands have no effect.
ALTERS: WAMI List.
DEFAULT VALUE: The WAMI List is set to an unknown state upon initial startup, and is of type string. The WAM:INITIALIZE command does not reset this list.
SEE ALSO: WAM:WAMVARn
EXAMPLE: The following script executes a TI command for each cell number passed as a WAMI List:

```
WAM:MSC 5
WAM:WAMLIST Enter Cell Numbers
WAM:CONNECT TI
WAM:SET WAMI 1
WHILE:TEST_EXPR WAMVAR NE WAMBLANK
    WAM:GETLISTVAR WAMVAR WAMLIST WAM
    IF:TEST_EXPR WAMVAR NE WAMBLANK
    THENDO:
        WAM:SET CELL WAMVAR
        TI:op:cell WAMVAR
        WAM:SET CELL 0
    ELSEDO:
    ENDIF:
        WAM:INCR WAMI 1
ENDWHILE:
WAM:DISCONNECT TI
WAM:ENDTEST
```

WAMVAR

The WAMVAR command can be embedded in the integration construct data structure according to the invention.
PURPOSE: Declares to the WAM Interpreter, that a value or string for the WAMI VAR variable WAMVAR will be supplied to the script.
SYNTAX: WAM:WAMVAR prompt_string
EXAMPLE CALL: WAM:WAMVAR Enter Neighbor Cell Number
DESCRIPTION: The WAMVAR command is a WAMIL declaration command which executes an assignment function. Upon detection of this command, the WAM Interpreter will search the command line arguments for a value or string to assign to the WAMI VAR variable WAMVAR.

Like standard WAMI VAR variable declaration commands, the execution of this command also enables an association with the global variable WAM. Therefore, until the global variable WAMI association is transferred to another WAMI VAR variable, or disabled, all (in this embodiment of the WAMIL language) references to the global variable WAMI will use the WAMVAR variable value.

For script syntax, until an actual WAMI value is passed as an argument, when a WAMVAR command is used the WAMI value within a script shall be referenced as WAMVAR from that point forward.

This command has a dual function. The prompt_string argument, although not used by the WAM Interpreter, will generate a syntax error if omitted. For prompt_sting use refer to the WAMI GUI PLATFORM section below.
WAMI GUI PLATFORM: Prior to execution of a WAMIL script, the WAMI GUI platform searches the script for special commands. If a WAM:WAMVAR is encountered the WAMI GUI platform will prompt the user using prompt_ string for the script WAMVAR value or string. Subsequent WAM:WAMVAR commands encountered will not cause additional prompting.
OUTPUT: The following is an example of the output generated to the WAMIL report file, upon execution an WAMVAR command:

Set WAMVAR To Argument Value of 173

ERRORS: The prompt string argument, although not used by the WAM Interpreter, will generate a syntax error if omitted.

If no command line value or string has been provided, the WAM Interpreter will generate an error and script execution will be aborted.
ALTERS: WAMVAR
DEFAULT VALUE: WAMVAR is set to an unknown state upon initial startup, and is of type string. The WAM:INITIALIZE command does not reset this WAMI VAR variable.
SEE ALSO: WAM:WAMI string
EXAMPLE: The following script adds a neighbor to cell 49:

WAM:MSC 5
WAM:CELL 49
WAM:ANT 1
WAM:SG 0
WAM:WAMVAR Enter Neighbor Cell Number
WAM:PUTAPXFLD fci cdmanbr_list1.ncs_c[1]= WAMVAR
WAM:ENDTEST

WAMVARn

The WAMVARn command can be embedded in the integration construct data structure according to the invention.
PURPOSE: Instructs the WAM Interpreter to set the global variable WAMI to the value of the referenced WAMI VARn WAMI variable, in position n, of the WAMI List passed as an argument.
SYNTAX: WAM:WAMVARn
EXAMPLE CALL: WAM:WAMVAR2
DESCRIPTION: The WAMVARn command is an assignment command. This command can only (in this embodiment of the WAMIL language) be executed if a WAMI List has been declared in the script. Upon execution, this command assigns a WAMI List variable value to the global variable WAM.

The value n, can (in this embodiment of the WAMIL language) be a valid index into the WAMI List. Any (in this WAMIL language embodiment) WAMI List value can be assigned to the global variable WAMI by execution of this command, where n is the WAMI value location within the WAMI List. Upon execution, the WAMI global value within a script is referenced as WAMVARn from that point forward Like standard WAMI VARn variable assignment commands, the execution of this command also enables an association with the global variable WAM. Therefore, until the global variable WAMI association is transferred to a WAMI VAR variable, or disabled, all (in this embodiment of the WAMIL language) references to the global variable WAMI will use the WAMVARn variable value.

For script syntax, until actual WAMI List values are passed as an argument, when a WAMVARn command is used the WAMI global value within a script shall be referenced as WAMVARn from that point forward.
OUTPUT: The following is an example of the output generated to the WAMIL report file upon execution of a WAMVARn command, when a WAMI List of 3 was previously declared, and the WAMI List values passed as an argument are 2 4 6:

Set WAMI To WAMVAR2 Value Of 4

SCRIPTOR: If a WAMVARn command is deleted from the current script, the Scriptor will prompt the user for a WAMI global value and then insert a WAM:WAMI string command in place of the WAMVARn command deleted.
ERRORS: An invalid WAMVARn command used within a script, where n refers to a WAMI List index outside the list range, will default to assignment of WAMBLANK to the global variable WAM.

If a WAMVARn command is used within a script in which no WAMI List has been declared, a WAMBLANK will be assigned to the global variable WAM.
ALTERS: WAM
DEFAULT VALUE: None (in this WAMIL language embodiment).
SEE ALSO: WAM:WAMI string, WAM:WAMLIST string
EXAMPLE: The following script sets the WAMI VARn WAMI List length to 2, and then modifies the CEQFACE form t_add and t_drop values:

WAM:MSC 5
WAM:CELL 49
WAM:WAMLIST Enter t_add and t_drop values
WAM:WAMVAR1
WAM:PUTS HOME TEMP.dbf t_add=WAMVAR
WAM:WAMVAR2
WAM:PUTS HOME TEMP.dbf t_add=WAMVAR
WAM:PUTAPX ceqface TEMP
WAM:UNIX rm TEMP.dbf
WAM:ENDTEST

WMMI

The WMMI command can be embedded in the integration construct data structure according to the invention.
PURPOSE: Instructs the WAM Interpreter to generate paging messages to specified mobile units at a specified rate.
SYNTAX: WAM:WMMI start stop rate mobiles message
EXAMPLE CALL: WAM:WMMI 11:00:00:11:17:1998 12:00:001:17:1998360/home/mobiles Call Me Back
DESCRIPTION: The WMMI command instructs the WAM Interpreter to generate paging messages, via SMS (Short Messaging Service), at a specified rate per hour to a list of mobiles. The message sent is given in the argument message.

The list of mobiles is supplied in a text file which contains a list of mobile unit numbers, one mobile unit number per line. The filename and full pathname to the file is supplied in the argument mobiles.

The start and stop arguments define the actual start time of when the messages will begin, and the stop time for the last message. The start and end time formats are specified as follows:

HH:mm:SS:MM:DD:YYYY

Where, HH is the two digit hour, mm is the two digit minute, SS is the two digit seconds, MM is the two digit month, DD is the two digit day, and YYYY is the four digit year.

For example, if the user defines the following paging pattern:

"Call Me Back"

And a paging rate of 360 pages per hour. If the text file which contains a list of mobile unit numbers has a total of ten numbers, then the paging pattern "Call Me Back 1" will be sent to the first mobile number in the text file list, and "Call Me Back 2" will be sent to the second mobile number in the text file list, and so on every ten seconds until "Call Me Back 10" is transmitted to the tenth mobile number in the list. Once the tenth pattern has been sent, the process will wrap around to the first mobile and send "Call me Back 11" to that mobile unit.

Only (in this embodiment of the WAMIL language) one paging project can be active at one time within a WAMIL script.

This process will continue, in this wrap around fashion, until the specified end time is reached, or the process is terminated with the WMMI_STOP command.

The message argument can include references to WAMI global variables, or WAMI VARn variables, and WAM Interpreter keywords. To reference a WAMI global variable the suffix VAR is simply added to the WAMI global variable name. For example, the following message, Test SCRIPT_NAME Message MSC MSCVAR, will be interpreted and sent as follows for a script called jt1234, executed using MSC 5:

Test jt1234 Message MSC 5

This is not to be mistaken with WAMI VAR variables. Although when referencing WAMI global variables within strings to be printed the names resemble WAMI VAR variables, this naming convention was chosen to allow references to WAMI global variables and still be able to use the variable name. To use the value of a WAMI VAR variable, a WAMI global variable can (in this embodiment of the WAMIL language) first be associated. Then references to the WAMI global variable will yield the value of the WAMI VAR variable it is associated with.

The start, stop, and rate arguments can reference any (in this WAMIL language embodiment) WAMI VAR or WAMI VARn variable. Upon execution of the command, the argument value is replaced with the current value of the WAMI VAR or WAMI VARn variable referenced.

If the start argument is set to the value of 0, then the messaging project start time will be set to the current time.

If the end argument is set to the keyword TESTEND, then the messaging project will be terminated upon the execution of any (in this WAMIL language embodiment) WAM:ENDTEST command. Regardless of whether the TESTEND keyword is used, or the WMMI_STOP command is executed, the WAM Interpreter will always terminate the active WMMI project upon completion of a execution of the WAMIL script.

If the mobiles argument is the keyword HOME, then the WAM Interpreter will look in the WMMI home directory, wam.wmmi, for the MOBS.wmmi file.

OUTPUT: The following is an example of the output generated to the WAMIL report file upon execution of a WMMI command:

Start Mobile Messaging at 360 pages per hour.

Send Pattern: Call Me Back

ERRORS: If the mobile units file specified is not found the WAM Interpreter will generate an execution error.

If an invalid start or end time, or rate, is specified the WAM Interpreter will generate an execution error.

If the message length is greater than 150 characters, the WAM Interpreter will generate an execution error.

If no message is specified, the WAM Interpreter will generate a syntax error.

If a WMMI project is already active, the WAM Interpreter will generate a syntax error.

ALTERS: None (in this WAMIL language embodiment).

DEFAULT VALUE: None (in this WAMIL language embodiment).

SEE ALSO: WAM:WMMI_GET wmmi_parameter var_variable, WAM:WMMI_SEND wmmi_command argument

WAM:WMMI STOP

EXAMPLE: The following script lines initiate mobile messages for one hour: WAM:WMMI 11:00:00:11:17:1998 12:00:00:1:17:1998 360/home/mobiles Call Me Back

WMMI GET

The WMMI_GET command can be embedded in the integration construct data structure according to the invention.

PURPOSE: Instructs the WAM Interpreter to get the WMMI project parameter value, defined by the argument wmmi_parameter, and place the value in the WAMI VAR variable, var_variable.

SYNTAX: WAM:WMMI_GET wmmi_parameter var_variable

EXAMPLE CALL: WAM:WMMI_GET COUNT WAMVAR

DESCRIPTION: The WMMI_GET command provides a means of retrieving parameter values from the active WMMI project. Upon execution of this command, the WAMI VAR variable given by the argument var_variable, is set to the WMMI project parameter value.

The WMMI parameter, COUNT, can be retrieved by the WMMI_GET command: The parameter COUNT represents the value returned by the current message number transmitted by the active WMMI project. Note: all (in this embodiment of the WAMIL language) WMMI messages are numbered sequentially starting with the number one for the first message.

OUTPUT: The following is an example of the output generated to the WAMIL report file upon execution of a WMMI_GET command to retrieve the COUNT parameter value:

WMMI Project COUNT Currently At: 16

ERRORS: If the WAMI VAR variable name given is invalid, the WAM Interpreter will generate a syntax error.

If no WMMI project is active, the WAM Interpreter will generate a syntax error.

If an invalid WMMI parameter name is given, the WAM Interpreter will generate a syntax error.

If no parameter value is retrieved from the WMMI project within the time specified by the WAMI global variable TimeOut, the WAM Interpreter will generate an error message to the WAMIL report file. The WAMIL script execution, however, will continue.

ALTERS: WAMI VAR variable given.
DEFAULT VALUE: None (in this WAMIL language embodiment).
SEE ALSO: WAM:WMMI start stop rate mobiles message, WAM:WMMI_SEND wmmi_command argument
WAM:WMMI_STOP
EXAMPLE: The following script lines initiate mobile messages, and then after one minute prints the total number of messages sent:
WAM:WMMI 0 TESTEND 3600 HOME Call Me Back
WAM:WAIT 60
WAM:WMMI_GET COUNT WAMVAR
WAM:PRINT A total of WAMVAR messages have been sent.
WAM:ENDTEST

WMMI_SEND

The WMMI_SEND command can be embedded in the integration construct data structure according to the invention.
PURPOSE: Instructs the WAM Interpreter to send the specified WMMI command to the active WMMI project.
SYNTAX: WAM:WMMI_SEND wmmi_command value
EXAMPLE CALL: WAM:WMMI_SEND CHANGERATE 1200
DESCRIPTION: The WMMI_SEND command causes the WAM Interpreter to send the specified WMMI command, given by the argument wmmi_command, to the active WMMI project. The given value is the WMMI command argument.

The following is a list of WMMI commands which can be sent to an active project, along with a description and purpose of the command:

| COMMAND | DESCRIPTION |
| --- | --- |
| CHANGEPAT | Causes the WMMI project to change the pattern to the value provided. |
| CHANGERATE | Causes the WMMI project to change the rate to the value provided |
| SENDPAT | Causes the WMMI project to transmit the pattern provided by value only (in this embodiment of the WAMIL language) once, and then return to the project pattern. The project pattern provided in the WMMI command is not altered. |

OUTPUT: The following is an example of the output generated to the WAMIL report file upon execution of a WMMI_SEND command:
Send CHANGERATE Command To WMMI Project:
Argument: 1200
ERRORS: If the WMMI command is CHANGEPAT or SENDPAT, and the message length is greater than 150 characters, the WAM Interpreter will generate a syntax error.
If no WMMI project is active at the time of execution of this command, the WAM Interpreter will generate a syntax error.
If an invalid WMMI command is supplied, the WAM Interpreter will generate a syntax error.
If the WMMI command is CHANGERATE, and the value given is invalid, the WAM Interpreter will generate a syntax error.

ALTERS: WMMI project depending on command.
DEFAULT VALUE: None (in this WAMIL language embodiment).
SEE ALSO: WAM:WMMI start stop rate mobiles message, WAM:WMMI_GET wmmi_parameter var_variable, WAM:WMMI_STOP
EXAMPLE: The following script lines initiate mobile messages, and after execution of a sub-WAMIL script changes the paging rate:
WAM:WMMI 0 TESTEND 360 HOME Call Me Back
WAM:EXEC HOME jt1234
WAM:WMMI_SEND CHANGERATE 1200

WMMI_STOP

The WMMI_STOP command can be embedded in the integration construct data structure according to the invention.
PURPOSE: Instructs the WAM Interpreter to terminate the active WMMI paging project.
SYNTAX: WAM:WMMI_STOP
EXAMPLE CALL: WAM:WMMI_STOP
DESCRIPTION: The WMMI_STOP command upon execution terminates the script WMMI paging project. If the project is not active then the execution of this command has no effect.
OUTPUT: The following is an example of the output generated to the WAMIL report file upon execution of a WMMI_STOP command:
Mobile Messaging Project Terminated.
ERRORS: None.
ALTERS: None (in this WAMIL language embodiment).
DEFAULT VALUE: None (in this WAMIL language embodiment).
SEE ALSO: WAM:WMMI start stop rate mobiles message, WAM:WMMI_GET wmmi_parameter var_variable, WAM:WMMI_SEND wmmi_command argument

XMITC

The XMITC command can be embedded in the integration construct data structure according to the invention.
PURPOSE: Changes the WAMI global transmitter control action option number variable, XMITC, to the value provided as an argument.
SYNTAX: WAM:XMITC value
EXAMPLE CALL: WAM:XMITC 150
DESCRIPTION: The XMITC command sets the WAMI global transmitter control action option number variable to the value provided as an argument. After execution of this command, all (in this embodiment of the WAMIL language) subsequent commands which require use of a transmitter control action option number, and all (in this embodiment of the WAMIL language) IF-construct commands which test the current script transmitter control action option number, will reference the new value.

Execution of this command also disables any (in this WAMIL language embodiment) association which exists between this WAMI global variable and any WAMI VAR variable.
OUTPUT: The following is an example of the output generated to the WAMIL report file upon execution of a XMITC command:

Set Transmitter Control Action Option To 150
ERRORS: None.
ALTERS: XMITC
DEFAULT VALUE: XMITC is set to 0 upon initial startup, and is of type integer. The WAM:INITIALIZE command also sets this variable to 0.
SEE ALSO: WAM:INITIALIZE

IF-Constructs

If-constructs are interwoven with the integration construct data structure according to the invention, i.e., WAM interface commands, to form a WAMIL script.

A table listing of the names of WAM Interpreter IF-Construct elements follows immediately. Then, a general discussion of the less robust IF THEN ELSE type of IF-construct is presented, then a general discussion of the more robust IF THENDO ELSEDO ENDIF type of IF-construct is presented. After that, a detailed glossary of IF-construct elements is provided.

| | |
|---|---|
| IF:ACTIVITY | IF:SDPVAR_STATE |
| IF:AFAIL | IF:SDPVAR_VALUE |
| IF:APXVAR | IF:TEST_EXPR |
| IF:CFAIL | IF:TFAIL |
| IF:COMPLETED | IF:WAMVAR |
| IF:GENERIC | THEN/ELSE:CONTINUE |
| IF:LASTTEST | THEN/ELSE:ENDTEST |
| IF:LFAIL | THEN/ELSE:PRINT |
| IF:OMSG | THEN/ELSE:TIMEOUT |
| IF:SDPAIL | THEN/ELSE:WAIT |
| IF:SDPPORT | THEN/ELSE:WAITQUERY |
| IF:SDPVAR_COLOR | |

IF THEN ELSE Type Of IF-Construct

This section describes the WAMIL scripting language IF-construct test expressions, and complementary THEN and ELSE commands. They can be used in a IF THEN ELSE construct or an IF THENDO ELSEDO ENDIF construct to test the results of a WAMIL interface command executed, and toperform certain actions based upon the results of the IF test expression.

All WAMIL IF THEN ELSE constructs can (in this embodiment of the WAMIL language) be complete and include an IF, and at a minimum one THEN and one ELSE. Multiple THEN and ELSE commands can exist within an IF THEN ELSE construct. For example the following is valid:
   IF:OMSG COMPLETED
   THEN:PRINT Command completed
   THEN: CONTINUE
   ELSE:PRINT Wait up to 100 seconds for command to complete
   ELSE:WAITQUERY 10 TI 10

The IF THEN ELSE construct is an older type of IF-construct and is still supported for backwards compatibility. The WAMIL IF THENDO ELSEDO ENDIF scripting language constructs are more robust and can be nested, but cannot be inter-mixed with an IF THEN ELSE construct.

The WAM Interpreter will not accept incomplete IF THEN ELSE constructs. any (in this WAMIL language embodiment) incomplete IF THEN ELSE construct will generate a syntax error from the WAM Interpreter. The Scriptor will not load or save a script containing any (in this WAMIL language embodiment) incomplete IF THEN ELSE constructs.

IF THENDO ELSEDO ENDIF Type of IF-Construct

This section describes the WAMIL IF THENDO ELSEDO ENDIF type of IF-construct which can be used with any (in this WAMIL language embodiment) IF-construct commands to execute a group of commands based upon the results of the IF test expression.

A WAMIL IF THENDO ELSEDO ENDIF construct is structured as follows:
   IF:GENERIC a34y12.0t
   THENDO:
      WAM:PRINT The generic for the cell is valid.
      IF:ACTIVITY NO
      THEN:PRINT No activity on current cell.
      ELSE:ENDTEST
   ELSEDO:
      WAM:PRINT Generic on cell is incorrect.
      WAM:ENDTEST
   ENDIF:

All the commands between the THENDO and ELSEDO constructs are executed if the result of the IF command execution is TRUE, and all the commands between the ELSEDO and EN-DIF are executed if the result of the IF command execution is FALSE All WAMIL IF THENDO ELSEDO ENDIF constructs can (in this embodiment of the WAMIL language) be complete and include an IF, a THENDO, an ELSEDO, and an ENDIF. The WAM Interpreter will not accept incomplete constructs. Any (in this WAMIL language embodiment) incomplete construct will generate a syntax error from the WAM Interpreter. The Scriptor will not load or save a script containing any (in this WAMIL language embodiment) incomplete IF THENDO ELSEDO ENDIF constructs.

Any WAMIL IF THEN ELSE construct can be nested within any (in this WAMIL language embodiment) THENDO ELSEDO, or ELSEDO ENDIF construct. Also, IF THENDO ELSEDO ENDIF constructs can be nested within other IF THENDO ELSEDO ENDIF constructs, as desired.

WHILE ENDWHILE Type of IF-Construct

This section describes the WAMIL WHILE ENDWHILE variation of an IF-construct which can be used to continuously loop through the execution of a group of commands until the WHILE test expression condition evaluates FALSE.

A WAMIL WHILE ENDWHILE construct is structured as follows:
   WHILE:TEST_EXPR CELLVAR LT 223
      TI:op:cell CELLVAR
      WAM:INCRVAR CELLVAR 1
   ENDWHILE:

All WAMILWHILE ENDWHILE constructs can (in this embodiment of the WAMIL language) be complete and include a WHILE and an ENDWHILE. The WAM Interpreter will not accept incomplete constructs. Any (in this WAMIL language embodiment) incomplete construct will generate a syntax error from the WAM Interpreter. The Scriptor will not load or save a script containing any (in this WAMIL language embodiment) incomplete WHILE ENDWHILE constructs.

WHILE ENDWHILE constructs can be nested within any (in this WAMIL language embodiment) other WHILE ENDWHILE construct.

Glossary of IF-Construct Elements

This section presents a detailed glossary of WAMIL IF test expressions, and THEN and ELSE commands. The glossary begins with the IF-construct element, IF:ACTIVITY, and ends with the IF-construct element, THEN/ELSE:WAITQUERY.

A quick purpose is presented along with its syntax and an example of the command. There is also a detailed description along with errors generated, if any, and the output generated by the command to the WAMIL report file. If the command alters key variables, these key variables are stated. An example script is also provided for almost all the commands. Each example is simple, but serves as a basis to enhance understanding of the command in the context of a WAMIL script.

IF:ACTIVITY

The text string, IF:ACTIVITY, is a test expression, i.e., element, in an IF-construct.
PURPOSE: Tests if the activity for the current CELL is equal to the string provided as an argument.
SYNTAX: IF:ACTIVITY string
EXAMPLE CALL: IF:ACTIVITY NVM
DESCRIPTION: The IF:ACTIVITY construct tests if the activity for the current CELL is equal to the string given. Upon execution, the WAM Interpreter OutBuff is searched for the activity state for the current CELL.

If the activity is equal to the string provided the expression will evaluate to TRUE and the THEN commands, or THENDO part of the IF-construct, will be executed, otherwise the ELSE commands, or ELSEDO part of the IF-construct, will be executed.

This command is only (in this embodiment of the WAMIL language) valid if the previously executed TI interface command was the TI:op:cell, generic command, and OutBuff holds the output of such command. Otherwise, the IF expression is not evaluated and no results are executed.
OUTPUT: The following is an example of the output generated to the WAMIL report file upon execution of an IF ACTIVITY command, in which the WAMI global CELL variable had been previously set to the value of 49:

IF:

Cell 49 ACTIVITY=NVM

RESULT:

ACTIVITY=NO

ERRORS: If the IF:ACTIVITY command is executed, and the previous TI interface command executed was not TI:op:cell, generic the WAM Interpreter will print the following warning message to the WAMIL report file:

WARNING:

Activity Not Tested . . .

Must Execute TI:op:cell, generic Command First!
ALTERS: None (in this WAMIL language embodiment)
DEFAULT VALUE: None (in this WAMIL language embodiment)
SEE ALSO: IF:GENERIC string
EXAMPLE: The following script lines will test if there is no activity on the current cell:

TI:op:cell, generic

IF:ACTIVITY NO

THEN:CONTINUE

ELSE:PRINT Cell Has Undetermined Activity.

ELSE:ENDTEST

IF:AFAIL

The text string, IF:AFAIL, is a test expression, i.e., element, in an IF-construct.
PURPOSE: Tests if the execution if the last WAMIL APXRCV command failed.
SYNTAX: IF:AFAIL
EXAMPLE CALL: IF:AFAIL
DESCRIPTION: The IF:AFAIL construct tests the AFAIL flag which is set if the execution of a WAMIL APXRCV command fails for any reason. This flag is always reset prior to the execution of a new WAMIL APXRCV command.

If the AFAIL flag is set, the expression will evaluate to TRUE and the THEN commands, or THENDO part of the IF-construct, will be executed, otherwise the ELSE commands, or ELSEDO part of the IF-construct, will be executed.
OUTPUT: The following is an example of the output generated to the WAMIL report file, upon execution of an IF:LFAIL command:

IF:

APXRCV Access Failed

RESULT:

APXRCV Access Failed

ERRORS: None.
ALTERS: None (in this WAMIL language embodiment)
DEFAULT VALUE: AFAIL by default is set to FALSE.
SEE ALSO: WAM:GETAPX db_form_name db_file_name, WAM:GETAPXFLD db_form_name db_field_name, WAM:PUTAPX db_form_name db_file_name, WAM:PUTAPXFLD db_form_name db_field_name

IF:APXVAR

The text string, IF:APXVAR, is a test expression, i.e., element, in an IF-construct.
PURPOSE: Tests the value of the WAMI VAR variable APXVAR.
SYNTAX: IF:APXVAR operator string
EXAMPLE CALL: IF:APXVAR GT 0
DESCRIPTION: The IF:APXVAR construct tests if the current value of the APXVAR variable is equal to, greater than, less than, or not equal to the string provided as an argument. For example, if the EQ operator is used, and the current APXVAR value is equal to the string provided as an argument, the IF-construct expression will evaluate to TRUE. If the current value is not equal to the string provided as an argument the IF-construct expression will evaluate to FALSE.
OUTPUT: The following is an example of the output generated to the WAMIL report file upon execution of an IF:APXVAR command:

IF:

APXVAR EQ 0

RESULT:

APXVAR=1

ERRORS: None.
ALTERS: None (in this WAMIL language embodiment)
DEFAULT VALUE: None (in this WAMIL language embodiment).
SEE ALSO: WAM:GETAPXFLD db_form_name db_field_name, WAM:PUTAPXFLD db_form_name db_field_name
EXAMPLE: The following script will retrieve a field value from an APXRCV DB form, and set the value to zero:

WAM:MSC 5

WAM:CELL 49

```
WAM:ANT 1
WAM:GETAPXFLD ceqsu2 rmi_thresh
IF:APXVAR NE 0
THENDO:
   WAM:SETVAR APXVAR 0
   WAM:PUTAPXFLD ceqsu2 rmi_thresh
ELSEDO:
ENDIF:
WAM:ENDTEST
```

IF:CFAIL

The text string, IF:CFAIL, is a test expression, i.e., element, in an IF-construct.
PURPOSE: Tests if a disconnect occurred during a CONNECT command execution, or a WAMI interface command execution.
SYNTAX: IF:CFAIL
EXAMPLE CALL: IF:CFAIL
DESCRIPTION: The IF:CFAIL construct tests the CFAIL flag which is set if a disconnect occurs during the execution of any (in this WAMIL language embodiment) WAMI interface command. This flag is always reset prior to execution of an interface command.

If the CFAIL flag is set the expression will evaluate to TRUE and the THEN commands, or THENDO part of the IF-construct, will be executed, otherwise the ELSE commands, or ELSEDO part of the IF-construct, will be executed.
OUTPUT: The following is an example of the output generated to the WAMIL report file, upon execution of an IF:CFAIL command:
   IF:
   Connection Failed
   RESULT:
   Connection Valid
ERRORS: None.
ALTERS: None (in this WAMIL language embodiment)
DEFAULT VALUE: CFAIL by default is set to FALSE.
SEE ALSO: WAM:CONNECT interface, WAM:DISCONNECT interface
EXAMPLE: The following script lines test if a disconnect occurred after execution of a TI command:
```
   TI:op:cell 49
   IF:CFAIL
   THEN:ENDTEST
   ELSE:CONTINUE
```

IF: COMPLETED

The text string, IF:COMPLETED, is a test expression, i.e., element, in an IF-construct.
PURPOSE: Tests if a completion message was returned for the previous WAMIL interface command executed.
SYNTAX: IF:COMPLETED
EXAMPLE CALL: IF:COMPLETED
DESCRIPTION: The IF:COMPLETED construct tests if an output message in OutBuff, generated from the previous interface command executed, contains the text string COMPLETED.

If the COMPLETED message is present in OutBuff, the expression will evaluate to TRUE and the THEN commands, or THENDO part of the IF-construct, will be executed, otherwise the ELSE commands, or ELSEDO part of the IF-construct, will be executed.
OUTPUT: The following is an example of the output generated to the WAMIL report file upon execution of an IF:COMPLETED command:
   IF:
   Output Message: COMPLETED
   RESULT:
   OMSG Matched
ERRORS: None.
ALTERS: None (in this WAMIL language embodiment)
DEFAULT VALUE: OutBuff is always flushed prior to execution of an interface command.
SEE ALSO: IF:OMSG string
EXAMPLE: The following script lines test if a COMPLETED message was received after execution of a TI command:
```
   TI:op:cell 49
   IF:COMPLETED
   THEN:ENDTEST
   ELSE:CONTINUE
```

IF:GENERIC

The text string, IF:GENERIC, is a test expression, i.e., element, in an IF-construct.
PURPOSE: Tests if the generic for the current CELL is equal to the string provided as an argument.
SYNTAX: IF:GENERIC string
EXAMPLE CALL: IF:GENERIC a34Y120t
DESCRIPTION: The IF:GENERIC construct tests if the generic for the current CELL is equal to the string given. Upon execution, the WAM Interpreter OutBuff is searched for the generic for the current CELL.

If the generic is equal to the string provided the expression will evaluate to TRUE and the THEN commands, or THENDO part of the IF-construct, will be executed, otherwise the ELSE commands, or ELSEDO part of the IF-construct, will be executed.

This command is only (in this embodiment of the WAMIL language) valid if the previously executed TI interface command was the TI:op:cell, generic command, and OutBuff holds the output of such command. Otherwise, the IF expression is not evaluated and no results are executed.
OUTPUT: The following is an example of the output generated to the WAMIL report file upon execution of an IF:GENERIC command:
   IF:
   Cell 49 GENERIC=a34Y120t
   RESULT:
   GENERIC=a34Y120t
ERRORS: If the IF:GENERIC command is executed, and the previous TI interface command executed was not TI:op:cell, generic the WAM Interpreter will print the following warning message to the WAMIL report file:
   WARNING:
   Generic Not Tested . . .
   Must Execute TI:op:cell, generic Command First!
ALTERS: None (in this WAMIL language embodiment)
DEFAULT VALUE: None (in this WAMIL language embodiment)
SEE ALSO: IF:ACTIVITY string, WAM:GEN string
EXAMPLE: The following script lines test if the generic given is for the current cell:
```
   TI:op:cell, generic
   IF:GENRIC a34Y120t
   THEN: CONTINUE
```

ELSE:PRINT Cell Has Incorrect Generic.
ELSE:ENDTEST

IF:LASTTEST

The text string, IF:LASTTEST, is a test expression, i.e., element, in an IF-construct.
PURPOSE: Tests if the WAMIL script has been executed for the last cell.
SYNTAX: IF:LASTTEST
EXAMPLE CALL: IF:LASTTEST
DESCRIPTION: The IF:LASTTEST is a special construct which tests if the current WAMIL script has been executed for the last cell number given in the LOOPCELL or LOOPCELLVARS command, or the last cell number in the WAMI VARn CELL list.

If the script has been executed for the last cell, the expression will evaluate to TRUE and the THEN commands, or THENDO part of the IF-construct, will be executed, otherwise the ELSE commands, or ELSEDO part of the IF-construct, will be executed.
OUTPUT: The following is an example of the output generated to the WAMIL report file, upon execution of an IF:LASTTEST command:
 IF:
 Last Cell Tested
 RESULT:
 Last Cell Not Tested
ERRORS: None.
ALTERS: None (in this WAMIL language embodiment)
DEFAULT VALUE: None (in this WAMIL language embodiment).
SEE ALSO: WAM:LOOPCELL cells . . . , WAM:LOOPCELLVARS
EXAMPLE: The following script prints a message after the script has been executed for the last cell number:
 WAM:MSC 5
 WAM:LOOPCELL 49 101
 TI:op:cell 49
 IF:LASTEST
 THEN:PRINT Last cell Tested.
 THEN:ENDTEST
 ELSE:CONTINUE

IF:LFAIL

The text string, IF:LFAIL, is a test expression, i.e., element, in an IF-construct.
PURPOSE: Tests if a login attempt failed during execution of a CONNECT command.
SYNTAX: IF:LFAIL
EXAMPLE CALL: IF:LFAIL
DESCRIPTION: The IF:LFAIL construct tests the LFAIL flag which is set if a login attempt to establish a WAM Interpreter interface session connection fails during the execution of a CONNECT command. This flag is always reset prior to execution of a CONNECT command.

If the LFAIL flag is set, the expression will evaluate to TRUE and the THEN commands, or THENDO part of the IF-construct, will be executed, otherwise the ELSE commands, or ELSEDO part of the IF-construct, will be executed.
OUTPUT: The following is an example of the output generated to the WAMIL report file, upon execution of an IF:LFAIL command:
 IF:
 Login Failed
 RESULT:
 Login Valid
ERRORS: None.
ALTERS: None (in this WAMIL language embodiment)
DEFAULT VALUE: LFAIL by default is set to FALSE.
SEE ALSO: WAM:CONNECT interface
EXAMPLE: The following script lines test if a failed login occurred while attempting to establish a TIpdunix session:
 WAM:CONNECT TI
 IF:LFAIL
 THEN:ENDTEST
 ELSE:CONTINUE

IF:OMSG

The text string, IF:OMSG, is a test expression, i.e., element, in an IF-construct.
PURPOSE: Tests if the string provided was returned for the previous WAMIL interface command executed.
SYNTAX: IF:OMSG string
EXAMPLE CALL: IF:OMSG BBA BBAVAR, COMPLETED
DESCRIPTION: The IF:OMSG construct tests if the string given as an argument is present in the WAM Interpreter OutBuff. This is the same as testing if the previous WAMIL interface command executed returned an output message equal to the string given, since the output of all (in this embodiment of the WAMIL language) WAMIL interface commands gets placed in OutBuff.

If the string given is present in OutBuff, the expression will evaluate to TRUE and the THEN commands, or THENDO part of the IF-construct, will be executed, otherwise the ELSE commands, or ELSEDO part of the IF-construct, will be executed.

The string argument can also include references to WAMI global variables, or WAMI VARn variables. To reference a WAMI global variable the suffix VAR is simply added to the WAMI global variable name. This is not to be mistaken with WAMI VAR variables. Although when referencing WAMI global variables within strings the names resemble WAMI VAR variables, this naming convention was chosen to allow references to WAMI global variables and still be able to print the variable name. To include the value of a WAMI VAR variable, a WAMI global variable can (in this embodiment of the WAMIL language) first be associated. Then references to the WAMI global variable will yield the value of the WAMI VAR variable it is associated with.
OUTPUT: The string provided is printed in the WAMIL report file as part of the IF-construct output message. Variable substitution is performed if WAM Interpreter variables are referenced within the string provided.

The following is an example of the output generated to the WAMIL report file upon execution of a IF:OMSG command which includes reference to a WAMI global variable:
 IF:
 Output Message: BBA 2, COMPLETED
 RESULT:
 OMSG Matched
ERRORS: None.
ALTERS: None (in this WAMIL language embodiment)
DEFAULT VALUE: OutBuff is always flushed prior to execution of an interface command.
SEE ALSO: IF:COMPLETED
EXAMPLE: The following script lines test if a COMPLETED message was received after execution of a TI command:

TI:op:cell 49
IF:OMSG COMPLETED
THEN:ENDTEST
ELSE:CONTINUE

IF:SDPFAIL

The text string, IF:SDPFAIL, is a test expression, i.e., element, in an IF-construct.
PURPOSE: Tests if an SDP interface command execution or connection attempt failed.
SYNTAX: IF:SDPFAIL
EXAMPLE CALL: IF:SDPFAIL
DESCRIPTION: The IF:SDPFAIL construct tests the SDP interface failure flag which is set if the execution of any (in this WAMIL language embodiment) SDP interface command fails in any manner. The SDPFAIL flag is also set when the execution of a WAM:CONNECT SDP command fails to establish an SDP session. To determine the cause of the failure the CFAIL, LFAIL, TFAIL, or SDPPORT flags can then be tested.

If the SDP interface failure flag is set, the expression will evaluate to TRUE and the THEN commands, or THENDO part of the IF-construct, will be executed, otherwise the ELSE commands, or ELSEDO part of the IF-construct, will be executed.
OUTPUT: The following is an example of the output generated to the WAMIL report file, upon execution of an IF:SDPFAIL command:
  IF:
  SDP Interface Command Failure
  RESULT:
  SDP Interface Command Failed
ERRORS: None.
ALTERS: None (in this WAMIL language embodiment)
DEFAULT VALUE: None (in this WAMIL language embodiment)
SEE ALSO: WAM:CONNECT interface
EXAMPLE: The following script lines test if an executed SDP interface command failed, and if so the type of failure:
  SDP:2138,49
  IF:SDPFAIL
  THENDO:
    IF:TFAIL
    THENDO:
      WAM:PRINT SDP Command Timeout.
    ELSEDO:
    ENDIF
    IF:CFAIL
    THENDO:
      WAM:PRINT SDP Connection Failure.
      WAM:ENDTEST
    ELSEDO:
    ENDIF:
  ELSEDO:
  ENDIF:
The following script lines test if a CONNECT command failed to establish an SDP session, and if so the type of failure:
  WAM:CONNECT SDP
  IF:SDPFAIL
  THENDO:
    IF:LFAIL
    THEN:PRINT SDP OMP Server Login Failure.
    ELSE:CONTINUE
    IF:CFAIL
    THEN:PRINT SDP Connection Attempt Failure.
    ELSE:CONTINUE
    IF:SDPPORT
    THEN:PRINT No SDP VTTY Ports Available.
    ELSE:CONTINUE
    WAM:ENDTEST
  ELSEDO:
  ENDIF:

IF:SDPPORT

The text string, IF:SDPPORT, is a test expression, i.e., element, in an IF-construct.
PURPOSE: Tests if a login attempt to an SDP port failed due to unavailable ports.
SYNTAX: IF:SDPPORT
EXAMPLE CALL: IF:SDPPORT
DESCRIPTION: The IF:SDPPORT construct tests the SDP port flag which is set if a login attempt to an SDP port fails due to unavailable ports. This flag is always set when the last WAM:CONNECT SDP command executed failed to access a port.

If the SDP port flag is set, the expression will evaluate to TRUE and the THEN commands, or THENDO part of the IF-construct, will be executed, otherwise the ELSE commands, or ELSEDO part of the IF-construct, will be executed.

The following is an example of the output generated to the WAMIL report file, upon execution of an IF:SDPORT command:
  IF:
  SDP Ports Are NOT Available
  RESULT:
  SDP Ports Are Available
ERRORS: None.
ALTERS: None (in this WAMIL language embodiment)
DEFAULT VALUE: None (in this WAMIL language embodiment)
SEE ALSO: WAM:CONNECT interface
EXAMPLE: The following script lines test if an SDP port is available upon a login attempt:
  WAM:CONNECT SDP
  IF:SDPPORT
  THEN:ENDTEST
  ELSE:CONTINUE

IF:SDPVAR_COLOR

The text string, IF:SDPVAR_COLOR, is a test expression, i.e., element, in an IF-construct.
PURPOSE: Tests if the COLOR of the SDPVAR indicator is equal to, or not equal to, a valid, pre-defined color.
SYNTAX: IF:SDPVAR_COLOR operator string
EXAMPLE CALL: IF:SDPVAR_COLOR EQ BLACK_ON_RED
DESCRIPTION: The IF:SDPVAR_COLOR construct tests if the COLOR of the current SDPVAR indicator is set to a valid, pre-defined color. For example, if the EQ operator is used, and the COLOR is equal to the string provided as an argument, the IF-construct expression will evaluate to TRUE. If the COLOR is not equal to the string provided as an argument, the IF-construct expression will evaluate to FALSE.

For a list of valid, pre-defined colors which SDPVAR_COLOR can be set to refer to the GETSDP command.

OUTPUT: The following is an example of the output generated to the WAMIL report file, for the BBA indicator name, upon execution of an IF:SDPVAR_COLOR EQ BLACK_ON_RED command:

IF:
BBA 19 COLOR EQ BLACK_ON_RED
RESULT:
BBA 19 COLOR=BLACK_ON_RED

The following is an example of the output generated to the WAMIL report file, for the CCC indicator name, upon execution of an IF:SDPVAR_COLOR EQ BLACK_ON_RED command:

IF:
CCC 19 COLOR EQ BLACK_ON_RED
RESULT:
CCC 19 COLOR=BLACK_ON_RED

The following is an example of the output generated to the WAMIL report file, for the CCCOOS indicator name, upon execution of an IF:SDPVAR_COLOR EQ WHITE_ON_BLACK command:

IF:
CCC 19 OOS CEs COLOR EQ WHITE_ON_BLACK
RESULT:
CCC 19 OOS CEs COLOR=WHITE_ON_BLACK

The following is an example of the output generated to the WAMIL report file, for the CHANL indicator name, upon execution of an IF:SDPVAR_COLOR EQ WHITE_ON_BLACK command:

IF:
BBA 19 Channel Frequency COLOR EQ WHITE_ON_BLACK
RESULT:
BBA 19 Channel Frequency COLOR=WHITE_ON_BLACK The following is an example of the output generated to the WAMIL report file, for the PAF indicator name, upon execution of an IF:SDPVAR_COLOR EQ RED_ON_YELLOW command:

IF:
BBA 1 Physical Antenna Face COLOR EQ RED_ON_YELLOW
RESULT:
BBA 1 Physical Antenna Face COLOR=RED_ON_YELLOW The following is an example of the output generated to the WAMIL report file, for the PPW indicator name, upon execution of an IF:SDPVAR_COLOR EQ BLUE_ON_YELLOW command:

IF:
CCC 1 Packet Pipe Width COLOR EQ BLUE_ON_YELLOW
RESULT:
CCC 1 Packet Pipe Width COLOR=BLUE_ON_YELLOW ERRORS: None.
ALTERS: None (in this WAMIL language embodiment)
DEFAULT VALUE: SDPVAR_COLOR is set to INVALID upon initial startup. The WAM:INITIALIZE command does not alter this variable.
SEE ALSO: WAM:GETSDP indicator_name
EXAMPLE: The following script lines will test if the indicator color for the current CCC is set to BLACK_ON_GREEN:

WAM:CELL 49
WAM:CCC 19
SDP:2138,49
WAM:GETSDP CCC
IF:SDPVAR_COLOR EQ BLACK_ON_GREEN
THEN:CCC Is Active
ELSE:PRINT CCC Is Not Active

IF:SDPVAR_STATE

The text string, IF:SDPVAR_STATE, is a test expression, i.e., element, in an IF-construct.

PURPOSE: Tests if the STATE of the SDPVAR indicator is equal to, or not equal to, a valid, pre-defined state.
SYNTAX: IF:SDPVAR_STATE operator string
EXAMPLE CALL: IF:SDPVAR_STATE EQ ACT
DESCRIPTION: The IF:SDPVAR_STATE construct tests if the STATE of the current SDPVAR indicator is set to a valid, pre-defined state. For example, if the EQ operator is used, and the STATE is equal to the string provided as an argument, the IF-construct expression will evaluate to TRUE. If the STATE is not equal to the string provided as an argument, the IF-construct expression will evaluate to FALSE.

For a list of valid, pre-defined text words which SDPVAR_STATE can be set to refer to the GETSDP command.

OUTPUT: The following is an example of the output generated to the WAMIL report file, for the BBA indicator name, upon execution of an IF:SDPVAR_STATE EQ ACT command:

IF:
BBA 19 STATE EQ ACT
RESULT:
BBA 19 STATE=ACT

The following is an example of the output generated to the WAMIL report file, for the CCC indicator name, upon execution of an IF:SDPVAR_STATE EQ ACT command:

IF:
CCC 19 STATE EQ ACT
RESULT:
CCC 19 STATE=ACT

The following is an example of the output generated to the WAMIL report file, for the CCCOOS indicator name, upon execution of an IF:SDPVAR_STATE EQ INDETMNT command:

IF:
CCC 19 OOS CEs STATE EQ INDETMNT
RESULT:
CCC 19 OOS CEs STATE=INDETMNT

The following is an example of the output generated to the WAMIL report file, for the CHANL indicator name, upon execution of an IF:SDPVAR_STATE EQ OFF command:

IF:
BBA 19 Channel Frequency STATE EQ OFF
RESULT:
BBA 19 Channel Frequency STATE=OFF The following is an example of the output generated to the WAMIL report file, for the PAF indicator name, upon execution of an IF:SDPVAR_STATE EQ MINOR command:

IF:
BBA 1 Physical Antenna Face STATE EQ MINOR
RESULT:
BBA 1 Physical Antenna Face STATE=MINOR
The following is an example of the output generated to the WAMIL report file, for the PPW indicator name, upon execution of an IF:SDPVAR_STATE EQ OOS command:
IF:
CCC 1 Packet Pipe Width STATE EQ OOS
RESULT:
CCC 1 Packet Pipe Width STATE=OOS
ERRORS: None.
ALTERS: None (in this WAMIL language embodiment)
DEFAULT VALUE: SDPVAR_STATE is set to INVALID upon initial startup. The WAM:INITIALIZE command does not alter this variable.
SEE ALSO: WAM:GETSDP indicator_name
EXAMPLE: The following script lines will test if the indicator STATE for the current CCC is ACT:
   WAM:CELL 49
   WAM:CCC 19
   SDP:2138,49
   WAM:GETSDP CCC
   IF:SDPVAR_STATE EQ ACT
   THEN:CCC Is Active
   ELSE:PRINT CCC Is Not Active

IF:SDPVAR_VALUE

The text string, IF:SDPVAR_VALUE, is a test expression, i.e., element, in an IF-construct.
PURPOSE: Tests the VALUE of the SDPVAR indicator.
SYNTAX: IF:SDPVAR_VALUE operator string
EXAMPLE CALL: IF:SDPVAR_VALUE GT 18
DESCRIPTION: The IF:SDPVAR_VALUE construct tests if the VALUE of the current SDPVAR indicator is equal to, greater than, less than, or not equal to the string provided as an argument. For example, if the EQ operator is used, and the VALUE is equal to the string provided as an argument, the IF-construct expression will evaluate to TRUE. If the VALUE is not equal to the string provided as an argument, the IF-construct expression will evaluate to FALSE.
SDPVAR_VALUE can be set to any (in this WAMIL language embodiment) text, numerical, or alphanumerical string.
For a list of relational operators supported, refer to the WAM Interpreter Keywords & Operators section.
OUTPUT: The following is an example of the output generated to the WAMIL report file, for the BBA indicator name, upon execution of an IF:SDPVAR_VALUE EQ 19 command:
IF:
BBA 19 VALUE EQ 19
RESULT:
BBA 19 VALUE=19
The following is an example of the output generated to the WAMIL report file, for the CCC indicator name, upon execution of an IF:SDPVAR_VALUE EQ 19 command:
IF:
CCC 19 VALUE EQ 19
RESULT:
CCC 19 VALUE=19
The following is an example of the output generated to the WAMIL report file, for the CCCOOS indicator name, upon execution of an IF:SDPVAR_VALUE EQ 40 command:
IF:
CCC 19 OOS CEs VALUE EQ 40
RESULT:
CCC 19 OOS CEs VALUE=40
The following is an example of the output generated to the WAMIL report file, for the CHANL indicator name, upon execution of an IF:SDPVAR_VALUE EQ 450 command:
IF:
BBA 19 Channel Frequency VALUE EQ 450
RESULT:
BBA 19 Channel Frequency VALUE=450
The following is an example of the output generated to the WAMIL report file, for the PAF indicator name, upon execution of an IF:SDPVAR_VALUE EQ 1 command:
IF:
BBA 1 Physical Antenna Face VALUE EQ 1
RESULT:
BBA 1 Physical Antenna Face VALUE=1
The following is an example of the output generated to the WAMIL report file, for the PPW indicator name, upon execution of an IF:SDPVAR_VALUE EQ 24-8 command:
IF:
CCC 1 Packet Pipe Width VALUE EQ 24-8
RESULT:
CCC 1 Packet Pipe Width VALUE=24-8
ERRORS: None.
ALTERS: None (in this WAMIL language embodiment)
DEFAULT VALUE: SDPVAR_VALUE is set to INVALID upon initial startup. The WAM:INITIALIZE command does not alter this variable.
SEE ALSO: WAM:GETSDP indicator_name
EXAMPLE: The following script lines will test if the channel frequency for the current BBA is 450:
   WAM:CELL 49
   WAM:BBA 19
   SDP:2138,49
   WAM:GETSDP CHANL
   IF:SDPVAR_VALUE EQ 450
   THEN:PRINT Channel Frequency is Correct
   ELSE:PRINT Channel Frequency is Not Correct

IF:TEST_EXPR

The text string, IF:TEST_EXPR, is a test expression, i.e., element, in an IF-construct.
PURPOSE: Instructs the WAM Interpreter to perform a relational comparison between string1 and string2.
SYNTAX: IF:TEST_EXPR string1 operator string2
EXAMPLE CALL: IF:TEST_EXPR APXVAR EQ WAMVAR
DESCRIPTION: The IF:TEST_EXPR construct performs a relational comparison between any two values, strings, or WAM Interpreter variables. The arguments string1 and string2 can reference any (in this WAMIL language embodiment) WAMI global variable, WAMI VAR variable, WAMI VARn List variable name, and WAM Interpreter keyword.
For a list relational operators supported refer to the WAM Interpreter Keywords & Operators section.
OUTPUT: The following is an example of the output generated to the WAMIL report file upon execution of an IF:TEST_EXPR command:

IF:
TEST_EXPR APXVAR EQ WAMVAR
RESULT:
TRUE: 0 EQ 0
ERRORS: None.
ALTERS: None (in this WAMIL language embodiment)
DEFAULT VALUE: None (in this WAMIL language embodiment).
SEE ALSO: WAMI VAR variables IF-constructs
EXAMPLE: The following script lines test if the results of an analysis program executed from within the script is PASS or FAIL:
  WAM:UNIX analysis_script
  IF:TEST_EXPR WAMVAR EQ PASS
  THEN: CONTINUE
  ELSE:ENDTEST

IF:TFAIL

The text string, IF:TFAIL, is a test expression, i.e., element, in an IF-construct.
PURPOSE: Tests if a no input message was received from the last WAMIL interface command executed.
SYNTAX: IF:TFAIL
EXAMPLE CALL: IF:TFAIL
DESCRIPTION: The IF:TFAIL construct tests the TFAIL flag which is set if the last interface command executed received no input messages within the time defined by the WAMI global variable TimeOut. This flag is always reset prior to execution of any (in this WAMIL language embodiment) interface command.

After successful execution of a CONNECT command, if the connection times out at any point during the execution of any (in this WAMIL language embodiment) subsequent WAMIL interface commands for such interface, meaning no response is received from the interface within the time specified by the WAMI global variable TimeOut, the WAM Interpreter TFAIL flag will be set. The WAM Interpreter will then, for example, generate the following output to the WAMIL report file:

TIpdunix Command Time Out!

If the TFAIL flag is set, the expression will evaluate to TRUE and the THEN commands, or THENDO part of the IF-construct, will be executed, otherwise the ELSE commands, or ELSEDO part of the IF-construct, will be executed.
OUTPUT: The following is an example of the output generated to the WAMIL report file, upon execution of an IF:TFAIL command:
  IF:
  TimeOut Occurred
  RESULT:
  No TimeOut Occurred
ERRORS: None.
ALTERS: None (in this WAMIL language embodiment)
DEFAULT VALUE: TFAIL by default is set to FALSE.
SEE ALSO: WAM:CONNECT interface
EXAMPLE: The following script lines test if a time out occurred during execution of a TI interface command:
  TI:op:cell, generic
  IF:TFAIL
  THEN:ENDTEST
  ELSE:CONTINUE

IF:WAMVAR

The text string, IF:WAMVAR, is a test expression, i.e., element, in an IF-construct.
PURPOSE: Tests the value of the WAMI VAR variable WAMVAR.
SYNTAX: IF:WAMVAR operator string
EXAMPLE CALL: IF:WAMVAR NE 1
DESCRIPTION: The IF:WAMVAR construct tests if the current value of the WAMVAR variable is equal to, greater than, less than, or not equal to the string provided as an argument. For example, if the EQ operator is used, and the current WAMVAR value is equal to the string provided as an argument, the IF-construct expression will evaluate to TRUE. If the current value is not equal to the string provided as an argument the IF-construct expression will evaluate to FALSE.

WAMVAR can be set to any (in this WAMIL language embodiment) text, numerical, or alphanumerical string.

A list of relational operators that are supported is found herein refer to the WAM Interpreter Keywords & Operators section.
OUTPUT: The following is an example of the output generated to the WAMIL report file upon execution of an IF:WAMVAR command:
  IF:
  WAMVAR NE 1
  RESULT:
  WAMVAR=0
ERRORS: None.
ALTERS: None (in this WAMIL language embodiment)
DEFAULT VALUE: WAMVAR is set to NULL upon initial startup. The WAM:INITIALIZE command also sets this variable to NULL.
SEE ALSO: WAM:UNIX command
EXAMPLE: The following script executes a ksh script called Analyze Data, and checks the value returned from the script:
  WAM:MSC 5
  WAM:CELL 49
  WAM:ANT 1
  WAM:UNIX Analyze_Data
  IF:WAMVAR EQ 1
  THENDO:
    WAM:PRINT All Tests Passed.
    WAM:ENDTEST
  ELSEDO:
    WAM:PRINT Data Analysis Failed
    WAM:ENDTEST
  ENDIF:
  WAM:ENDTEST

THEN/ELSE:CONTINUE

The text string, THEN/ELSE:CONTINUE, is an element in an IF-construct.
PURPOSE: Instructs the WAM Interpreter to execute the next WAMIL script command.
SYNTAX: THEN:CONTINUE
  ELSE:CONTINUE
EXAMPLE CALL: THEN:CONTINUE
DESCRIPTION: The THEN:CONTINUE and ELSE:CONTINUE constructs instruct the WAM Interpreter to immediately execute the next WAMIL script command. This command exists as a means to have the effect to fall through to the next script command in the case a TRUE, or FALSE, evaluation of an IF-construct is not important.

OUTPUT: The following is an example of the output generated to the WAMIL report file upon execution of a THEN:CONTINUE construct:

THEN:

Continue Test

The following is an example of the output generated to the

WAMIL report file upon execution of a ELSE:CONTINUE construct:

ELSE:

Continue Test

ERRORS: THEN and ELSE constructs can (in this embodiment of the WAMIL language) be used within IF THEN ELSE constructs. Including a THEN construct not preceded by an IF or THEN, or an ELSE construct not preceded by a THEN or ELSE, will generate a syntax error.
ALTERS: None (in this WAMIL language embodiment)
DEFAULT VALUE: None (in this WAMIL language embodiment).
SEE ALSO: All WAMIL IF-constructs.

THEN/ELSE:ENDTEST

The text string, THEN/ELSE:ENDTEST, is an element in an IF-construct.
PURPOSE: Instructs the WAM Interpreter to terminate the WAMIL script.
SYNTAX: THEN:ENDTEST
ELSE:ENDTEST
EXAMPLE CALL: THEN:ENDTEST
DESCRIPTION: The THEN:ENDTEST and ELSE:ENDTEST constructs instruct the WAM Interpreter to immediately terminate the current WAMIL script in execution.

If the WAMIL script is looping through multiple cells, meaning the LOOPCELL or LOOPCELLVARS command has been executed in the script, the THEN:ENDTEST and ELSE:ENDTEST constructs are executed if the evaluation of an IF-construct instructs the WAM Interpreter so, regardless of whether or not the last cell has been tested.

Upon execution, this construct will close all (in this embodiment of the WAMIL language) active WAM Interpreter xterm windows and terminate all (in this embodiment of the WAMIL language) associated processes. The WAMIL report file will then be closed and saved and the WAMIL script will be terminated, along with the script status display window.
OUTPUT: The following is an example of the output generated to the WAMIL report file upon execution of an THEN:ENDTEST construct:

THEN:

End Test

The following is an example of the output generated to the WAMIL report file upon execution of an ELSE:ENDTEST construct:

ELSE:

End Test

If any (in this WAMIL language embodiment) interface sessions are active upon execution of this construct, the WAM Interpreter will print a corresponding disconnect message for each session that is closed in the WAMIL report file (See DISCONNECT command).
ERRORS: THEN and ELSE constructs can (in this embodiment of the WAMIL language) be used within IF THEN ELSE constructs. Including a THEN construct not preceded by an IF or THEN, or an ELSE construct not preceded by a THEN or ELSE, will generate a syntax error.

See DISCONNECT.
ALTERS: None (in this WAMIL language embodiment).
DEFAULT VALUE: None (in this WAMIL language embodiment).
SEE ALSO: WAM:DISCONNECT interface, WAM:ENDTEST
EXAMPLE: The following script lines will login to a TI interface, execute a TI command, and then end the test if the command is successful:

WAM:MSC 5

WAM:CELL 49

WAM:CONNECT TI

TI:cfr:cell 49, multi bba 4; config 15

IF:OMSG COMPLETED

THEN:ENDTEST

ELSE:CONTINUE

THEN/ELSE:PRINT

The text string, THEN/ELSE:PRINT, is an element in an IF-construct.
PURPOSE: Instructs the WAM Interpreter to print the string provided in the WAMIL report file.
SYNTAX: THEN:PRINT string
ELSE:PRINT string
EXAMPLE CALL: THEN:PRINT Test Case jt1234 Failed.
DESCRIPTION: The THEN:PRINT and ELSE:PRINT constructs print the string provided as an argument in the script WAMIL report file.

The string provided can include references to WAMI global variables, or WAMI VARn variables. To reference a WAMI global variable the suffix VAR is simply added to the WAMI global variable name. For example, the following string, CCC CCCVAR is OOS, will be interpreted and printed as follows for a WAMI global CCC variable with a value of 4:

CCC 4 is OOS

This is not to be mistaken with WAMI VAR variables. Although when referencing WAMI global variables within strings to be printed the names resemble WAMI VAR variables, this naming convention was chosen to allow references to WAMI global variables and still be able to print the variable name. In the above example the WAMI global name CCC was printed along with the value of the WAMI global variable. To print the value of a WAMI VAR variable, a WAMI global variable can (in this embodiment of the WAMIL language) first be associated. Then references to the WAMI global variable will yield the value of the WAMI VAR variable it is associated with.
OUTPUT: The string provided is printed in the WAMIL report file as given. Variable substitution is performed if WAM Interpreter variables are referenced within the string provided.

The following is an example of the output generated to the WAMIL report file upon execution of a THEN:PRINT construct which includes reference to a WAMI global variable:

THEN:

This test Is For Antenna Face 1.

The following is an example of the output generated to the WAMIL report file upon execution of a ELSE:PRINT construct which includes reference to a WAMI global variable:

ELSE:

This test Is For Antenna Face 1.

ERRORS: THEN and ELSE constructs can (in this embodiment of the WAMIL language) be used within IF THEN ELSE constructs. Including a THEN construct not preceded by an IF or THEN, or an ELSE construct not preceded by a THEN or ELSE, will generate a syntax error.

ALTERS: None (in this WAMIL language embodiment).

DEFAULT VALUE: None (in this WAMIL language embodiment).

EXAMPLE: The following script lines print to the script WAMIL report file, after successful execution of a TI interface command:

WAM:CELL 49

WAM:BBAVAR

TI:dgn:cell 49, bba BBAVAR

IF:OMSG COMPLETED

THEN:PRINT Diagnostics on Cell CELLVAR, for BBA BBAVAR

ELSE:ENDTEST

THEN/ELSE:TIMEOUT

The text string, THEN/ELSE:TIMEOUT, is an element in an IF-construct.

PURPOSE: Changes the WAM Interpreter global TimeOut variable, TimeOut, to the value provided as an argument.

SYNTAX: THEN:TIMEOUT seconds

ELSE:TIMEOUT seconds

EXAMPLE CALL: THEN:TIMEOUT 60

DESCRIPTION: The THEN:TIMEOUT and ELSE:TIMEOUT constructs set the WAM Interpreter global TimeOut variable to the value provided as an argument. After execution of this construct, all (in this embodiment of the WAMIL language) subsequent commands which require use the TimeOut variable will reference the new value.

The WAM Interpreter TimeOut variable plays a major role during execution of a CONNECT command. Setting this variable too small will cause frequent time outs if system response is slow.

The TimeOut variable is referenced during input from any (in this WAMIL language embodiment) active interface session. If nothing at all (in this embodiment of the WAMIL language) is received within the time specified by the variable, the WAM Interpreter TFAIL flag will be set.

OUTPUT: The following is an example of the output generated to the WAMIL report file upon execution of a THEN:TIMEOUT construct:

THEN:

TimeOut Changed To: 60 Seconds

ERRORS: Setting TimeOut to a negative number or zero will cause unpredictable results.

THEN and ELSE constructs can (in this embodiment of the WAMIL language) be used within IF THEN ELSE constructs. Including a THEN construct not preceded by an IF or THEN, or an ELSE construct not preceded by a THEN or ELSE, will generate a syntax error.

ALTERS: TimeOut

DEFAULT VALUE: TimeOut is set to 30 upon initial startup, and is of type integer. The WAM:INITIALIZE command also sets this variable to 30.

SEE ALSO: IF:TFAIL, WAM:INITIALIZE

EXAMPLE: The following script lines change the TimeOut before execution of a TI command:

WAM:CAT 1

WAM:TIMEOUT 30

TI:rst:cell 49, cat 1

THEN/ELSE:WAIT

The text string, THEN/ELSE:WAIT, is an element in an IF-construct.

PURPOSE: Instructs the WAM Interpreter to wait a specified number of seconds before execution of the next WAMIL script command.

SYNTAX: THEN:WAIT seconds

ELSE:WAIT seconds

EXAMPLE CALL: THEN:WAIT 10

DESCRIPTION: The THEN:WAIT and ELSE:WAIT constructs instruct the WAM Interpreter to wait a specified number of seconds before executing the next WAMIL script command.

OUTPUT: The following is an example of the output generated to the WAMIL report file upon execution of a THEN:WAIT construct:

THEN:

WAMIL Wait: 10 Seconds

ERRORS: Setting WAIT to a negative number or zero will have no effect.

THEN and ELSE constructs can (in this embodiment of the WAMIL language) be used within IF THEN ELSE constructs. Including a THEN construct not preceded by an IF or THEN, or an ELSE construct not preceded by a THEN or ELSE, will generate a syntax error.

ALTERS: Wait

DEFAULT VALUE: Wait is set to 10 upon initial startup, and is of type integer. The WAM:INITIALIZE command also sets this variable to 10.

SEE ALSO: WAM:INITLALIZE

EXAMPLE: The following script lines execute a TI command and then waits seconds before executing the next command:

TI:rst:cell 49, cat 1

IF:COMPLETED

THEN:WAIT 10

ELSE:WAITQUERY 5 TI 3

THEN/ELSE:WAITQUERY

The text string, THEN/ELSE:WAITQUERY, is an element in an IF-construct.

PURPOSE: Instructs the WAM Interpreter to wait a specified number of seconds and then query the TI interface up to a total amount of queries defined by value.

SYNTAX: THEN:WAITQUERY seconds TI value

ELSE:WAITQUERY seconds TI value

EXAMPLE CALL: THEN:WAITQUERY 5 TI 3

DESCRIPTION: The WAITQUERY construct instructs the WAM Interpreter to wait a specified number of seconds and then query the TI interface for additional output messages until either the IF-construct previously executed evaluates TRUE, or the total amount of queries defined by value have been met. During the query process, additional input messages received are appended to OutBuff. Thus, OutBuff is not flushed upon execution of a WAITQUERY construct.

The WAITQUERY construct allows a WAMIL script to camp on an executed TI interface command until a specified TI output message is received. If the message is never received, the WAITQUERY command allows a user to define how many times the TI interface will be queried before the script continues execution. Thus preventing the script from looping indefinitely.

If the input message is received prior to execution of the last query loop, the previously executed IF-construct will evaluate TRUE and the WAMIL script will continue execution.

The WAITQUERY command is only (in this embodiment of the WAMIL language) effective for an ELSE construct, execution of a THEN:WAITQUERY construct will have the same effect as the execution of a WAM:WAIT command.
OUTPUT: The following is an example of the output generated to the WAMIL report file upon execution of a ELSE:WAITQUERY construct:

ELSE:

Query TI In 10 Seconds

Repeat Query Up To 3 Times

The following is an example of the output generated to the WAMIL report file upon execution of a THEN:WAITQUERY construct:

THEN:

Query TI In 10 Seconds

Repeat Query Up To 3 Times

THEN Query NOT Executed After 10 Second Wait.

If any (in this WAMIL language embodiment) additional messages are received during any query, they are appended to OutBuff and also printed to the WAMIL report file.

If during execution of any (in this WAMIL language embodiment) ELSE query the IF-construct evaluates TRUE, the following is an example of the output generated to the WAMIL report file:

!!!!!! QUERY SUCCESSFUL ON ATTEMPT 2!!!!!!

If after execution of the last ELSE query the IF-construct evaluates FALSE, the following is an example of the output generated to the WAMIL report file:

!!!!!! QUERY NOT SUCCESSFUL AFTER ATTEMPT 3!!!!!!

ERRORS: Setting seconds to a negative number or zero will have no effect.

THEN and ELSE constructs can (in this embodiment of the WAMIL language) be used within IF THEN ELSE constructs. Including a THEN construct not preceded by an IF or THEN, or an ELSE construct not preceded by a THEN or ELSE, will generate a syntax error.
ALTERS: Wait
DEFAULT VALUE: Wait is set to 10 upon initial startup, and is of type integer. The WAM:INITIALIZE command also sets this variable to 10.
SEE ALSO: WAM:INITIALIZE, WAM:WAIT seconds
EXAMPLE: The following script lines execute a TI command, and then loops up to six times for a COMPLETED output message:

TI:rst:cell 49, cat 1

IF:COMPLETED

THEN:WAIT 10

ELSE:WAITQUERY 5 TI 6

WAMI LINK Commands

This section describes the WAMIL scripting language LINK commands which can be used to create a linker script to link WAMIL scripts together for serial or parallel execution. This section also briefly describes the WAM Interpreter Linker.

WAM Interpreter Linker

Upon execution of a linker script, the WAMI Linker will prompt the user for the option to assign variables for each linked script, or one set of variables for all (in this embodiment of the WAMIL language) the linked scripts. This process occurs when the linker script was executed via command line arguments by using the -link switch.

The WAMI Linker will search all (in this embodiment of the WAMIL language) linked scripts in a linker script. Linked WAMIL scripts which include WAMI VAR variables, or List declarations, will cause the WAMI Linker to prompt the user for input. If the user has chosen to assign variables to each individual linked script, the WAMI Linker will prompt for each linked script which includes declarations for WAMI VAR variables or Lists.

If the user has chosen to assign one set of variables for all (in this embodiment of the WAMIL language) linked WAMIL scripts, the WAMI Linker will search through all (in this embodiment of the WAMIL language) the linked scripts first and then prompt the user for only (in this embodiment of the WAMIL language) one set of variables. For example, if some of the linked scripts have a CELLVAR command, the WAMI Linker will only (in this embodiment of the WAMIL language) prompt once for a cell number and assign that cell number to all (in this embodiment of the WAMIL language) the linked scripts which require a cell number to be passed as an argument.

In the case of List declarations, if more than one linked script declares the same type List, and each List declared differs in size, then the WAMI Linker will prompt the user for input into the largest List. Therefore, the largest List declaration takes precedence.

Linked scripts can be executed in a serial or parallel fashion. For more details on these modes of execution refer to the WAMI Linker EXEC command. Upon execution of any (in this WAMIL language embodiment) linked script in serial mode, the WAMI Linker will ignore all (in this embodiment of the WAMIL language) WAM:PAUSE commands.

The WAMI Linker automatically generates a WAMIL report file for the linker script in execution. This WAMIL report file is placed depending on the option selected by the user via the WAMI GUI platform, or by command line execution using the -rpt switch. Linked WAMIL scripts executed also generate their own WAMIL report files which will be placed in the same location as the WAMIL Linker Report file.

Inclusion of a WAM:DISPLAY command in a linker script causes the WAMI Linker to open a display window to allow viewing of the execution of the linker script. This window is independent of any (in this WAMIL language embodiment) display windows opened by execution of linked WAMIL scripts which include the WAM:DISPLAY command. For differentiating purposes, the WAMI Linker display window color is green with yellow text, as opposed to the standard display window of an executed WAMIL script.

During execution of any (in this WAMIL language embodiment) linked WAMIL script, any WAMI interface sessions opened during the process will remain open until the last linked script has been executed. Therefore, a TI interface connection, as an example, will remain is essence nailed up until the last linked script which uses the connection has been executed. In this manner connections once established at the start of the first executed linked script will remain accessible during the remainder of the linker script for the execution of all (in this embodiment of the WAMIL language) subsequently linked WAMIL scripts.

Not all (in this embodiment of the WAMIL language) WAMIL commands are supported by the WAMI Linker. The use of any (in this WAMIL language embodiment) command not supported will cause a syntax error to be generated by the WAM Interpreter and immediate termination of the linker script to occur.

Below is a list of the WAMIL commands that the WAMI Linker supports:

| | | |
|---|---|---|
| WAM:COMMENT | WAM:DATE | WAM:DISPLAY |
| WAM:ENDTEST | WAM:INITIALIZE | WAM:PRINT |
| WAM:REPORT | WAM:SPOOL | WAM:TIME |
| WAM:TIMEOUT | WAM:TRACE | WAM:TRACEOFF |
| WAM:TRACEON | WAM:WAIT | IF:TEST_EXPR |
| THENDO: | ELSEDO: | ENDIF: |

WAMIL SCRIPTOR

Upon loading a linker script, the Scriptor automatically activates an internal Linker window. All (in this embodiment of the WAMIL language) WAMIL commands not supported by the WAMI Linker are then disabled from the SCRIPTOR pull down menus.

While the SCRIPTOR Linker window is active only (in this embodiment of the WAMIL language) linked scripts can be loaded. To load a regular WAMIL script a user can (in this embodiment of the WAMIL language) first either save the linker script, or erase it, and then close the Linker window. The opposite also applies, in that a linker script cannot be loaded while a regular WAMIL script is currently loaded into the Scriptor. This ensures that commands which are not supported by the WAMI Linker will not be mistakenly placed into a linker script.

Glossary of WAMI Linker Commands

A detailed glossary of WAMI linker commands follows. It begins with the linker command, DISPLAYOFF, and ends with the linker command, SCRIPT.

A quick purpose is presented along with its syntax and an example of the command. There is also a detailed description along with errors generated, if any, and the output generated by the command to the WAMIL report file. If the command alters key variables, these key variables are stated. An example script is also provided for almost all (in this embodiment of the WAMIL language) the commands. Each example is simple, but serves as a basis to enhance understanding of the command in the context of a WAMIL script.

DISPLAYOFF

The text string, DISPLAYOFF, is Linker command.
PURPOSE: Instructs the WAM Interpreter to suppress all (in this embodiment of the WAMIL language) WAM:DISPLAY commands execution within linked WAMIL scripts.
SYNTAX: LINK:DISPLAYOFF
EXAMPLE CALL: LINK:DISPLAYOFF
DESCRIPTION: The Linker DISPLAYOFF command causes suppression of WAM:DISPLAY commands within linked WAMIL scripts. Upon execution, linked WAMIL scripts which include the WAM:DISPLAY command will not open an xterm display window.

Upon execution of a linker script, the WAMI Linker first loads the entire script and checks each command for syntax errors prior to initiating execution. At this point, detection of the Linker DISPLAYOFF command causes the WAMI Linker to immediately set a flag to suppress linked WAMIL script WAM:DISPLAY commands execution.

ERRORS: More than one DISPLAYOFF command in a linker script has no effect.

ALTERS: None (in this WAMIL language embodiment).
DEFAULT VALUE: The DISPLAYOFF flag is set to OFF as default.
SEE ALSO: WAM:INITIALIZE
EXAMPLE: The following linker script disables the execution of WAM:DISPLAY commands within linked WAMIL scripts:

WAM:DISPLAY 1
   LINK:DISPLAYOFF
   LINK:EXEC SERIAL
   WAM:DATE
   WAM:TIME
   LINK:SCRIPT HOME jt1234
   LINK:SCRIPT SHARE jt5678
   WAM:ENDTEST

EXEC

The text string, EXEC, is Linker command.
PURPOSE: Instructs the WAM Interpreter to execute the following linked scripts in a serial or parallel fashion.
SYNTAX: LINK:EXEC keyword
EXAMPLE CALL: LINK:EXEC SERIAL
DESCRIPTION: The Linker EXEC command instructs the WAM Interpreter to execute the following linked scripts per the keyword specified, until either another EXEC command is executed specifying a different keyword, or the linker script ends by execution of a WAM:ENDTEST command. The keyword provided can be either SERIAL or PARALLEL.

In SERIAL execution mode all (in this embodiment of the WAMIL language) linked scripts are executed serially, one after another, meaning that execution of a linked script will not begin until the previous linked script executed has completed. It is important to note that serially executed scripts can alter WAM Interpreter variables. For example, if at the end of executing a serially linked WAMIL script which has set the WAMI global CCC variable to the value of 2, the CCC variable will remain at that value during the execution of the next linked script, unless the next linked script alters the value. Thus syntax errors can occur for undefined variables within linked scripts.

In PARALLEL execution mode linked WAMIL scripts are launched and execute independently of the main Linker script. Therefore, parallel executed scripts complete almost instantaneously and the next WAMIL script is executed immediately. Parallel execution is good for launching WAMIL scripts which exercise a system in the background, for example call processing functions. Parallel execution of a linked WAMIL script does not alter WAM Interpreter variables.

The Linker EXEC command should proceed any (in this WAMIL language embodiment) linked scripts. If this command is not included in a Linker script the default execution mode is always SERIAL. Although the default is SERIAL, inclusion of the Linker EXEC command allows easier readability of a Linker script, and it is therefore good practice to leave in this command.

OUTPUT: The LINK:EXEC command used with the SERIAL or PARALLEL keyword does not generate any (in this WAMIL language embodiment) output to the Linker script WAMIL report file. Output is only (in this embodiment of the WAMIL language) generated upon execution of a LINK:SCRIPT command. For more details on this output refer to the LINK:SCRIPT command output section.

SCRIPTOR: This command cannot be selected from a pull down menu. The Scriptor however, automatically adds this command to the Linker script being generated upon the selection of the first linked script. Subsequent selections of linked scripts do not cause additional Linker EXEC commands to be added, unless the already existing Linker EXEC command has been deleted or moved from the top of the script.

If a WAM:DISPLAY command exists at the top of the Linker script being generated, the first Linker EXEC command is automatically added under this command.

Additional Linker EXEC commands can be added by typing the command into the "Current Selected Command" text entry box, and then executing the Insert command button.

A linked script can (in this embodiment of the WAMIL language) always have a previous Linker EXEC command, or a syntax error will be generated upon saving the script.
ERRORS: None.
ALTERS: Linked script execution mode.
DEFAULT VALUE: Linked script execution mode is set to SERIAL at default, and is not altered unless a Linker EXEC command using the keyword PARALLEL is executed.
SEE ALSO: LINK:SCRIPT path script_name
EXAMPLE: The following WAMIL Linker script links together two WAMIL scripts for serial execution:
   WAM:DISPLAY 1
   LINK:EXEC SERIAL
   WAM:DATE
   WAM:TIME
   LINK:SCRIPT HOME jt1234
   LINK:SCRIPT SHARE jt5678
   WAM:ENDTEST

SCRIPT

The text string, SCRIPT, is Linker command.
PURPOSE: Instructs the WAM Interpreter to execute the linked WAMIL script, script_name, per the currently set execution mode.
SYNTAX: LINK:SCRIPT path script_name
EXAMPLE CALL: LINK:SCRIPT HOME jt1234
DESCRIPTION: The Linker SCRIPT command instructs the WAM Interpreter to execute the WAMIL script provided by the argument script_name, which is located in the location provided by the argument path, per the currently set execution mode.

The Linker SCRIPT command links WAMIL scripts together within a Linker script. The execution mode of the linked scripts can be altered by executing a Linker EXEC command prior to any (in this WAMIL language embodiment) execution. For more details refer to the Linker EXEC command.

The Linker SCRIPT command supports WAM Interpreter path keywords.
OUTPUT: The following is an example of the output generated to the Linker script WAMIL report file upon execution of a Linker SCRIPT command, in which the currently set execution mode is SERIAL:

Start Execution HOME WAMIL Script jt1234:
   Upon completion of execution of the serially linked WAMIL script, the following output will be generated:
   End Execution HOME WAMIL Script jt1234:
   The following is an example of the output generated to the Linker script WAMIL report file upon execution of a Linker SCRIPT command, in which the currently set execution mode is PARALLEL:

Launched HOME WAMIL Script jt1234:
   Output from all (in this embodiment of the WAMIL language) linked scripts executed serially is also added to the Linker script WAMIL report file. Linked scripts also generate their own output, therefore creating their own WAMIL report file. Thus, Linker script WAMIL report files contain all (in this embodiment of the WAMIL language) outputs from all (in this embodiment of the WAMIL language) linked scripts executed serially. The output from linked scripts executed in PARALLEL mode is not included in the Linker script WAMIL report file.
SCRIPTOR: The Scriptor automatically adds this command to the Linker script being generated upon the selection of a linked script. Depending from which location the WAMIL script is selected, the Scriptor will generate the correct path.

Additional Linker SCRIPT commands can be added by typing the command into the "Current Selected Command" text entry box, and then executing the Insert command button.
ERRORS: All errors generated by any (in this WAMIL language embodiment) linked script in serial execution mode is output to the Linker script WAMIL report file and processed in the standard WAM Interpreter manner. That is, the error is displayed in the WAMIL Script Status Display window.

Critical or fatal errors generated during the execution of a serially linked script causes the execution of such script to be terminated, and the WAMI Linker to proceed with execution of the next linked script, if any.

Errors generated upon the execution of a linked script in parallel mode are output to the Linker script WAMIL report file.
ALTERS: Any or all (in this embodiment of the WAMIL language) WAM Interpreter variables, depending on the linked WAMIL script executed.
DEFAULT VALUE: None (in this WAMIL language embodiment).
SEE ALSO: LINK:EXEC keyword
EXAMPLE: Refer to the example provided for the Linker EXEC command.

Acronyms

The following acronyms are used in this application.
ROP=Read Only Printer
SDP=Status Display Page
TI=Technician Interface
WAM=Wireless Automation Manager (GUI) Platform
WAMI=Wireless Automation Manager Interpreter

Conclusion

The invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

What is claimed is:

1. A computer-readable medium having embodied thereon a script of machine-executable statements to be executed by a machine connected to a system, said system having at least a first interface for interacting with a user, said computer-readable-medium-embodied script causing said machine to generate a second interface for interacting differently with said user than said first interface, said first interface having a first set of commands and a corresponding first syntax, said second interface having a second set of commands and a corresponding second syntax, respectively, the second set being different than the first set and the second syntax being different than the first syntax, said computer-readable-medium-embodied script comprising:

a sequence of executable statements in which at least two of the executable statements are integration constructs, each of said integration constructs including a first field, readable by said machine, to identify for said machine and so cause said machine to correspondingly engage one of said first interface and said second interface; and a second field, readable by said machine, to identify for said machine at least a command from the first or second command set, respectively, for the interface identified in said first field and so correspondingly cause said machine to submit the identified command to the respective engaged interface.

2. The computer-readable-medium-embodied script of claim 1, wherein said first field of said integration construct is separated from said second field by an alphanumeric symbol.

3. The computer-readable-medium embodied script of claim 2, wherein said alphanumeric symbol is a colon.

4. The computer-readable-medium-embodied script of claim 1, wherein said first interface also includes a set of parameters that can be passed with said first set of commands, respectively, and said second field includes at least one parameter corresponding to said command contained therein.

5. The computer-readable-medium-embodied script of claim 1, wherein said system is a wireless communication network and said first interface is one of the TIpdunix (TI) interface and the Status Display Page (SDP) interface.

6. The computer-readable-medium-embodied script of claim 5, wherein said system comprises a third interface having a third set of commands and a corresponding third syntax, said first is said TI Interface and said third interface is said SDP interface.

7. The computer-readable-medium-embodied script of claim 1, wherein said second interface is the Wireless Application Manager (WAM) interface.

8. The computer-readable-medium-embodied script of claim 1, wherein said sequence of executable statements further includes at least one IF-THEN-ELSE decisional construct.

9. The computer-readable-medium-embodied script of claim 1, wherein said first field of said integration construct is a header for said second field.

10. An integration construct data structure readable by a machine, said machine operating upon commands from at least a first interface and a second interface, the first domain having a first command set and a corresponding first syntax, the second domain having a second command set and a corresponding second syntax, the second set being different than the first set and the second syntax being different than the first syntax, said integration construct associating a command with an interface where said command is valid, said integration construct comprising:

a first data object, readable by said machine, to identify for said machine at least a command to be executed; and a second data object, readable by said machine and linked to said first data object, to identify for said machine one of said first interface and said second interface as the interface in which the identified command of said first data object is valid, contents of the first and second data object causing said machine to correspondingly engage the identified interface and submit the identified command to the engaged interface.

11. The integration construct data structure of claim 10, wherein said first data object also identifies a parameter to be operated upon by said command in said first data object.

12. The integration construct data structure of claim 10, wherein said second data object is linked to said first data object by an alphanumeric symbol.

13. The integration construct data structure of claim 12, wherein the alphanumeric symbol is a colon.

14. The integration construct data structure of claim 10, wherein the first interface is a first user interface to a system and the second interface is a second user interface to the same system, the second interface providing different interaction with the user than the first interface.

15. The integration construct data structure of claim 14, wherein said system is a wireless communication network and said first interface is one of the TInpdunix (TI) interface and the Status Display Page (SDP) interface.

16. The integration construct data structure of claim 14, wherein said second interface is the Wireless Application Manager (WAM) interface.

17. A method of parsing an executable statement, said executable statement being readable by a machine, said machine operating upon commands for use with one of at least a first interface and a second interface, said first interface having a first command set and a corresponding first syntax, said second interface having a second command set and a corresponding second command set, the first set being different than the second set and the first syntax being different than the second syntax, said method comprising:

examining said executable statement to identify one of at least said first interface and said second interface as the interface for which a command embedded in said executable statement is to be parsed;

examining said executable statement to identify at least said command; and parsing the identified command according to the respective command set, and the respective syntax, of the identified interface.

18. The method of claim 17, further comprising examining said executable statement to identify a parameter to be operated upon by said command.

19. The method of claim 17, wherein the first interface is a first user interface to a system and the second interface is a second user interface to the same system, the second interface providing different interaction with the user than the first interface.

20. The method of claim 19, wherein said system is a wireless communication network and said first interface is one of the TInpdunix (TI) interface and the Status Display Page (SDP) interface.

21. The method of claim 19, wherein said second interface is the Wireless Application Manager (WAM) interface.

22. The method of claim 19, wherein the executable statement includes an integration construct, the integration construct including a first field, readable by said machine, to identify for said machine and so cause said machine to correspondingly engage one of said first interface and said second interface, and a second field, readable by said machine, to identify for said machine at least a command from the first or second command set, respectively, for the interface identified in said first field and so correspondingly cause said machine to submit the identified command to the respective engaged interface.

23. The method of claim 22, wherein said first field of said integration construct is separated from said second field by an alphanumeric symbol.

24. The method of claim 23, wherein said alphanumeric symbol is a colon.

25. The method of claim 22, wherein said first interface also includes a set of parameters that can be passed with said first set of commands, respectively, and said second field includes at least one parameter corresponding to said command contained therein.

26. The method of claim 22, wherein said first field of said integration construct is a header for said second field.

* * * * *